US012573735B2

(12) United States Patent
Kamiyama et al.

(10) Patent No.: US 12,573,735 B2
(45) Date of Patent: Mar. 10, 2026

(54) MULTILAYER DEVICE

(71) Applicant: Panasonic Intellectual Property Management Co., Ltd., Osaka (JP)

(72) Inventors: Tomohide Kamiyama, Osaka (JP); Yoshiyuki Saito, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 86 days.

(21) Appl. No.: 18/693,086

(22) PCT Filed: Sep. 29, 2022

(86) PCT No.: PCT/JP2022/036564

§ 371 (c)(1),
(2) Date: Mar. 18, 2024

(87) PCT Pub. No.: WO2023/054622

PCT Pub. Date: Apr. 6, 2023

(65) Prior Publication Data

US 2024/0405400 A1 Dec. 5, 2024

(30) Foreign Application Priority Data

Sep. 29, 2021 (JP) ................................ 2021-159267
Sep. 16, 2022 (JP) ................................ 2022-148007
(Continued)

(51) Int. Cl.
*H01P 1/20* (2006.01)
*H01P 1/203* (2006.01)

(52) U.S. Cl.
CPC .................................... *H01P 1/203* (2013.01)

(58) Field of Classification Search
CPC .... H05K 3/46; H05K 1/02; H01P 1/00; H01P 1/203
See application file for complete search history.

(56) References Cited

U.S. PATENT DOCUMENTS 9,407,011 B2 * 8/2016 Zaghloul ................ H01Q 19/10
11,228,108 B2 * 1/2022 Christie .................. H01Q 1/38
(Continued)

FOREIGN PATENT DOCUMENTS

CN 104937845 A * 9/2015 ........... H03H 7/0115
JP 2006-100361 A 4/2006
(Continued)

OTHER PUBLICATIONS

International Search Report dated Dec. 20, 2022 issued in International Patent Application No. PCT/JP2022/036564, with English translation.

*Primary Examiner* — Quan Tra
(74) *Attorney, Agent, or Firm* — Rimon P.C.

(57) ABSTRACT

A multilayer device includes: a dielectric; a signal line provided inside the dielectric and including a portion exposed on an outer surface of the dielectric; a ground electrode provided inside or on the outer surface of the dielectric and including at least a portion exposed on the outer surface of the dielectric; a plurality of planar electrodes provided inside the dielectric, arranged parallel to the ground electrode, and arranged in a first direction, and; a plurality of connecting electrodes that are provided inside the dielectric and connect the plurality of planar electrodes and the ground electrode; a plurality of signal terminals provided on the outer surface of the dielectric and connected to the signal line; and a plurality of ground terminals provided on the outer surface of the dielectric and connected to the ground electrode.

21 Claims, 46 Drawing Sheets

(30) Foreign Application Priority Data

Sep. 16, 2022 (JP) ................................ 2022-148022
Sep. 22, 2022 (JP) ................................ 2022-151957

(56) References Cited

U.S. PATENT DOCUMENTS

| | | | | |
|---|---|---|---|---|
| 2005/0205292 | A1* | 9/2005 | Rogers | H05K 1/0231 174/262 |
| 2009/0140929 | A1 | 6/2009 | Inoue et al. | |
| 2009/0295660 | A1* | 12/2009 | Xu | H01Q 1/243 343/753 |
| 2010/0259343 | A1 | 10/2010 | Toujo | |
| 2011/0304521 | A1* | 12/2011 | Ando | H01Q 21/064 343/893 |
| 2012/0325523 | A1 | 12/2012 | Kobayashi et al. | |
| 2012/0325544 | A1 | 12/2012 | Toyao et al. | |
| 2013/0241778 | A1* | 9/2013 | Orime | H01Q 15/0006 343/700 MS |
| 2014/0049343 | A1 | 2/2014 | Sakai | |
| 2015/0054713 | A1 | 2/2015 | Takasaki | |
| 2015/0084167 | A1* | 3/2015 | Sasaki | H01L 24/19 257/659 |
| 2015/0084208 | A1* | 3/2015 | Iida | H01L 23/49827 257/774 |
| 2015/0130673 | A1* | 5/2015 | Ng | H01Q 15/008 716/122 |
| 2015/0236427 | A1 | 8/2015 | Asai | |
| 2017/0127510 | A1 | 5/2017 | Kawata | |
| 2017/0148713 | A1 | 5/2017 | Iida et al. | |
| 2018/0212331 | A1 | 7/2018 | Balanis et al. | |

FOREIGN PATENT DOCUMENTS

| | | | |
|---|---|---|---|
| JP | 2009-135797 | A | 6/2009 |
| JP | 2009-224567 | A | 10/2009 |
| JP | 2012-257084 | A | 12/2012 |
| JP | 2014-068166 | A | 4/2014 |
| JP | 2015-041876 | A | 3/2015 |
| JP | 2015-061258 | A | 3/2015 |
| JP | 2015-065553 | A | 4/2015 |
| KR | 10-2004-0076658 | A | 9/2004 |
| WO | 2009/081662 | A1 | 7/2009 |
| WO | 2011/111297 | A1 | 9/2011 |
| WO | 2011/111311 | A1 | 9/2011 |
| WO | 2012/147803 | A1 | 11/2012 |
| WO | 2013/168377 | A1 | 11/2013 |
| WO | 2015/190610 | A1 | 12/2015 |

* cited by examiner

MULTILAYER DEVICE

CROSS-REFERENCE OF RELATED APPLICATIONS

This application is the U.S. National Phase under 35 U.S.C. § 371 of International Patent Application No. PCT/JP2022/036564, filed on Sep. 29, 2022, which in turn claims the benefit of Japanese Patent Application No. 2021-159267, filed on Sep. 29, 2021, Japanese Patent Application No. 2022-148007, filed on Sep. 16, 2022, Japanese Patent Application No. 2022-148022, filed on Sep. 16, 2022, and Japanese Patent Application No. 2022-151957, filed on Sep. 22, 2022, the entire disclosures of which Applications are incorporated by reference herein.

TECHNICAL FIELD

The present disclosure relates to multilayer devices.

BACKGROUND ART

Conventional functional substrates that control the pass-through characteristics of high-speed digital signals and high-frequency signals (hereinafter referred to as high-speed, high-frequency signals) are known. As one example of this type of functional substrate, Patent Literature (PTL) 1 discloses a functional substrate that includes a mushroom structure of conductor elements (planar electrodes) and through vias (connecting electrodes), and a conductor that functions as a ground (ground electrode). This functional substrate has a structure characterized by periodically arranged mushroom structures, and is capable of inhibiting the passage of high-speed, high-frequency signals of a specific frequency.

CITATION LIST

Patent Literature

[PTL 1] WO2011/111311

SUMMARY OF INVENTION

Technical Problem

However, while conventional functional substrates can stop the passage of high-speed, high-frequency signals of a specific frequency, the frequency bandwidth that can be stopped is narrow.

Furthermore, forming these mushroom structures on a conventional functional substrate increases the number of layers of the functional substrate, leading to an increase in cost.

In view of the above, the present disclosure has an object to provide a multilayer device that can widen the stopband through which passage of signals is not allowed.

The present disclosure also has an object to provide a multilayer device that can inhibit an increase in the cost of conventional functional substrates.

The present disclosure also aims to provide a multilayer device that can form a stopband in accordance with the required specifications.

Solution to Problem

A multilayer device according to one aspect of the present disclosure includes: a dielectric; a signal line provided inside the dielectric and including a portion exposed on an outer surface of the dielectric; a ground electrode provided inside or on the outer surface of the dielectric and including at least a portion exposed on the outer surface of the dielectric; a plurality of planar electrodes provided inside the dielectric, arranged parallel to the ground electrode, and arranged in a first direction; a plurality of connecting electrodes that are provided inside the dielectric and connect the plurality of planar electrodes and the ground electrode; a plurality of signal terminals provided on the outer surface of the dielectric and connected to the signal line; and a plurality of ground terminals provided on the outer surface of the dielectric and connected to the ground electrode.

A multilayer device according to one aspect of the present disclosure includes: a signal line that transmits a signal; a ground electrode set to ground potential; a plurality of planar electrodes arranged parallel to the ground electrode and arranged in a first direction; a dielectric provided between each of the signal line, the plurality of planar electrodes, and the ground electrode; and a plurality of connecting electrodes that are positioned between the plurality of planar electrodes and the ground electrode and connect the plurality of planar electrodes and the ground electrode. At least one of the plurality of planar electrodes or the plurality of connecting electrodes includes two or more different types of electrode structures.

A multilayer device according to another aspect of the present disclosure includes: a dielectric; a signal line provided inside the dielectric and including a portion exposed on an outer surface of the dielectric; a ground electrode provided inside or on the outer surface of the dielectric and including at least a portion exposed on the outer surface of the dielectric; a plurality of planar electrodes provided inside the dielectric, arranged parallel to the ground electrode, and arranged in a first direction; a plurality of connecting electrodes that are provided inside the dielectric and connect the plurality of planar electrodes and the ground electrode; a plurality of signal terminals provided on the outer surface of the dielectric and connected to the signal line; and a plurality of ground terminals provided on the outer surface of the dielectric and connected to the ground electrode. At least a portion of the signal line has a meandering shape.

A multilayer device according to another aspect of the present disclosure includes: a signal line that transmits a signal; a ground electrode set to ground potential; a plurality of planar electrodes arranged parallel to the ground electrode and arranged in a first direction; a dielectric provided between each of the signal line, the plurality of planar electrodes, and the ground electrode; and a plurality of connecting electrodes that are positioned between the plurality of planar electrodes and the ground electrode and connect the plurality of planar electrodes and the ground electrode. At least a portion of the signal line has a meandering shape.

A multilayer device according to another aspect of the present disclosure includes: a dielectric; a signal line provided inside the dielectric and including a portion exposed on an outer surface of the dielectric; a ground electrode provided inside or on the outer surface of the dielectric and including at least a portion exposed on the outer surface of the dielectric; a plurality of planar electrodes provided inside the dielectric, arranged parallel to the ground electrode, and arranged in a first direction; a plurality of connecting electrodes that are provided inside the dielectric and connect the plurality of planar electrodes and the ground electrode; a plurality of signal terminals provided on the outer surface of the dielectric and connected to the signal line; and a plurality of ground terminals provided on the outer surface of the dielectric and connected to the ground electrode. At least a portion of each of the plurality of connecting electrodes has a coil shape or a meandering shape.

A multilayer device according to another aspect of the present disclosure includes: a signal line that transmits a signal; a ground electrode set to ground potential; a plurality of planar electrodes arranged parallel to the ground electrode and arranged in a first direction; a dielectric provided between each of the signal line, the plurality of planar electrodes, and the ground electrode; and a plurality of connecting electrodes that are positioned between the plurality of planar electrodes and the ground electrode and connect the plurality of planar electrodes and the ground electrode. At least a portion of each of the plurality of connecting electrodes has a coil shape or a meandering shape.

Advantageous Effects of Invention

According to one aspect of the present disclosure, the multilayer device can widen the stopband through which the passage of signals is not allowed. Additionally, according to one aspect of the present disclosure, the multilayer device can inhibit an increase in the cost of the printed circuit board on which the multilayer device is mounted. Further additionally, according to another aspect of the present disclosure, the multilayer device can form a stopband in accordance with the required specifications.

DESCRIPTION OF EMBODIMENTS

1. Background Leading to the Present Disclosure and the Multilayer Device According to One Aspect of the Present Disclosure The background leading to the present disclosure and the multilayer device according to one aspect of the present disclosure will be described with reference to FIG. 1 and FIG. 2.

Figure 1:
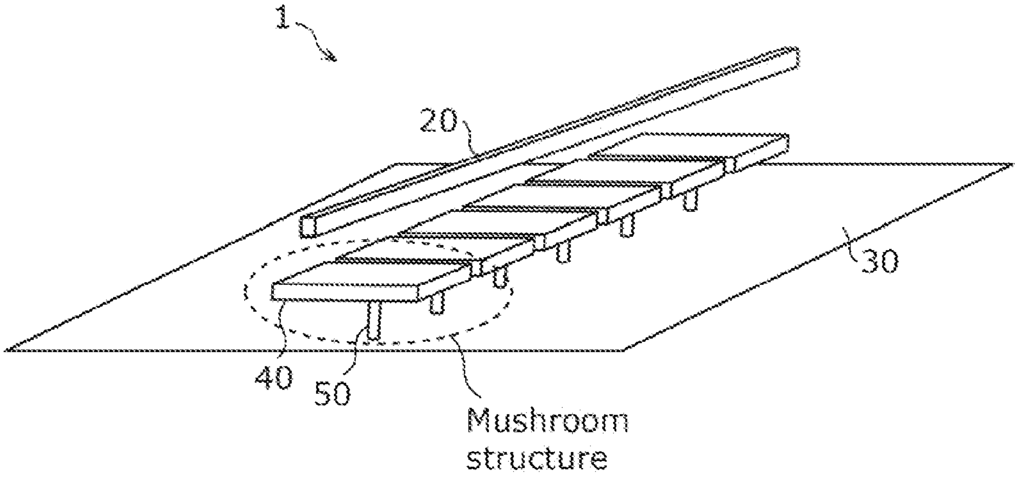
FIG. 1 is a perspective view illustrating one example of a multilayer device.

FIG. 1 is a perspective view illustrating one example of multilayer device 1.

As illustrated in FIG. 1, multilayer device 1 includes signal line 20 that transmits high-speed, high-frequency signals, ground electrode 30 that is set at ground potential, a plurality of planar electrodes 40 arranged along signal line 20, and a plurality of connecting electrodes 50 that connect ground electrode 30 and the plurality of planar electrodes 40. Signal line 20, ground electrode 30, planar electrodes 40, and connecting electrodes 50 are provided inside or on the surface of a dielectric (not illustrated in the drawings).

Figure 2:
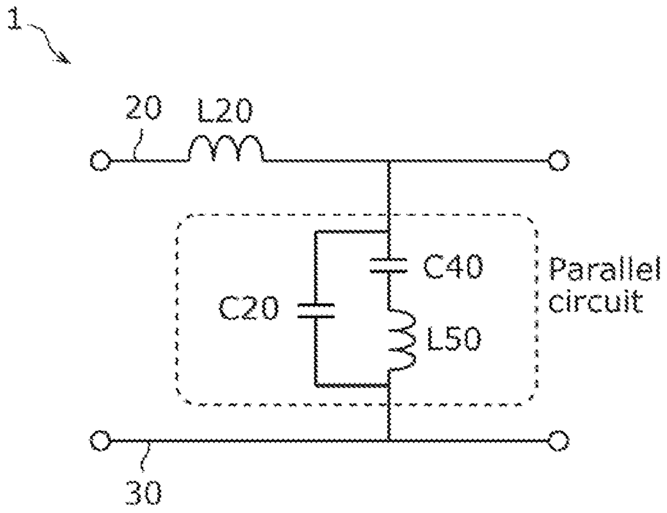
FIG. 2 illustrates one example of an equivalent circuit of the multilayer device illustrated in FIG. 1.

Multilayer device 1 has a structure in which a plurality of mushroom structures, each consisting of planar electrode 40 and connecting electrode 50, are arranged spaced sufficiently close together with respect to the wavelength of the electromagnetic waves. This structure, in which a plurality of mushroom structures are arranged spaced sufficiently close together with respect to the wavelength of the electromagnetic waves, is also referred to as an electromagnetic band-gap (EBG) structure. In multilayer device 1 having an electromagnetic band-gap (EBG) structure, the effective permittivity and permeability in the medium can be made negative. FIG. 2 illustrates one example of an equivalent circuit of multilayer device 1 illustrated in FIG. 1.

The equivalent circuit illustrated in FIG. 2 includes inductive component L20 of signal line 20 and a parallel circuit (parallel resonant circuit) provided between paths connecting signal line 20 and ground electrode 30. The parallel circuit includes capacitive component C40 based on signal line 20 and planar electrode 40, inductive component L50 realized by connecting electrode 50, and capacitive component C20 based on signal line 20 and ground electrode 30.

In multilayer device 1, by arranging a plurality of mushroom structures as illustrated in FIG. 1, the admittance of the parallel circuit illustrated in FIG. 2 can be controlled, and the permittivity can be made negative. In the band where the permittivity is negative, high-speed, high-frequency signals cannot propagate on the signal line, whereby multilayer device 1 functions as a bandstop filter.

However, as illustrated in FIG. 2, when a plurality of mushroom structures of the same size are arranged at the same pitch, the width of the stopband through which passage of high-speed, high-frequency signals is not allowed may be insufficient. In contrast, in order to widen the stopband through which passage of high-speed, high-frequency signals is not allowed, the multilayer device according to the present embodiment includes the configuration described below.

Hereinafter, Embodiments 1 through 7 will be described in detail with reference to the drawings.

The embodiments described below each illustrate one specific example of the present disclosure. The numerical values, shapes, materials, elements, the arrangement and connection of the elements, steps, order of the steps, etc., shown in the following embodiments are mere examples, and therefore do not limit the scope of the present disclosure. Accordingly, among the elements in the following embodiments, those not recited in any of the independent claims are described as optional elements.

In the present specification, terms indicating relationships between elements, such as "parallel", terms indicating shapes of elements, such as "cuboid", and numerical ranges are expressions that include, in addition to their exact meanings, substantially equivalent ranges, including differences of approximately a few percent, for example.

The figures are schematic illustrations, appropriately emphasized, omitted, or adjusted in ratio to represent the present disclosure, are not necessarily precise depictions, and may differ from actual shapes, positional relationships, and ratios. In the figures, the same reference signs are used for elements that are essentially the same. Accordingly, duplicate description may be omitted or simplified.

In the present specification, the terms "top surface" and "bottom surface" used with respect to the configuration of the multilayer device do not refer to the top surface (vertically upper surface) and the bottom surface (vertically lower surface) in terms of absolute spatial recognition, but are used as terms defined by the relative positional relationships between elements of the multilayer device.

1.1. Embodiment 1

[Multilayer Device Configuration]

First, the configuration of multilayer device 1A according to Embodiment 1 will be described with reference to FIG. 3 through FIG. 6.

Figure 3:
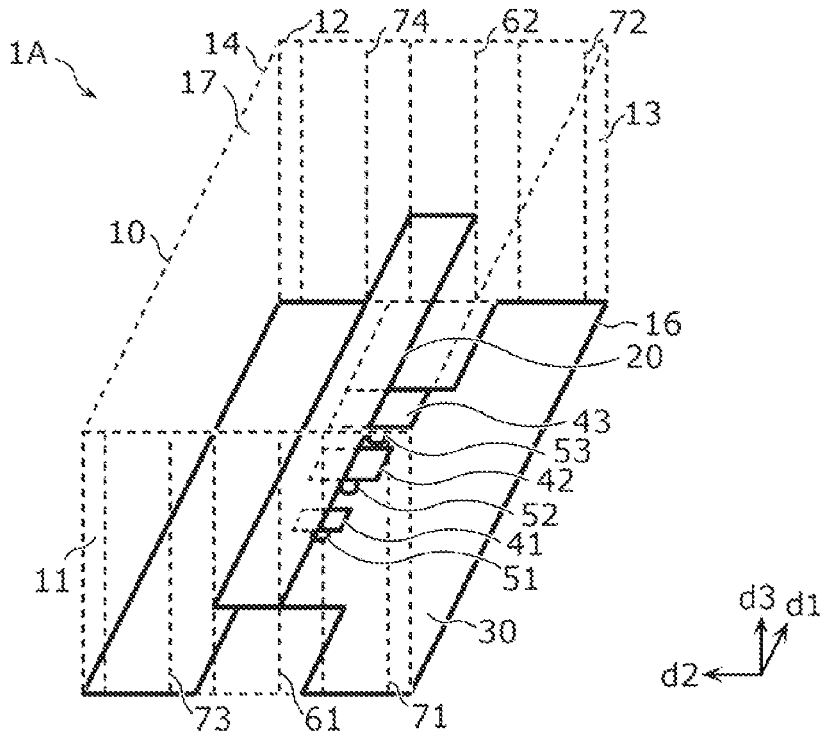
FIG. 3 is a perspective view schematically illustrating the multilayer device according to Embodiment 1.
Figure 4A:
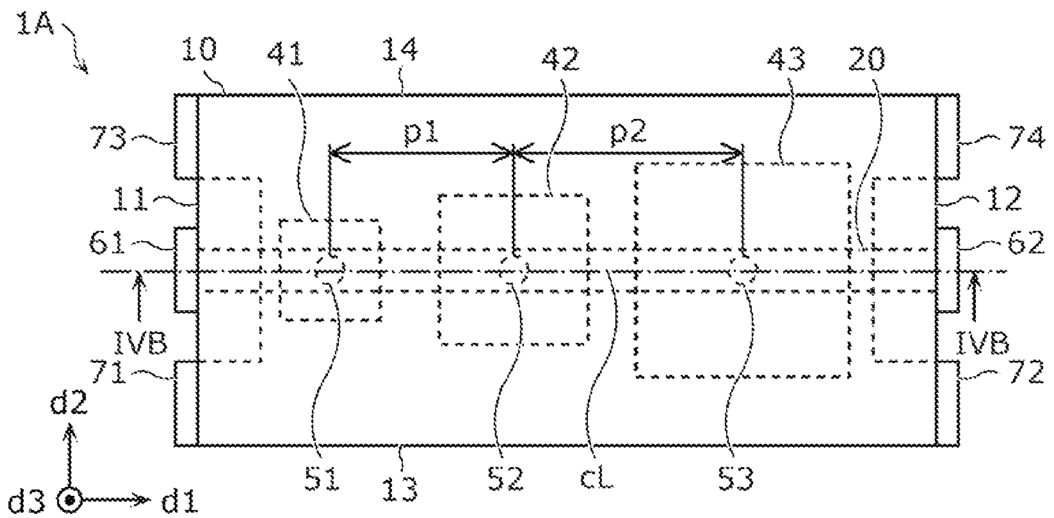
FIG. 4A is a top surface view of the multilayer device according to Embodiment 1.
Figure 4B:
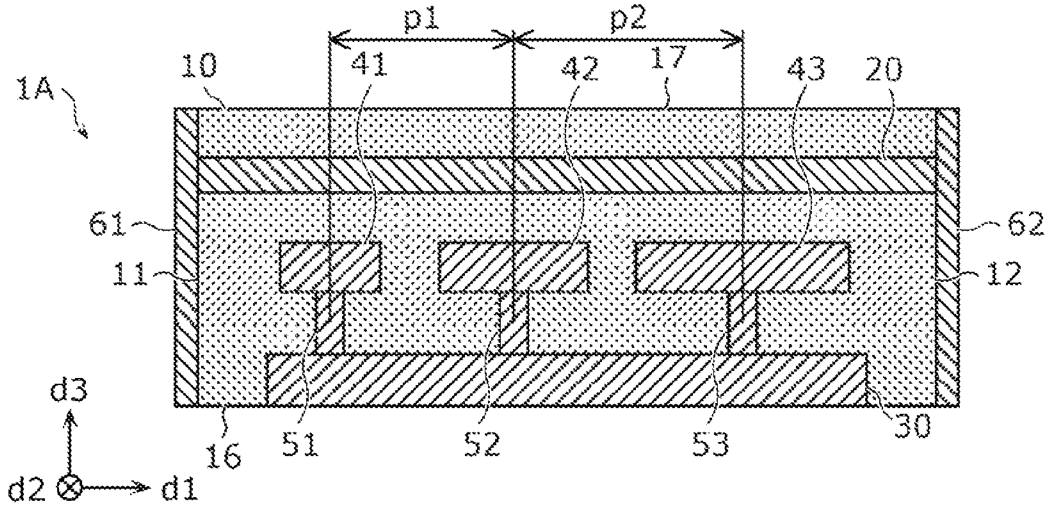
FIG. 4B is a cross-sectional view of the multilayer device according to Embodiment 1 taken at line IVB-IVB illustrated in FIG. 4A.
Figure 4C:
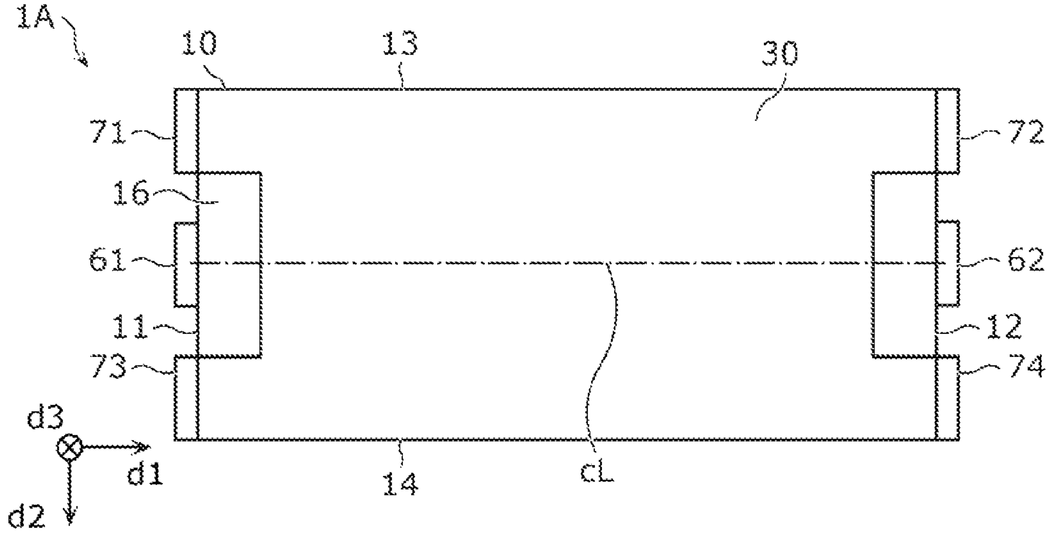
FIG. 4C is a bottom surface view of the multilayer device according to Embodiment 1.

FIG. 3 is a perspective view schematically illustrating multilayer device 1A according to Embodiment 1. FIG. 4A is a top surface view of multilayer device 1A. FIG. 4B is a cross-sectional view of multilayer device 1A taken at line IVB-IVB illustrated in FIG. 4A. FIG. 4C is a bottom surface view of multilayer device 1A. FIG. 3 illustrates the outline of multilayer device 1A in dashed lines, and illustration of the thicknesses of signal line 20, planar electrodes 41, 42, and 43, and ground electrode 30 are omitted. In FIG. 4A and FIG. 4B, signal line 20, planar electrodes 41, 42, and 43, and ground electrode 30 are illustrated in larger sizes than in FIG. 3.

As illustrated in FIG. 3 and FIG. 4A through FIG. 4C, multilayer device 1A includes dielectric 10, signal line 20, ground electrode 30, a plurality of planar electrodes 41, 42 and 43, and a plurality of connecting electrodes 51, 52 and 53. Multilayer device 1A also includes a plurality of signal terminals 61 and 62 and a plurality of ground terminals 71, 72, 73, and 74.

In the following, some or all of the plurality of planar electrodes 41 through 43 may be referred to simply as planar electrodes 40, and some or all of the plurality of connecting electrodes 51 through 53 may be referred to simply as connecting electrodes 50. In the following, some or all of the plurality of signal terminals 61 and 62 may be referred to simply as signal terminals 60, and some or all of the plurality of ground terminals 71 through 74 may be referred to simply as ground terminals 70.

For example, signal line 20, ground electrode 30, planar electrodes 40, and connecting electrodes 50 are formed of a metallic material such as silver or copper. Signal line 20, ground electrode 30, planar electrodes 40, and connecting electrodes 50 may be formed of the same material or using the same composition ratio, or of different materials or using different composition ratios.

Dielectric 10 is formed, for example, by stacking a plurality of dielectric layers. For example, dielectric 10 is formed of a dielectric material such as a low temperature co-fired ceramic (LTCC) material. The relative permittivity of dielectric 10 is, for example, 7, which is higher than the relative permittivity of a glass epoxy substrate. To make multilayer device 1A smaller, using a material with a high relative permittivity for dielectric 10 is desirable. Dielectric 10 is provided between each of signal line 20, ground electrode 30, planar electrodes 40, and connecting electrodes 50. Dielectric 10 is formed to cover the outer peripheral surface of signal line 20 except for the two end surfaces, as well as the electrode structures of planar electrodes 40 and connecting electrodes 50. Dielectric 10 is formed to cover the top surface of ground electrode 30 except for the bottom surface and both end surfaces.

Dielectric 10 has a cuboid shape and includes bottom surface 16, top surface 17 facing away from bottom surface 16, and a plurality of side surfaces 11, 12, 13, and 14 connecting bottom surface 16 and top surface 17. The plurality of side surfaces 11 through 14 include side surfaces 11 and 12 facing away from each other and side surfaces 13 and 14 orthogonal to both of side surfaces 11 and 12. Bottom surface 16 and top surface 17 are parallel to each other, side surfaces 11 and 12 are parallel to each other, and side surfaces 13 and 14 are parallel to each other. The corner portions (edge portions) where each face of dielectric 10 intersects may be rounded.

A direction in which side surface 11 and side surface 12 face away from each other is referred to as first direction d1, a direction in which side surface 13 and side surface 14 face away from each other is referred to as second direction d2, and a direction in which bottom surface 16 and top surface 17 face away from each other is referred to as third direction d3. Hereinafter, regarding the terms "one" and "the other", "one" may refer to an element on negative side of first direction d1, and "the other" may refer to an element on the positive side, which is opposite to the negative side, of first direction d1.

Signal line 20 is straight and extends in first direction d1, which is a direction from one end surface of dielectric 10 to the opposite end surface. Note that first direction d1 is a direction in which side surface 11 and side surface 12 face away from each other, as described above, and is the direction in which a straight line connecting the two ends of signal line 20 extends. Signal line 20 is provided inside dielectric 10 so that both ends, which are part of signal line 20, are exposed on the outer surface (side surfaces 11 and 12) of dielectric 10. Signal line 20 is strip-shaped and arranged parallel to ground electrode 30 (to be described later). In a state in which multilayer device 1A is mounted in an electronics device, high-speed, high-frequency signals are input to and output from signal line 20 via signal terminals 60.

Signal terminals 60 are provided on the outer surface (side surfaces 11 and 12) of dielectric 10. Signal terminal 61, which is one of the two signal terminals 61 and 62, is provided on side surface 11, and signal terminal 62, which is the other of the two signal terminals 61 and 62, is provided on side surface 12. The one signal terminal 61 is connected to one end of signal line 20, and the other signal terminal 62 is connected to the other end of signal line 20.

Ground electrode 30 is provided on bottom surface 16 of dielectric 10 and formed up to side surfaces 11 and 12. Ground electrode 30 is provided on bottom surface 16 at a predetermined distance from signal terminal 60 so as not to contact signal terminals 60. Ground electrode 30 may be provided inside dielectric 10 instead of on bottom surface 16, and part of ground electrode 30 may be exposed on side surfaces 11 and 12 of dielectric 10. In a state in which multilayer device 1A is mounted in an electronics device, ground electrode 30 is set to ground potential via ground terminal 70. Ground electrode 30 may have a structure with an aperture pattern, for example, a mesh structure, instead of a solid pattern. By giving ground electrode 30 a mesh structure, dielectrics 10 can be bonded to each other to improve bonding strength.

Ground terminals 70 are provided on the outer surface (side surfaces 11 and 12) of dielectric 10. Ground terminals 71 and 73, which constitute one set of the four ground terminals 71 through 74, are provided on side surface 11, and ground terminals 72 and 74, which constitute the other set of the four ground terminals 71 through 74, are provided on side surface 12. The one set of ground terminals 71 and 73 are connected to one end of ground electrode 30, and the other set of ground terminals 72 and 74 are connected to the other end of ground electrode 30. The one set of ground terminals 71 and 73 are arranged on both sides, in second direction d2, of the one signal terminal 61. The other set of ground terminals 72 and 74 are arranged on both sides, in second direction d2, of the other signal terminal 62. Stated differently, the one signal terminal 61 is arranged between two ground terminals 71 and 73, and the other signal terminal 62 is arranged between two ground terminals 72 and 74.

Note that the number of ground terminals 70 is not limited to four; the number of ground terminals 70 may be two. Ground terminals 70 may be provided one each on side surfaces 11 and 12 or side surfaces 13 and 14 of dielectric 10. For example, ground terminals 70 may be provided one each on side surfaces 11 and 12. In such cases, it is desirable to arrange ground terminals 70 on a diagonal line so that the mounting orientation does not need to be taken into consideration. Additionally, ground terminals 70 may not only be provided on side surfaces 11 and 12, but may also be provided on side surfaces 13 and 14. Moreover, ground terminals 70 may be provided only on side surfaces 13 and 14.

Planar electrode 40 is provided inside dielectric 10 so as to be positioned between signal line 20 and ground electrode 30 in third direction d3. Planar electrode 40 is arranged parallel to signal line 20 and ground electrode 30. The gap between planar electrode 40 and signal line 20 is smaller than the gap between ground electrode 30 and signal line 20. In the present embodiment, the gap between planar electrode 40 and signal line 20 is, for example, greater than or equal to 0.1 times and less than or equal to 0.5 times the gap between ground electrode 30 and signal line 20, but the size of this gap is set appropriately according to the stopband required for multilayer device 1A. The plurality of planar electrodes 40 are square-shaped planar electrodes. However, the shape of planar electrode 40 is not limited to square, and may be rectangular, polygonal, circular or elliptical.

The plurality of planar electrodes 41, 42, and 43 are arranged in this order in first direction d1, i.e., along signal line 20. Planar electrodes 41 through 43 are arranged so that the centers of planar electrodes 41 through 43 coincide with center line cl of signal line 20. The width (length in second direction d2) of each of planar electrodes 41 through 43 is greater than the width of signal line 20.

Connecting electrodes 50 are via conductors that connect planar electrodes 40 and ground electrode 30, and are provided inside dielectric 10. Connecting electrodes 50 are formed so as to penetrate dielectric 10 positioned between planar electrodes 40 and ground electrode 30. Connecting electrodes 50 are columnar, and the diameter of each connecting electrode 50 is larger than the thickness of each planar electrode 40. The length of each connecting electrode 50 is smaller than the gap between ground electrode 30 and signal line 20. Note that in this multilayer device 1A, changing the length of connecting electrodes 50 also changes the gap between planar electrodes 40 and signal line 20.

Connecting electrodes 51 through 53 are provided arranged in first direction d1 to correspond one-to-one with planar electrodes 41 through 43, respectively. More specifically, connecting electrode 51 is provided to connect planar electrode 41 and ground electrode 30, connecting electrode 52 is provided to connect planar electrode 42 and ground electrode 30, and connecting electrode 53 is provided to connect planar electrode 43 and ground electrode 30. Connecting electrodes 51 through 53 are connected to the respective centers of planar electrodes 41 through 43. Note that connecting electrodes 51 through 53 do not necessarily need to be connected to the respective centers of planar electrodes 41 through 43; they may be connected to the outer peripheral edge portions of planar electrodes 41 through 43.

In multilayer device 1A according to the present embodiment, in order to widen the stopband through which passage of high-speed, high-frequency signals is not allowed, at least one of the plurality of planar electrodes 40 or the plurality of connecting electrodes 50 includes two or more different types of electrode structures. Different types of electrode structures means, for example, a difference in at least one of the shape, size, or position of the plurality of electrodes.

First, the electrode structures of the plurality of planar electrodes 40 will be described. The plurality of planar electrodes 40 include two or more different types of electrode structures with respect to at least one of the opposing surface area between signal line 20 and planar electrodes 40 or the pitch of the plurality of planar electrodes 40 arranged in first direction d1.

As illustrated in FIG. 3 and FIG. 4A, the plurality of planar electrodes 41 through 43 are formed in different sizes. For example, the opposing surface area between signal line 20 and planar electrode 42 is larger than the opposing surface area between signal line 20 and planar electrode 41, and is at least 1.1 times the opposing surface area between signal line 20 and planar electrode 41. The opposing surface area between signal line 20 and planar electrode 43 is larger than the opposing surface area between signal line 20 and planar electrode 42, and is at least 1.1 times the opposing surface area between signal line 20 and planar electrode 42.

Thus, in the present embodiment, among the plurality of planar electrodes 40, at least one planar electrode (for example, planar electrode 41) has an opposing surface area with the signal line that is different than an opposing surface area between another planar electrode different from the at least one planar electrode (for example, planar electrode 42) and the signal line. This multilayer device 1A includes three different types of electrode structures with respect to the area of the plurality of planar electrodes 40. Therefore, a plurality of types of capacitive components C40 (see FIG. 2) based on signal line 20 and planar electrodes 40 can be generated.

This makes it possible to generate a stopband that includes a plurality of resonance points, thereby increasing the bandwidth of the stopband.

As illustrated in FIG. 4A and FIG. 4B, pairs of planar electrodes 40 that are adjacent to each other in first direction d1 are arranged at different pitches. The pitch of planar electrodes 40 is the center-to-center distance between two planar electrodes 40 that are adjacent to each other in first direction d1. Pitch p2 between planar electrodes 42 and 43 is greater than pitch p1 between planar electrodes 41 and 42. For example, pitch p2 is greater than or equal to 1.1 times pitch p1.

Thus, in the present embodiment, the center-to-center distance between one pair of planar electrodes (for example, planar electrodes 41 and 42) that are adjacent to each other in first direction d1 is different from the center-to-center distance between another pair of planar electrodes different from the one pair of planar electrodes (for example, planar electrodes 42 and 43). This multilayer device 1A includes two different types of electrode structures with respect to the pitch of the plurality of planar electrodes 40. Therefore, the length of signal line 20 corresponding to each pair of planar electrodes 40 and connecting electrodes 50 is different, allowing for the generation of a plurality of types of capacitive components C20 (see FIG. 2) based on signal line 20 and ground electrode 30. This makes it possible to generate a stopband that includes a plurality of resonance points, thereby increasing the bandwidth of the stopband.

Next, the electrode structures of the plurality of connecting electrodes 50 will be described with reference to FIG. 5 and FIG. 6. The plurality of connecting electrodes 50 may include two or more different types of electrode structures with respect to at least one of the cross-sectional area of the plurality of connecting electrodes 50 or the length of the plurality of connecting electrodes 50. The cross-sectional area of a connecting electrode 50 refers to the surface area of the cross-section taken perpendicular to conduction path connecting ground electrode 30 and planar electrode 40. The length of a connecting electrode 50 refers to the length of conduction path connecting ground electrode 30 and planar electrode 40.

Figure 5:
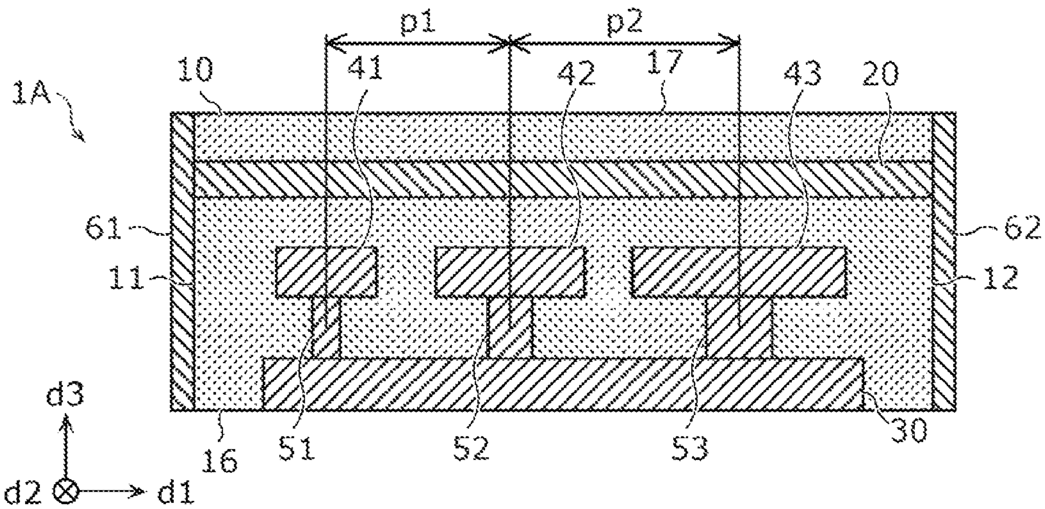
FIG. 5 is a cross-sectional view illustrating another example of the multilayer device according to Embodiment 1.

FIG. 5 is a cross-sectional view illustrating another example of multilayer device 1A.

As illustrated in FIG. 5, the plurality of connecting electrodes 51 through 53 are via conductors, and have different via diameters. For example, the cross-sectional area of connecting electrode 52 is larger than the cross-sectional area of connecting electrode 51, and is at least 1.1 times the cross-sectional area of connecting electrode 51. The cross-sectional area of connecting electrode 53 is larger than the cross-sectional area of connecting electrode 52, and is at least 1.1 times the area of connecting electrode 52. In order to widen the stopband and equalize attenuation in the stopband, the cross-sectional area of connecting electrode 52 may be less than or equal to 1.96 times the cross-sectional area of connecting electrode 51, and the cross-sectional area of connecting electrode 53 may be less than or equal to 1.65 times the cross-sectional area of connecting electrode 52.

Thus, among the plurality of connecting electrodes 50, at least one connecting electrode (for example, connecting electrode 51) has a different cross-sectional area than another connecting electrode different from the at least one connecting electrode (for example, connecting electrode 52). Multilayer device 1A illustrated in FIG. 5 includes three different types of electrode structures with respect to the cross-sectional area of the plurality of connecting electrodes 50. Therefore, a plurality of types of inductive components L50 (see FIG. 2) based on connecting electrodes 50 can be generated. This makes it possible to generate a stopband that includes a plurality of resonance points, thereby increasing the bandwidth of the stopband.

Figure 6:
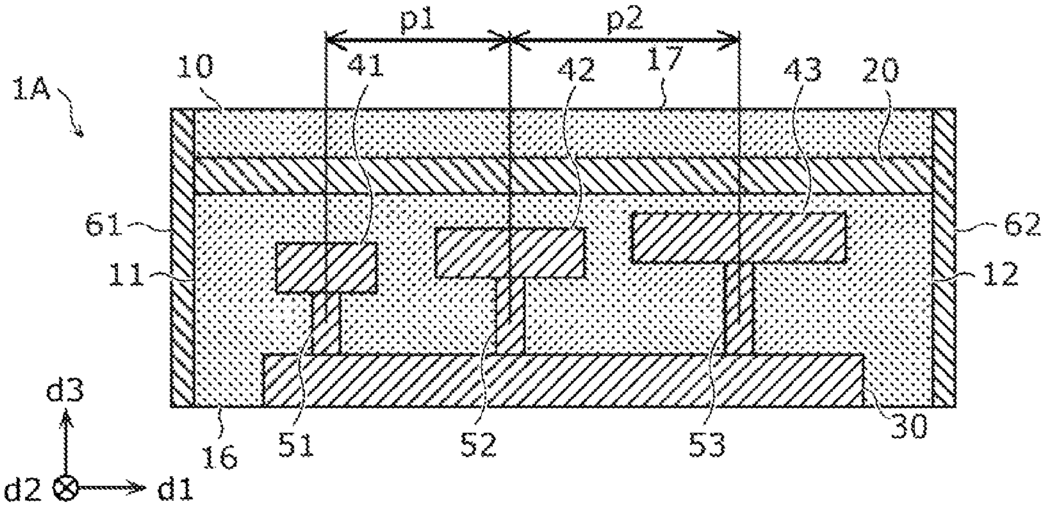
FIG. 6 is a cross-sectional view illustrating another example of the multilayer device according to Embodiment 1.

FIG. 6 is a cross-sectional view illustrating another example of multilayer device 1A.

As illustrated in FIG. 6, the plurality of connecting electrodes 51 through 53 are formed in different lengths. For example, the length of connecting electrode 52 is longer than the length of connecting electrode 51, and is at least 1.1 times the length of connecting electrode 51. The length of connecting electrode 53 is longer than the length of connecting electrode 52, and is at least 1.1 times the length of connecting electrode 52.

Thus, among the plurality of connecting electrodes 50, at least one connecting electrode (for example, connecting electrode 51) has a different length than another connecting electrode different from the at least one connecting electrode (for example, connecting electrode 52). Multilayer device 1A illustrated in FIG. 6 includes three different types of electrode structures with respect to the length of the plurality of connecting electrodes 50. Therefore, a plurality of types of inductive components L50 based on connecting electrodes 50 can be generated. By varying the lengths of connecting electrodes 50, the gap between signal line 20 and planar electrodes 40 can be varied, thus generating a plurality of types of capacitive components C40 based on signal line 20 and planar electrodes 40. This makes it possible to generate a stopband that includes a plurality of resonance points, thereby increasing the bandwidth of the stopband.

Thus, in multilayer device 1A according to the present embodiment, at least one of the plurality of planar electrodes 40 or the plurality of connecting electrodes 50 includes two or more different types of electrode structures. Therefore, in multilayer device 1A, a plurality of types of capacitive components C40, inductive components L50, and capacitive components C20 can be generated. This makes it possible to generate a stopband that includes a plurality of resonance points, thereby increasing the stopband through which passage of high-speed, high-frequency signals is not allowed.

[Multilayer Device Manufacturing Method]

Next, one example of a manufacturing method of multilayer device 1A will be described. First, after forming a plurality of via holes in a green sheet containing dielectric material, electrode material is embedded in the via holes by, for example, screen printing to form a plurality of connecting electrode patterns. A plurality of different types of planar electrode patterns, ground electrode patterns, or signal line patterns are formed on other green sheets by, for example, screen printing. A plurality of green sheets with electrode patterns fabricated in this manner are stacked and pressed to form a mother stack. Next, the mother stack is singulated by a cutting process, and the singulated stacks are fired. Then, signal terminals and ground terminals are formed on the side surfaces of the fired stacks. This fabricates the above-described multilayer device 1A.

[Variation 1 of Embodiment 1]

First, the configuration of multilayer device 1B according to Variation 1 of Embodiment 1 will be described with reference to FIG. 7A and FIG. 7B. Variation 1 describes an example in which planar electrodes 40 are provided on the top surface 17 side of signal line 20.

Figure 7A:
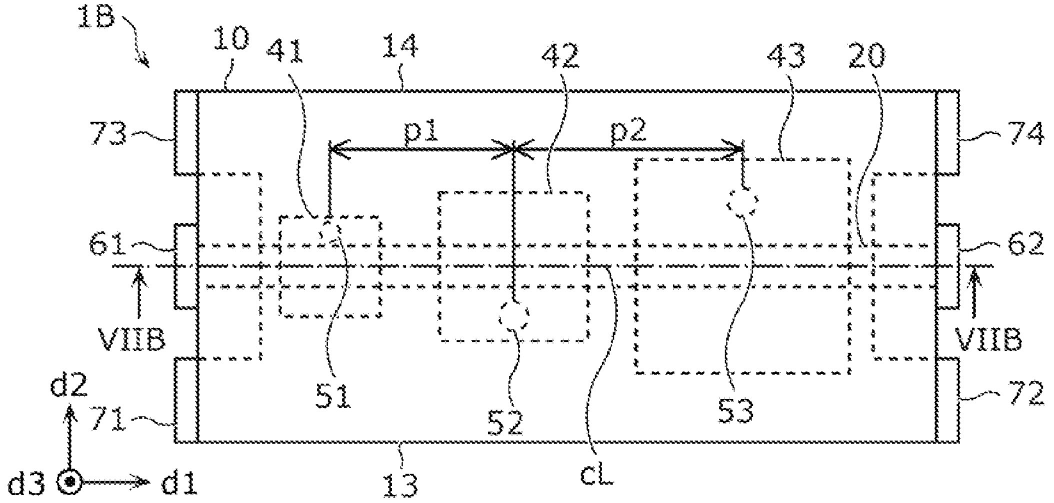
FIG. 7A is a top surface view of the multilayer device according to Variation 1 of Embodiment 1.

FIG. 7A is a top surface view of multilayer device 1B according to Variation 1 of Embodiment 1. FIG. 7B is a cross-sectional view of multilayer device 1B taken at line VIIB-VIIB illustrated in FIG. 7A.

Figure 7B:
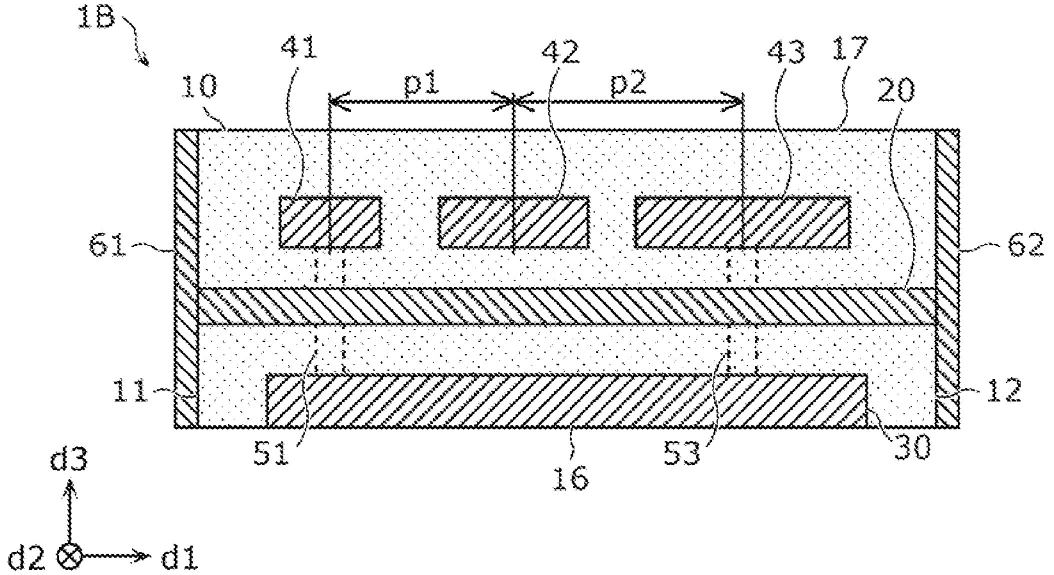
FIG. 7B is a cross-sectional view of the multilayer device according to Variation 1 of Embodiment 1 taken at line VIIB-VIIB illustrated in FIG. 7A.

As illustrated in FIG. 7A and FIG. 7B, multilayer device 1B includes dielectric 10, signal line 20, ground electrode 30, a plurality of planar electrodes 41, 42 and 43, and a plurality of connecting electrodes 51, 52 and 53. Multilayer device 1B also includes a plurality of signal terminals 61 and 62 and a plurality of ground terminals 71, 72, 73, and 74.

Dielectric 10, ground electrode 30, signal line 20, signal terminals 61 and 62, and ground terminals 71 through 74 are the same as in Embodiment 1.

The plurality of planar electrodes 40 according to Variation 1 are provided on the top surface 17 side of signal line 20, i.e., the side, with respect to third direction d3, of signal line 20 adjacent to top surface 17. Stated differently, the plurality of planar electrodes 40 are arranged on the opposite side of signal line 20 relative to the side on which ground electrode 30 is provided. Signal line 20 is arranged between the plurality of planar electrodes 40 and ground electrode 30.

The plurality of planar electrodes 41, 42, and 43 are arranged in this order in first direction d1, i.e., along signal line 20. Planar electrodes 41 through 43 are arranged so that the centers of planar electrodes 41 through 43 coincide with center line cl of signal line 20. The width (length in second direction d2) of each of planar electrodes 41 through 43 is greater than the width of signal line 20.

The plurality of connecting electrodes 50 are conductors that connect the plurality of planar electrodes 40 and ground electrode 30. Each connecting electrode 50 is formed so as to penetrate dielectric 10 positioned between a corresponding one of the plurality of planar electrodes 40 and ground electrode 30. Connecting electrodes 50 are columnar. To prevent connecting electrodes 50 from contacting signal line 20, the diameter of connecting electrodes 50 is smaller than (width of planar electrode 40−width of signal line 20)/2. The length of each connecting electrode 50 is larger than the gap between ground electrode 30 and signal line 20. In this multilayer device 1B as well, changing the length of connecting electrodes 50 also changes the gap between planar electrodes 40 and signal line 20.

Connecting electrodes 51 through 53 are provided arranged in first direction d1 to correspond one-to-one with planar electrodes 41 through 43, respectively. Connecting electrodes 51 through 53 are connected to the outer peripheral edge portions of planar electrodes 41 through 43, so as not to come into contact with signal line 20. More specifically, connecting electrode 51 is connected to the outer peripheral edge portion of planar electrode 41 on the side surface 14 side of center line cl of signal line 20, connecting electrode 52 is connected to the outer peripheral edge portion of planar electrode 42 on the side surface 13 side of center line cl of signal line 20, and connecting electrode 53 is connected to the outer peripheral edge portion of planar electrode 43 on the side surface 14 side of center line cl of signal line 20. Note that connecting electrodes 50 may be uniformly arranged on the same side, i.e., on the side surface 13 side or the side surface 14 side.

In multilayer device 1B according to Variation 1 as well, at least one of the plurality of planar electrodes 40 or the plurality of connecting electrodes 50 includes two or more different types of electrode structures. Therefore, in multilayer device 1B, a plurality of types of capacitive components C40, inductive components L50, and capacitive components C20 can be generated. This makes it possible to generate a stopband that includes a plurality of resonance points, thereby increasing the stopband through which passage of high-speed, high-frequency signals is not allowed.

[Advantageous Effects, Etc.]

The advantageous effects of multilayer device 1B having the above-described configuration will be described by way of comparison and contrast with multilayer devices 101*a*, 101*b*, and 101*c* according to reference examples.

Figure 8:
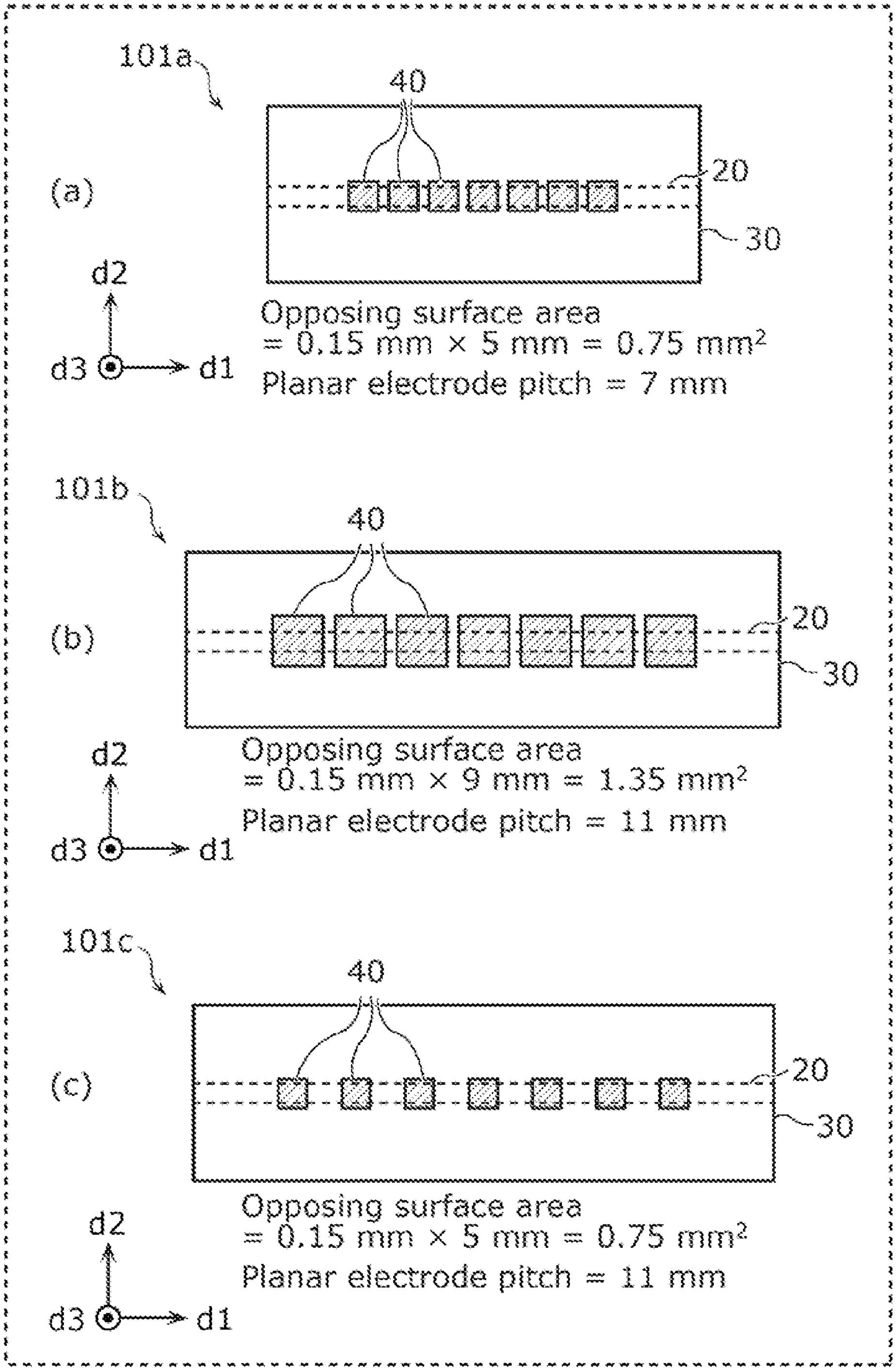
FIG. 8 illustrates a reference example multilayer device.

FIG. 8 illustrates reference example multilayer devices 101*a* to 101*c*.

As illustrated in (a), (b), and (c) in FIG. 8, multilayer devices 101*a*, 101*b*, and 101*c* each include signal line 20, ground electrode 30, a plurality of planar electrodes 40, and a plurality of connecting electrodes (not illustrated in the drawings). Signal line 20 is provided between the plurality of planar electrodes 40 and ground electrode 30, similar to multilayer device 1B according to Variation 1. The connecting electrodes connect planar electrodes 40 and ground electrode 30 in a manner that avoids signal line 20. The width of signal line 20 is 0.15 mm.

Reference example multilayer device 101*a* includes seven planar electrodes 40. The opposing surface area between signal line 20 and each of planar electrodes 40 is 0.75 mm$^2$ (=0.15 mm×5 mm). Two adjacent planar electrodes 40 are arranged with a spacing of 2 mm, and the pitch of planar electrodes 40 is 7 mm.

Reference example multilayer device 101*b* includes seven planar electrodes 40. The opposing surface area between signal line 20 and each of planar electrodes 40 is 1.35 mm$^2$ (=0.15 mm×9 mm). Two adjacent planar electrodes 40 are arranged with a spacing of 2 mm, and the pitch of planar electrodes 40 is 11 mm.

Reference example multilayer device 101*c* includes seven planar electrodes 40. The opposing surface area between signal line 20 and each of planar electrodes 40 is 0.75 mm$^2$ (=0.15 mm×5 mm). Two adjacent planar electrodes 40 are arranged with a spacing of 6 mm, and the pitch of planar electrodes 40 is 11 mm.

The relative permittivity of the substrate material of the multilayer device is 4.3, and the number of substrate layers is 6. The conductor thickness is 32 μm (12 μm copper foil and 20 μm plating). Core and prepreg thickness is 200 μm. The overall thickness of the multilayer device is approximately 1.2 mm ((conductors: 6×32 μm)+(dielectrics: 200 μm×5)).

Figure 9:
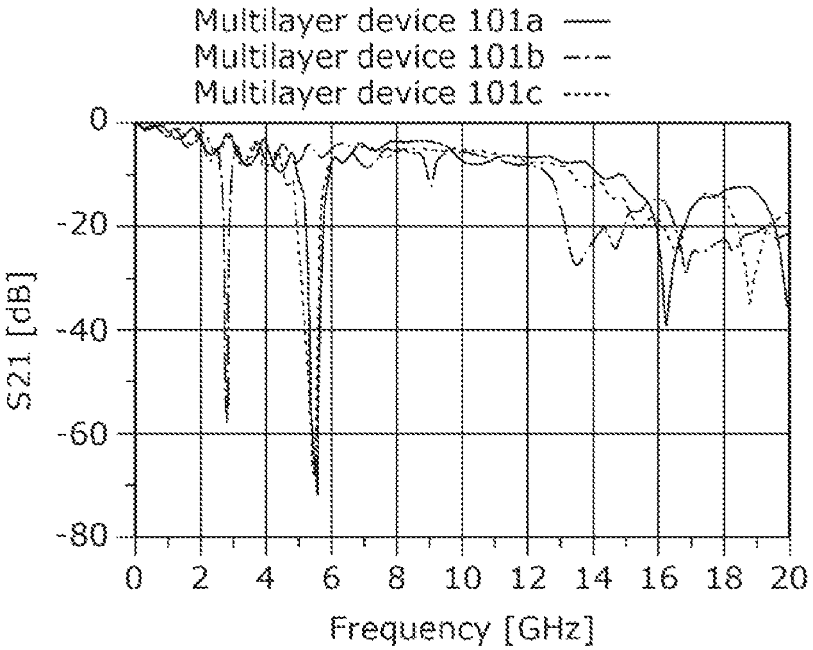
FIG. 9 illustrates the pass-through characteristics of a reference example multilayer device.

FIG. 9 illustrates the pass-through characteristics of reference example multilayer devices 101*a* to 101*c*.

As illustrated in FIG. 9, multilayer device 101*a* in (a) in FIG. 8 has an attenuation pole at a frequency of 5.56 GHZ, and insertion loss is greatest at this attenuation pole. Multilayer device 101*a* is capable of stopping the passage of signals with a frequency of 5.56 GHZ. Multilayer device 101*b* in (b) in FIG. 8 has an attenuation pole at a frequency of 2.80 GHZ, and insertion loss is greatest at this attenuation pole. Multilayer device 101*b* is capable of stopping the passage of signals with a frequency of 2.80 GHz. Multilayer device 101*c* in (c) in FIG. 8 has an attenuation pole at a frequency of 5.44 GHz, and insertion loss is greatest at this attenuation pole. Multilayer device 101*c* is capable of stopping the passage of signals with a frequency of 5.44 GHZ.

Thus, each of multilayer devices 101*a* through 101*c* in (a) through (c) in FIG. 8 can stop the passage of signals of a predetermined frequency corresponding to the attenuation pole.

Variation 2 of Embodiment 1

Figure 10:
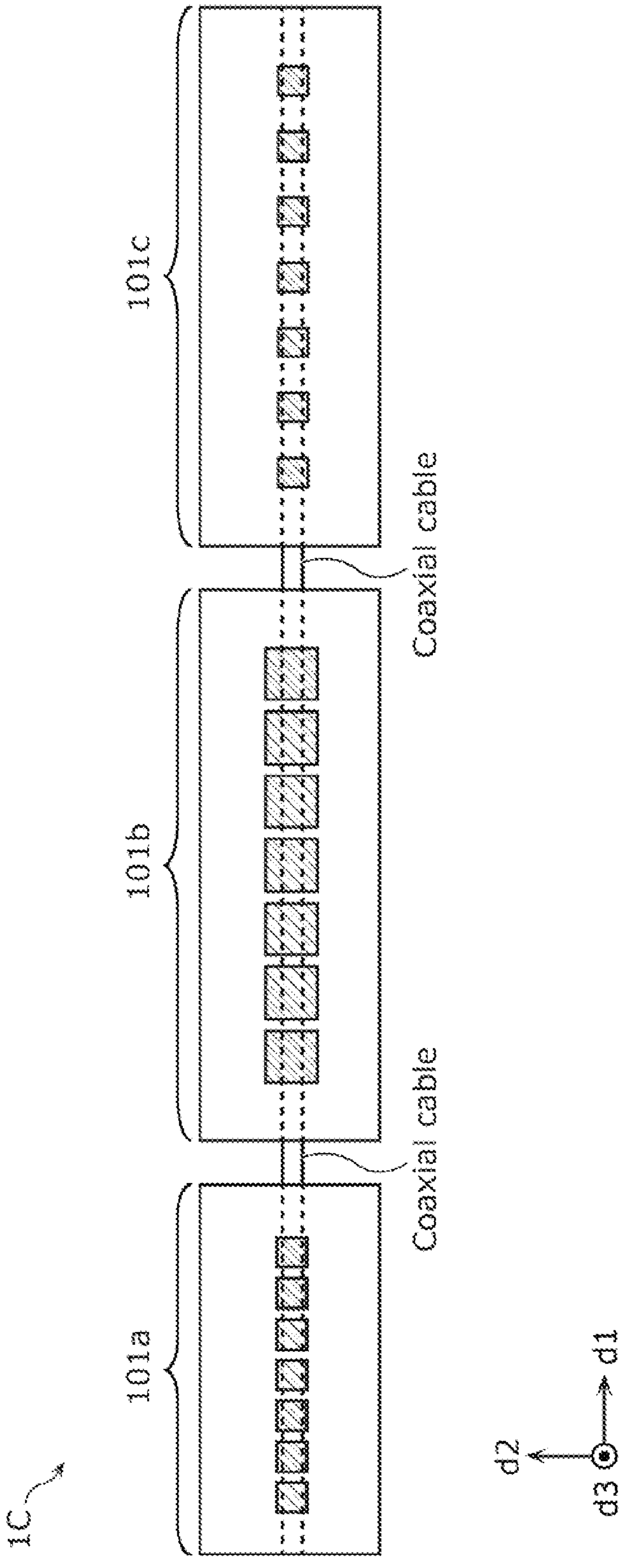
FIG. 10 illustrates the multilayer device according to Variation 2 of Embodiment 1.

FIG. 10 illustrates multilayer device 1C according to Variation 2 of Embodiment 1. Multilayer device 1C according to Variation 2 includes the three multilayer devices 101*a* through 101*c* illustrated in FIG. 8 connected in series.

Multilayer device 1C according to Variation 2 is realized by connecting the output port of multilayer device 101*a* to the input port of multilayer device 101*b* with a coaxial cable and connecting the output port of multilayer device 101*b* to the input port of multilayer device 101*c* with another coaxial cable. Multilayer device 1C according to Variation 2 includes a plurality of types of electrode structures with different opposing surface areas between signal line 20 and planar electrodes 40 and different pitches between planar electrodes 40. More specifically, multilayer device 1C includes a plurality of sets of structures each including two or more structures with different opposing surface areas between signal line 20 and planar electrodes 40, and a plurality of sets of structures each including two or more structures with different pitches between planar electrodes 40.

Figure 11:
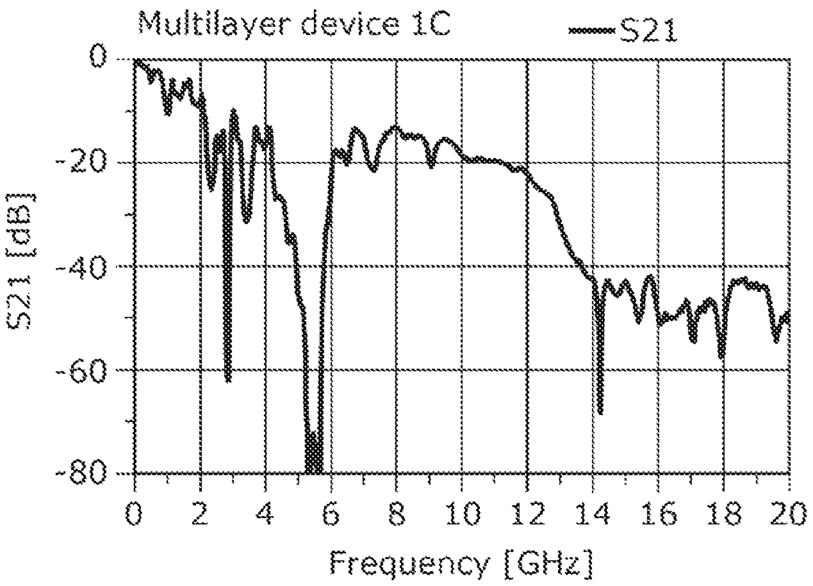
FIG. 11 illustrates the pass-through characteristics of the multilayer device according to Variation 2 of Embodiment 1.

FIG. 11 illustrates the pass-through characteristics of multilayer device 1C according to Variation 2. The S parameter (S21) is represented on the vertical axis in FIG. 11.

As illustrated in FIG. 11, multilayer device 1C according to Variation 2 has two attenuation poles in the range of 5.44 GHz to 5.56 GHz, and the insertion loss increases in this range. Multilayer device 1C according to Variation 2 is capable of stopping the passage of signals in the frequency range of around 5.44 GHz to 5.56 GHZ, and has a wider stopband bandwidth compared to reference example multilayer devices 101*a* through 101*c*.

Variation 3 of Embodiment 1

Next, multilayer device 1D according to Variation 3 of Embodiment 1 will be described.

Figure 12:
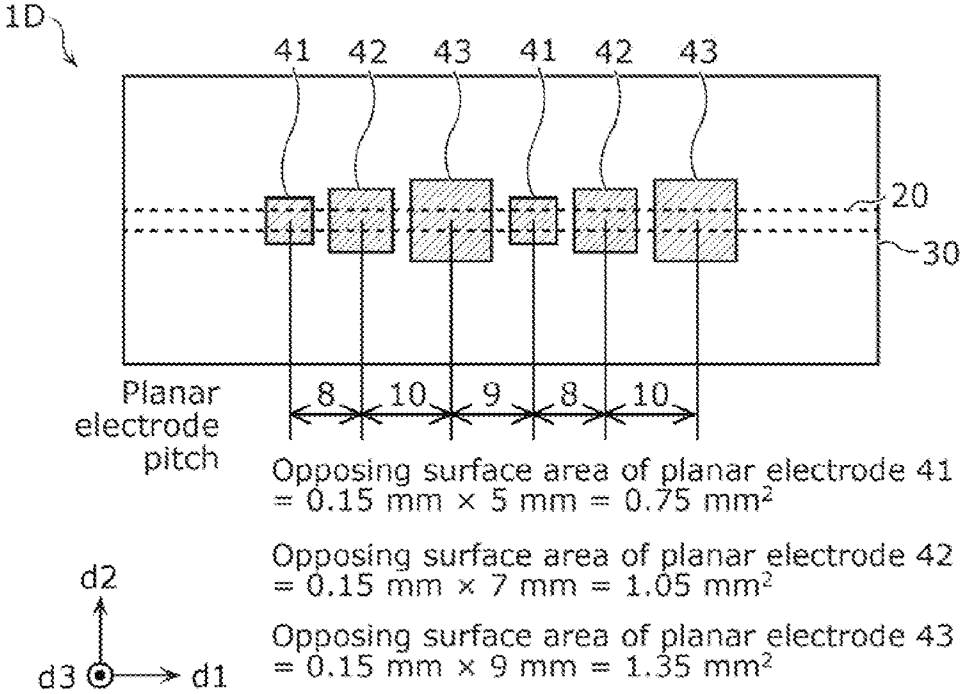
FIG. 12 illustrates the multilayer device according to Variation 3 of Embodiment 1.

FIG. 12 illustrates multilayer device 1D according to Variation 3.

Multilayer device 1D according to Variation 3 includes a plurality of planar electrodes 41 through 43 with different opposing surface areas between signal line 20 and planar electrodes 40 and different pitches between the planar electrodes. The other configurations related to signal line 20, ground electrode 30, planar electrodes 40, and connecting electrodes 50 are the same as in Variation 1. Note that the width of signal line 20 is 0.15 mm.

Multilayer device 1D according to Variation 3 includes six planar electrodes 41 through 43. The opposing surface area between signal line 20 and planar electrode 41 is 0.75 $mm^2$ (=0.15 mm×5 mm), the opposing surface area between signal line 20 and planar electrode 42 is 1.05 $mm^2$ (=0.15 mm×7 mm), and the opposing surface area between signal line 20 and planar electrode 43 is 1.35 $mm^2$ (=0.15 mm×9 mm). The plurality of planar electrodes 41, 42, and 43 are arranged repeatedly in this order, and the pitch of planar electrodes 40 is 8 mm, 10 mm, 9 mm, 8 mm, and 10 mm, in the listed order. Two adjacent planar electrodes 40 are arranged with a spacing of 2 mm. Multilayer device 1D includes a plurality of sets of structures each including two or more structures with different opposing surface areas between signal line 20 and planar electrodes 40, and a plurality of sets of structures each including two or more structures with different pitches between planar electrodes 40.

Figure 13:
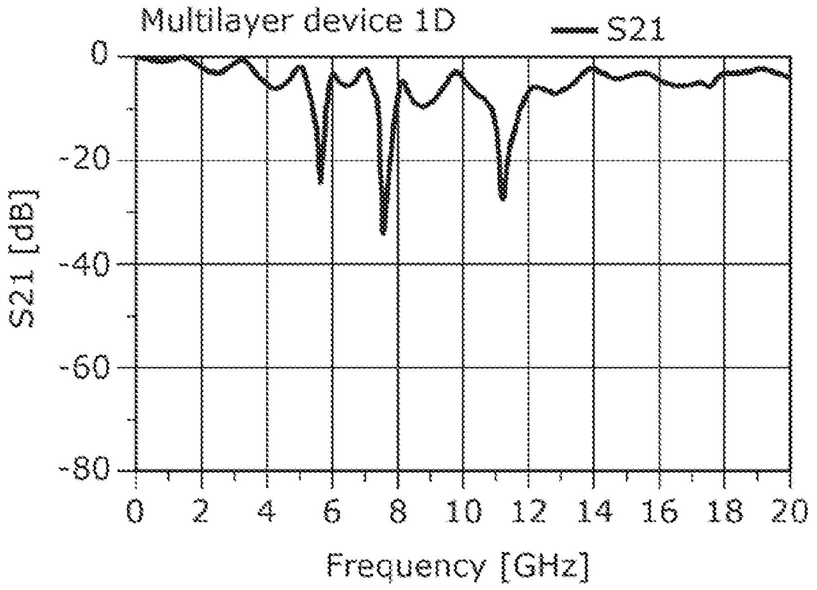
FIG. 13 illustrates the pass-through characteristics of the multilayer device according to Variation 3 of Embodiment 1.

FIG. 13 illustrates the pass-through characteristics of multilayer device 1D according to Variation 3. The S parameter (S21) is represented on the vertical axis in FIG. 13.

As illustrated in FIG. 13, multilayer device 1D according to Variation 3 has three attenuation poles, and the insertion loss increases at each of these attenuation poles. Multilayer device 1D according to Variation 3 includes a plurality of mushroom structures, which enables it to stop the passage of signals at a plurality of predetermined frequencies by the corresponding plurality of attenuation poles of the structures. By arranging each attenuation pole according to the desired characteristics, for example, multilayer device 1D including a wide stopband can be realized.

Variation 4 of Embodiment 1

Next, multilayer device 1E according to Variation 4 of Embodiment 1 will be described.

Figure 14:
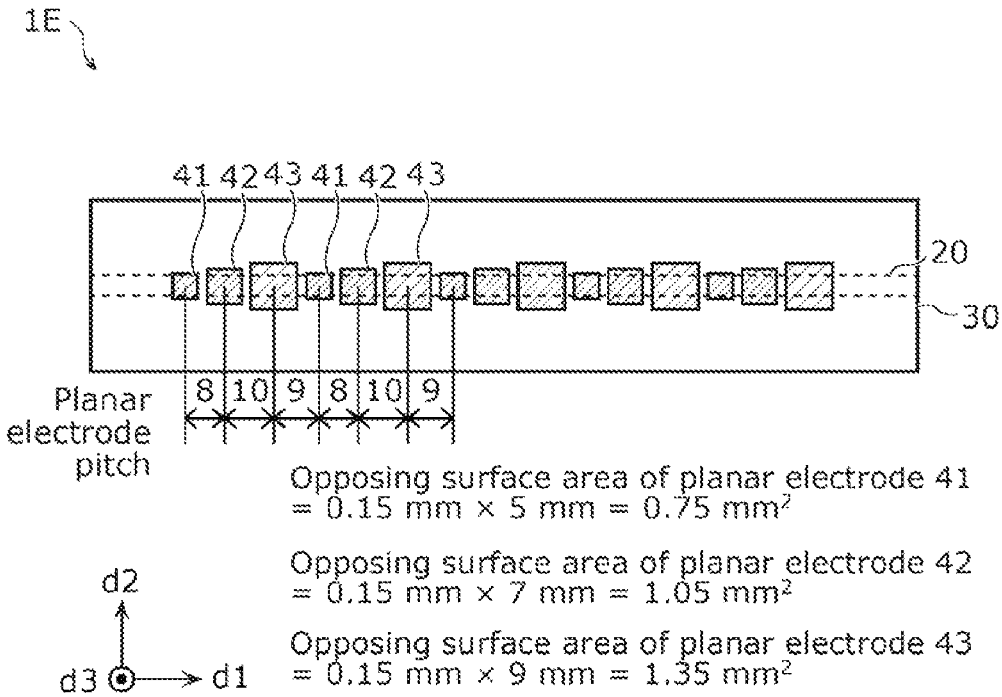
FIG. 14 illustrates the multilayer device according to Variation 4 of Embodiment 1.

FIG. 14 illustrates multilayer device 1E according to Variation 4.

Multilayer device 1E according to Variation 4 includes a plurality of planar electrodes 41 through 43 with different opposing surface areas between signal line 20 and planar electrodes 40 and different pitches between planar electrodes 40. The other configurations related to signal line 20, ground electrode 30, planar electrodes 40, and connecting electrodes 50 are the same as in Variation 1.

Multilayer device 1E according to Variation 4 includes fifteen planar electrodes 41 through 43. The opposing surface area of planar electrode 41 is 0.75 $mm^2$, the opposing surface area of planar electrode 42 is 1.05 $mm^2$, and the opposing surface area of planar electrode 43 is 1.35 $mm^2$. The plurality of planar electrodes 41, 42, and 43 are arranged repeatedly in this order, and the pitch of planar electrodes 40 is 8 mm, 10 mm, 9 mm, 8 mm, 10 mm, and 9 mm (hereinafter the same), in the listed order. Two adjacent planar electrodes 40 are arranged with a spacing of 2 mm. Multilayer device 1E includes a plurality of sets of structures each including two or more structures with different opposing surface areas between signal line 20 and planar electrodes 40, and a plurality of sets of structures each including two or more structures with different pitches between planar electrodes 40.

Figure 15:
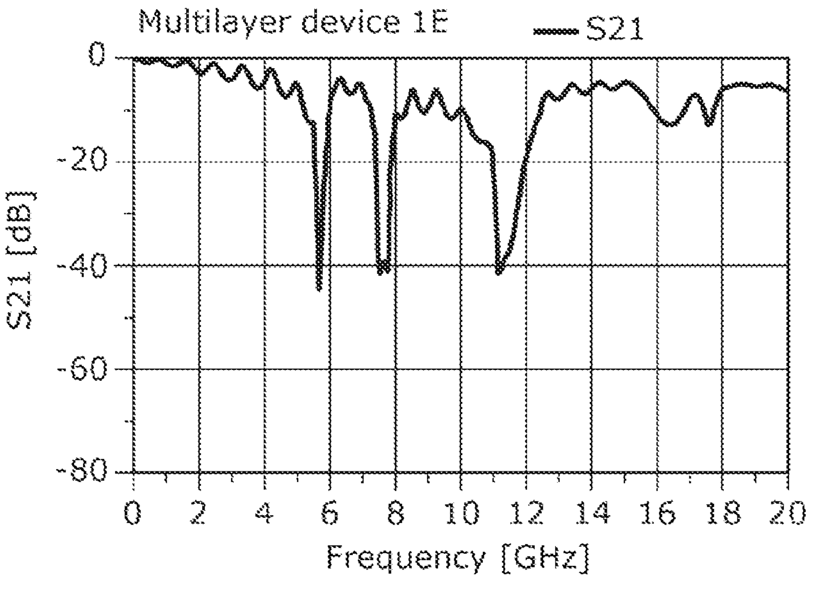
FIG. 15 illustrates the pass-through characteristics of the multilayer device according to Variation 4 of Embodiment 1.

FIG. 15 illustrates the pass-through characteristics of multilayer device 1E according to Variation 4. The S parameter (S21) is represented on the vertical axis in FIG. 15.

As illustrated in FIG. 15, multilayer device 1E according to Variation 4 has a plurality of attenuation poles, and the insertion loss increases at each of these attenuation poles. Multilayer device 1E according to Variation 4 can stop the passage of signals at a plurality of predetermined frequencies via the plurality of attenuation poles. Furthermore, by arranging many mushroom structures, it is possible to secure a greater attenuation and achieve higher performance compared to multilayer device 1D according to Variation 3.

1.2. Embodiment 2

[Multilayer Device Configuration]

First, the configuration of multilayer device 1F according to Embodiment 2 will be described with reference to FIG. 16. Embodiment 2 pertains to an example in which multilayer device 1F has a multilayer structure.

Figure 16:
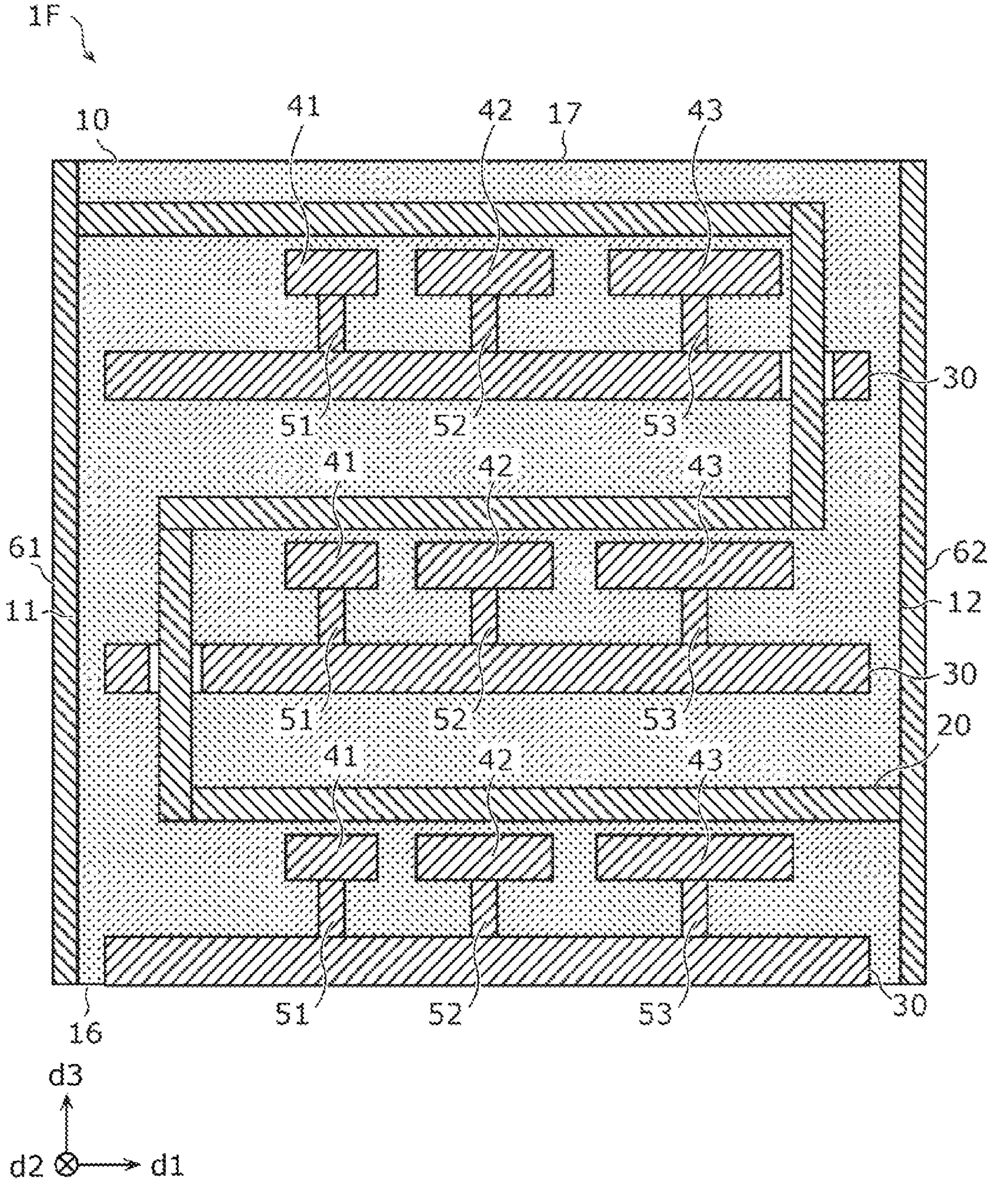
FIG. 16 is a cross-sectional view illustrating the multilayer device according to Embodiment 2.

FIG. 16 is a cross-sectional view illustrating multilayer device 1F according to Embodiment 2.

As illustrated in FIG. 16, multilayer device 1F includes dielectric 10, signal line 20, a plurality of ground electrodes 30, a plurality of planar electrodes 41, 42 and 43, and a plurality of connecting electrodes 51, 52 and 53. Multilayer device 1F also includes a plurality of signal terminals 61 and 62 and a plurality of ground terminals 71, 72, 73, and 74.

Multilayer device 1F has a multilayer structure achieved by stacking a plurality of stacks each of which includes signal line 20, ground electrode 30, a plurality of planar electrodes 40, and a plurality of connecting electrodes 50.

Dielectric 10 is formed, for example, by stacking a plurality of dielectric layers. Dielectric 10 is provided between each of signal line 20, ground electrode 30, planar electrodes 40, and connecting electrodes 50.

Signal line 20 includes a plurality of layers of signal lines. Signal line 20 consists of signal lines in the first, second, and third layers, as well as via conductors connecting the signal lines of the first and second layers and the signal lines of the second and third layers. The other end of the signal line in the first layer is connected to the other signal terminal 62, and the one end of the signal line in the third layer is connected to the one signal terminal 61.

The plurality of ground electrodes 30 are provided on bottom surface 16 or inside of dielectric 10. More specifically, of the plurality of ground electrodes 30, ground electrode 30 in the first layer is provided on bottom surface 16 of dielectric 10, while ground electrodes 30 in the second and third layers are provided inside dielectric 10. Ground electrodes 30 in the second and third layers are provided with through holes for the via conductors of signal line 20 to pass through, so that they do not contact the via conductors of signal line 20. The one end of each ground electrode 30 is connected to one set of ground terminals 71 and 73, and the other end of each ground electrode 30 is connected to the other set of ground terminals 72 and 74 (not illustrated in the drawings).

The plurality of planar electrodes 40 include planar electrodes 41 through 43 in the first layer, planar electrodes 41 through 43 in the second layer, and planar electrodes 41 through 43 in the third layer. The plurality of planar electrodes 40 are arranged in the order of planar electrodes 41, 42, and 43 for each of signal lines 20 of the three layers.

The plurality of connecting electrodes 50 include connecting electrodes 51 through 53 in the first layer, connecting electrodes 51 through 53 in the second layer, and connecting electrodes 51 through 53 in the third layer. The plurality of connecting electrodes 50 are arranged in the order of connecting electrodes 51, 52, and 53 to correspond one-to-one with planar electrodes 41 through 43 of each layer.

In multilayer device 1F according to Embodiment 2 as well, at least one of the plurality of planar electrodes 40 or the plurality of connecting electrodes 50 includes two or more different types of electrode structures. Therefore, in multilayer device 1F, a plurality of types of capacitive components C40, inductive components L50, and capacitive components C20 can be generated. This makes it possible to generate a stopband that includes a plurality of resonance points, thereby increasing the stopband through which passage of high-speed, high-frequency signals is not allowed.

1.3. Embodiment 3

[Multilayer Device Configuration]

First, the configuration of multilayer device 1G according to Embodiment 3 will be described with reference to FIG. 17. Embodiment 3 pertains to an example in which multilayer device 1G is a common mode filter.

Figure 17:
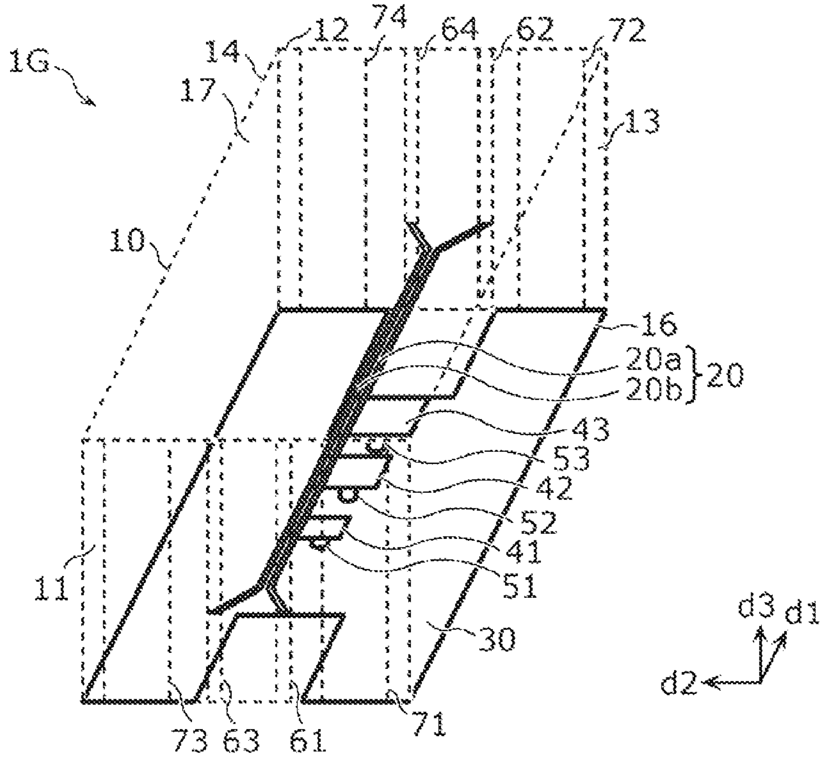
FIG. 17 is a perspective view schematically illustrating the multilayer device according to Embodiment 3.

FIG. 17 is perspective view schematically illustrating multilayer device 1G according to Embodiment 3.

As illustrated in FIG. 17, multilayer device 1G includes dielectric 10, signal line 20, ground electrode 30, a plurality of planar electrodes 41, 42 and 43, and a plurality of connecting electrodes 51, 52 and 53. Multilayer device 1G also includes a plurality of signal terminals 61, 62, 63, and 64 and a plurality of ground terminals 71, 72, 73, and 74.

Dielectric 10, ground electrode 30, and ground terminals 71 through 74 are the same as in Embodiment 1.

Signal line 20 is a differential line consisting of two parallel signal lines 20*a* and 20*b* provided in or on dielectric 10. Each signal line 20*a* and 20*b* is straight and is provided inside dielectric 10 in first direction d1. Each of signal lines 20*a* and 20*b* is strip-shaped and arranged parallel to ground electrode 30. In a state in which multilayer device 1G is mounted in an electronics device, differential signals are transmitted through the two signal lines 20*a* and 20*b*.

The plurality of signal terminals 61 through 64 are provided on side surfaces 11 and 12 of dielectric 10. Signal terminals 61 and 63, which constitute one set of the four signal terminals 61 through 64, are provided on side surface 11, and signal terminals 62 and 64, which constitute the other set of the four signal terminals 61 through 64, are provided on side surface 12. Signal terminal 61 in the one set is connected to one end of signal line 20*a*, and signal terminal 63 in the one set is connected to the one end of signal line 20*b*. Signal terminal 62 in the other set is connected to the other end of signal line 20*a*, and signal terminal 64 in the other set is connected to the other end of signal line 20*b*. The one set of signal terminals 61 and 63 are arranged between the two ground terminals 71 and 73, and the other set of signal terminals 62 and 64 are arranged between the two ground terminals 72 and 74.

The plurality of planar electrodes 40 include planar electrode 41, planar electrode 42, and planar electrode 43. The plurality of planar electrodes 41, 42, and 43 are arranged in this order in first direction d1, i.e., along signal lines 20*a* and 20*b*.

The plurality of connecting electrodes 50 include connecting electrode 51, connecting electrode 52, and connecting electrode 53. The plurality of connecting electrodes 51, 52, and 53 are provided arranged in first direction d1 to correspond one-to-one with the plurality of planar electrodes 41 through 43.

In multilayer device 1G according to Embodiment 3 as well, at least one of the plurality of planar electrodes 40 or the plurality of connecting electrodes 50 includes two or more different types of electrode structures. Therefore, in multilayer device 1G, a plurality of types of capacitive components C40, inductive components L50, and capacitive components C20 can be generated. This makes it possible to generate a stopband that includes a plurality of resonance points, thereby increasing the stopband through which passage of high-speed, high-frequency signals is not allowed.

Variation 1 of Embodiment 3

First, the configuration of multilayer device 1H according to Variation 1 of Embodiment 3 will be described with reference to FIG. 18. Variation 1 of Embodiment 3 pertains to an example in which multilayer device 1H is a common mode filter.

Figure 18:
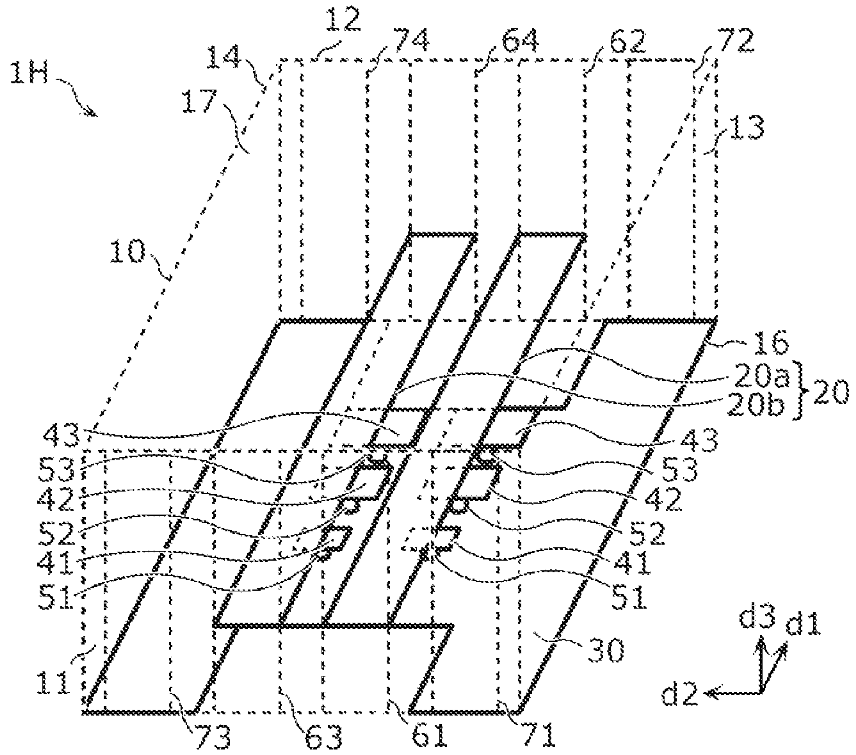
FIG. 18 is a perspective view schematically illustrating the multilayer device according to Variation 1 of Embodiment 3.

FIG. 18 is perspective view schematically illustrating multilayer device 1H according to Variation 1 of Embodiment 3.

As illustrated in FIG. 18, multilayer device 1H includes dielectric 10, signal line 20, ground electrode 30, a plurality of planar electrodes 41, 42 and 43, and a plurality of connecting electrodes 51, 52 and 53. Multilayer device 1H also includes a plurality of signal terminals 61, 62, 63, and 64 and a plurality of ground terminals 71, 72, 73, and 74.

Dielectric 10, ground electrode 30, and ground terminals 71 through 74 are the same as in Embodiment 3.

The plurality of planar electrodes 40 include two planar electrodes 41 adjacent to each other in second direction d2, two planar electrodes 42 adjacent to each other in second direction d2, and two planar electrodes 43 adjacent to each other in second direction d2. The plurality of planar electrodes 41, 42, and 43 are arranged in this order in first direction d1, i.e., along signal lines 20*a* and 20*b*.

The plurality of connecting electrodes 50 include two connecting electrodes 51 adjacent to each other in second direction d2, two connecting electrodes 52 adjacent to each other in second direction d2, and two connecting electrodes 53 adjacent to each other in second direction d2. The plurality of connecting electrodes 51, 52, and 53 are provided arranged in first direction d1 to correspond one-to-one with the plurality of planar electrodes 41 through 43.

In multilayer device 1H according to Variation 1 of Embodiment 3 as well, at least one of the plurality of planar electrodes 40 or the plurality of connecting electrodes 50 includes two or more different types of electrode structures. Therefore, in multilayer device 1H, a plurality of types of capacitive components C40, inductive components L50, and capacitive components C20 can be generated. This makes it possible to generate a stopband that includes a plurality of resonance points, thereby increasing the stopband through which passage of high-speed, high-frequency signals is not allowed.

[Advantageous Effects, etc.]

The advantageous effects of multilayer device 1G having the above-described configuration will be described with reference to FIG. 19 and FIG. 20A through FIG. 20C. Although the opposing surface area between signal line 20 and planar electrodes 40 is the same in this example, the results shown below also apply to multilayer device 1G in which the opposing surface area between signal line 20 and planar electrodes 40 is different.

Figure 19:
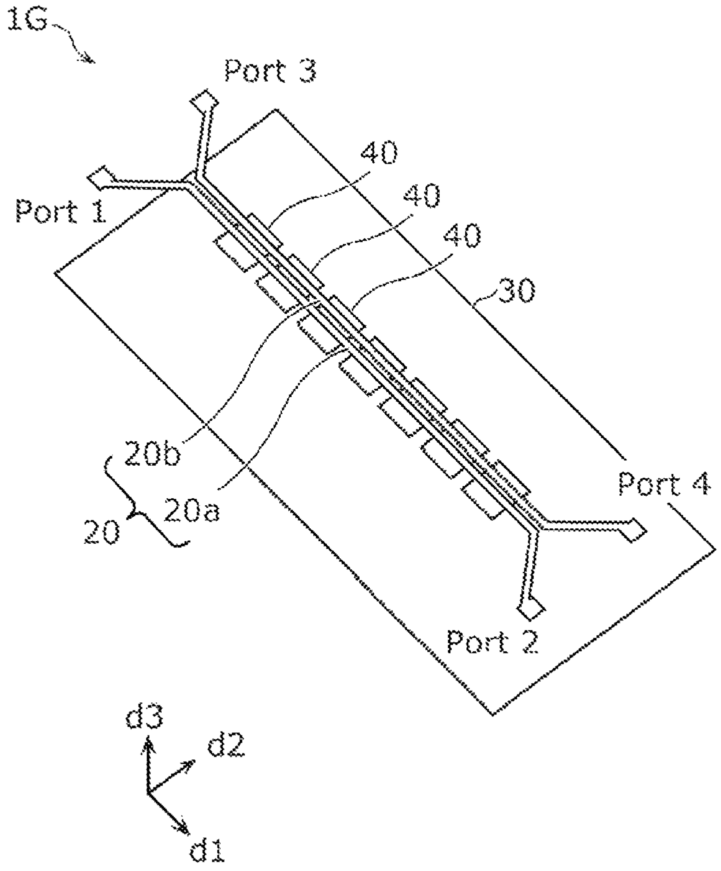
FIG. 19 illustrates the signal lines, planar electrodes, and ground electrode of the multilayer device according to Embodiment 3.

FIG. 19 illustrates signal lines 20, planar electrodes 40, and ground electrode 30 of multilayer device 1G. In this multilayer device 1G, the high-speed, high-frequency signal input to port 1 is transmitted through signal line 20*a* and output from port 2. The high-speed, high-frequency signal input to port 3 is transmitted through signal line 20*b* and output from port 4.

Figure 20A:
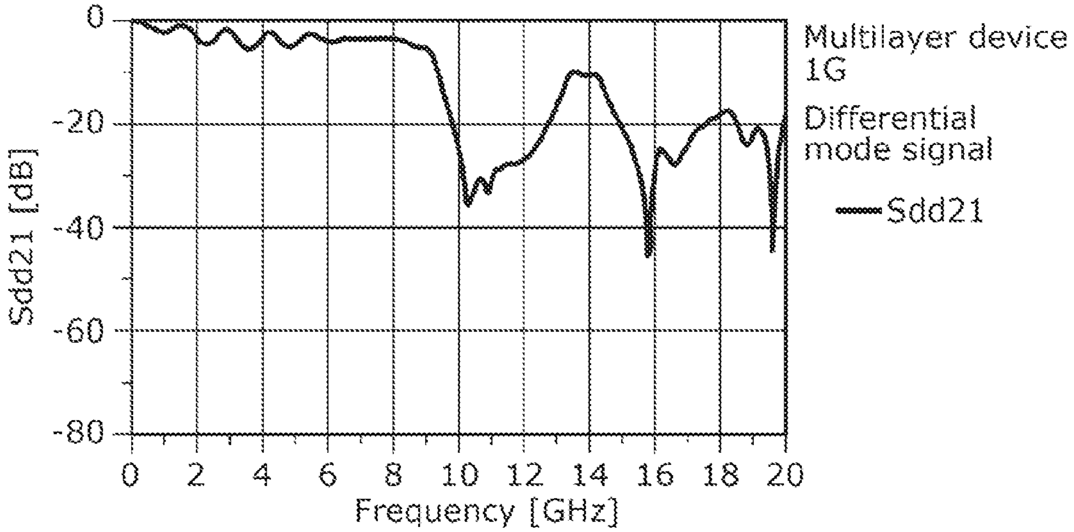
FIG. 20A illustrates pass-through characteristics of a differential mode signal in the multilayer device according to Embodiment 3.

FIG. 20A illustrates pass-through characteristics of a differential mode signal in multilayer device 1G. The S parameter (Sdd21) is represented on the vertical axis in FIG. 20A. A differential mode signal is input to each of ports 1 and 3 illustrated in FIG. 19. As illustrated in FIG. 20A, multilayer device 1G allows differential mode signals to pass through at frequencies ranging from 3 GHz to 5 GHz, as will be described later.

Figure 20B:
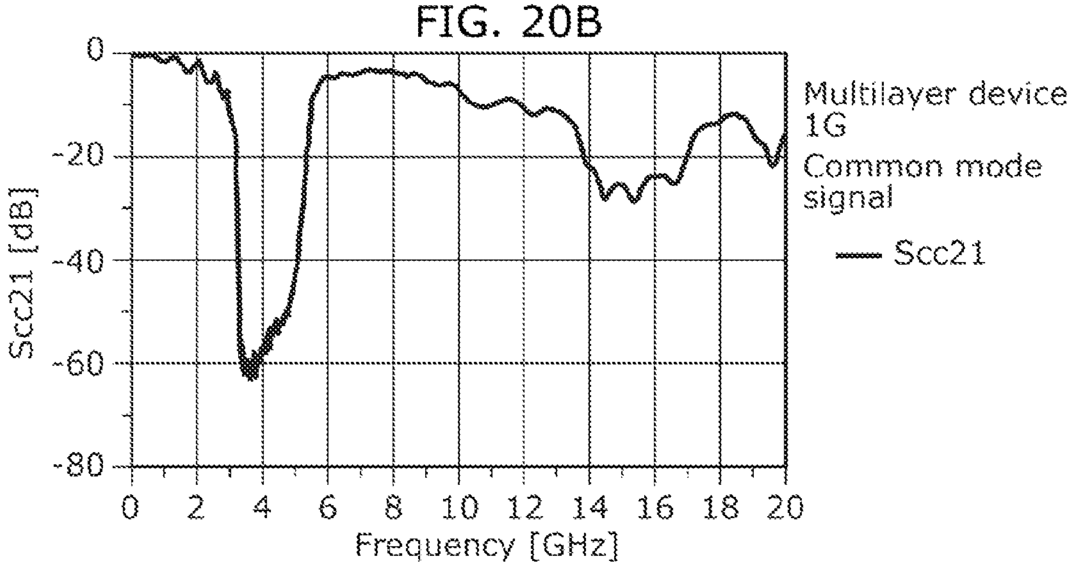
FIG. 20B illustrates pass-through characteristics of a common mode signal in the multilayer device according to Embodiment 3.

FIG. 20B illustrates pass-through characteristics of a common mode signal in multilayer device 1G. The S parameter (Scc21) is represented on the vertical axis in FIG. 20B. FIG. 20B illustrates the characteristics when an in-phase high-speed, high-frequency signal is input to ports 1 and 3. As illustrated in FIG. 20B, multilayer device 1G can stop the passage of signals in the frequency range of 3 GHZ to 5 GHz. Multilayer device 1G is capable of stopping the passage of common mode signals.

Figure 20C:
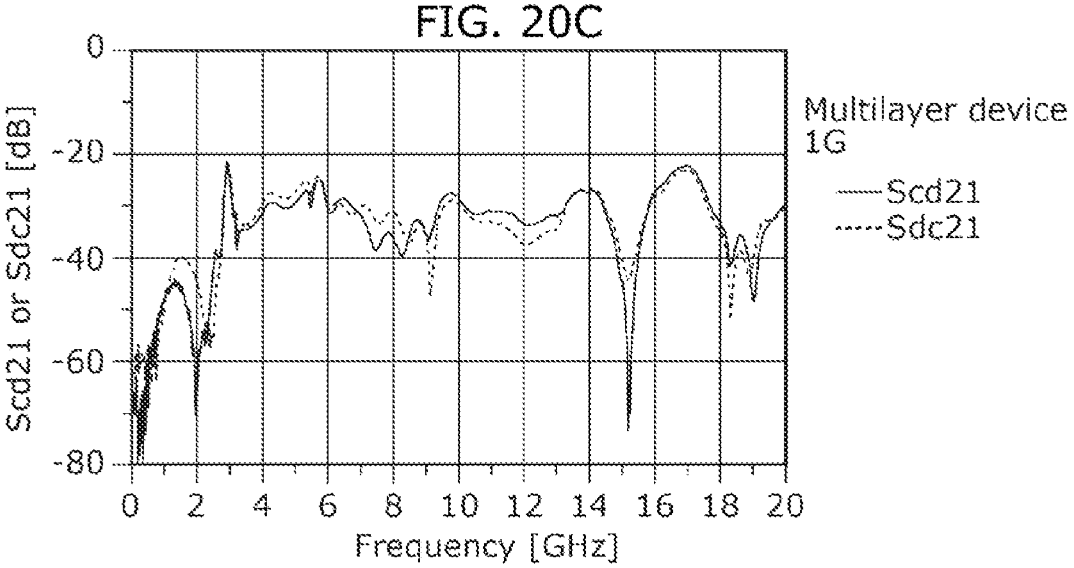
FIG. 20C illustrates pass-through characteristics of a common-to-differential conversion signal and a differential-to-common conversion signal in the multilayer device according to Embodiment 3.

FIG. 20C illustrates pass-through characteristics of a common-to-differential conversion signal and a differential-to-common conversion signal in multilayer device 1G. The S parameter (Scd21 or Sdc21) is represented on the vertical axis in FIG. 20C. As illustrated in FIG. 20C, the insertion loss of each of the common-to-conversion signal and the differential-to-common differential conversion signal is greater than 20 dB. Therefore, multilayer device 1G is able to inhibit the passage of each of the common-to-differential conversion signal and the differential-to-common conversion signal.

1.4. Embodiment 4

First, the configuration of multilayer device 1*i* according to Embodiment 4 will be described with reference to FIG. 21A through FIG. 22. Embodiment 4 pertains to an example in which multilayer device 1*i* is not a printed circuit board, but rather an electronic component mounted on a printed circuit board.

Figure 21A:
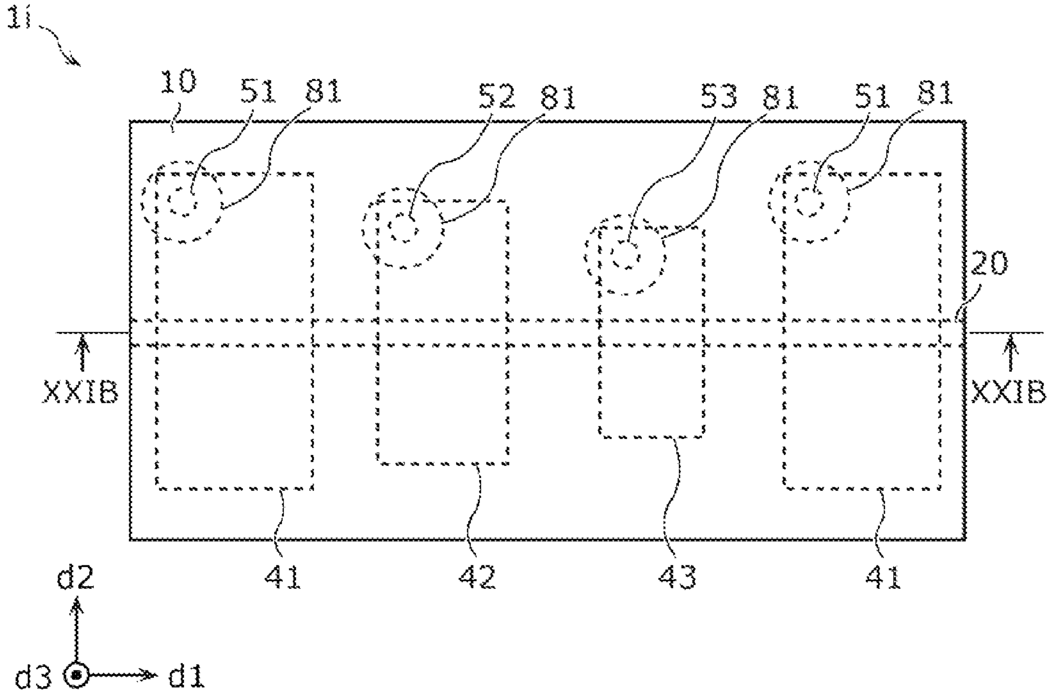
FIG. 21A is a top surface view of the multilayer device according to Embodiment 4.
Figure 21B:
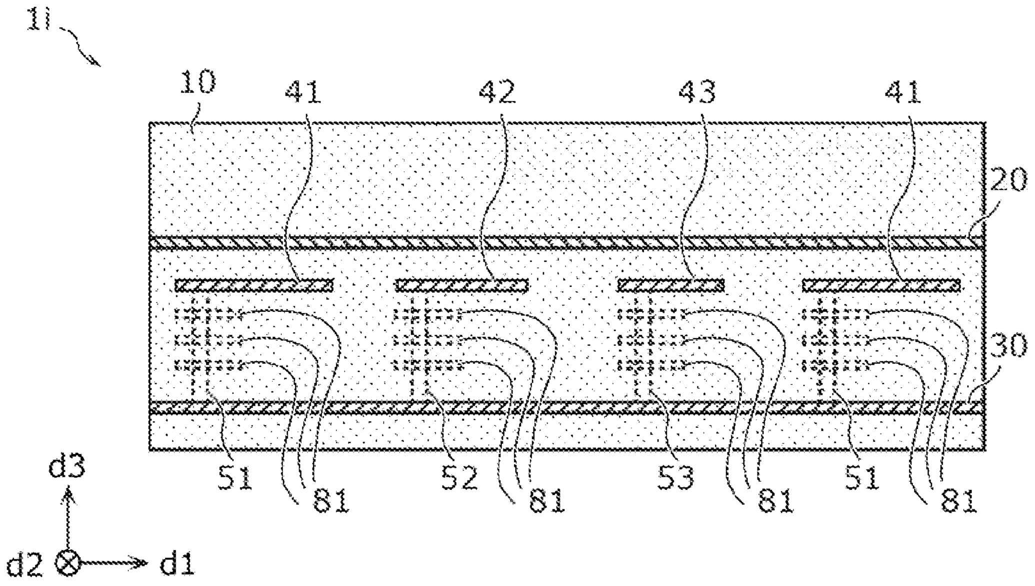
FIG. 21B is a cross-sectional view of the multilayer device according to Embodiment 4 taken at line XXIB-XXIB illustrated in FIG. 21A.

FIG. 21A is a top surface view of multilayer device 1*i* according to Embodiment 4. FIG. 21B is a cross-sectional view of multilayer device 1*i* according to Embodiment 4 taken at line XXIB-XXIB illustrated in FIG. 21A.

As illustrated in FIG. 21A and FIG. 21B, multilayer device 1*i* includes dielectric 10, signal line 20, ground electrode 30, a plurality of planar electrodes 41, 42 and 43, and a plurality of connecting electrodes 51, 52 and 53. In these figures, illustration of the plurality of signal terminals 61 and 62 and the plurality of ground terminals 71 through 74 is omitted.

Multilayer device 1*i* according to Embodiment 4 is a surface-mounted electronic component that is mounted on a printed circuit board. The size of multilayer device 1*i* illustrated in these figures is, for example, 3.2 mm long×1.6 mm wide×1.0 mm high. As used above, length refers to the dimension in first direction d1, width refers to the dimension in second direction d2, and height refers to the dimension in third direction d3.

Dielectric 10 is formed, for example, by stacking a plurality of dielectric layers. For example, dielectric 10 is formed of a dielectric material such as a low temperature co-fired ceramic material. For example, the relative permittivity of dielectric 10 is 8.1, and the dissipation factor is 0.02. The number of dielectric layers is seven, and the thickness of one dielectric layer is 0.1 mm.

Signal line 20 is provided inside dielectric 10 so that both ends, which are part of signal line 20, are exposed on the outer surface of dielectric 10. For example, the width of signal line 20 is 0.1 mm, and the thickness is 0.01 mm. The distance between signal line 20 and top surface 17 of dielectric 10 is 0.5 mm.

Ground electrode 30 is provided inside dielectric 10 so that a part of it is exposed on the outer surface of dielectric 10. Ground electrode 30 is provided closer to bottom surface 16 than planar electrode 40. For example, the thickness of the ground electrode is 0.01 mm.

Planar electrode 40 is provided inside dielectric 10 so as to be positioned between signal line 20 and ground electrode 30. For example, the gap between planar electrodes 40 and signal line 20 is 0.05 mm, and the distance between planar electrodes 40 and ground electrode 30 is 0.43 mm.

In this example, the four planar electrodes 41, 42, 43, and 41 are arranged in this order in first direction d1, i.e., along signal line 20. Planar electrodes 41 through 43 are arranged so that the centers of planar electrodes 41 through 43 coincide with center line cl of signal line 20.

Planar electrodes 41 through 43 have a rectangular shape. The size of planar electrode 41 is 0.6 mm×1.2 mm, the size of planar electrode 42 is 0.5 mm×1.0 mm, and the size of planar electrode 43 is 0.4 mm×0.8 mm. Therefore, the opposing surface areas of planar electrodes 41 through 43 with respect to signal line 20 are different. The distance between planar electrode 41 and 42 is 0.25 mm, the distance between planar electrode 42 and 43 is 0.35 mm, and the distance between planar electrode 43 and 41 is 0.3 mm. Therefore, the pitches between planar electrodes 41, 42, 43, and 41 are different.

Connecting electrodes 50 are via conductors that connect planar electrodes 40 and ground electrode 30, and are provided inside dielectric 10. The plurality of connecting electrodes 51, 52, and 53 are provided to correspond one-to-one with the plurality of planar electrodes 41 through 43. Connecting electrodes 51 through 53 are formed so as to penetrate each dielectric layer positioned between the plurality of planar electrodes 40 and ground electrode 30. For example, the diameter of connecting electrodes 50 is 0.1 mm. Connecting electrodes 50 are connected to the corner portions of the rectangular-shaped planar electrodes 40. Land electrodes 81 are provided on the boundary surfaces of the plurality of dielectric layers to connect connecting electrodes 50 provided in or on each dielectric layer. For example, the diameter of land electrodes 81 is 0.3 mm.

Figure 22:
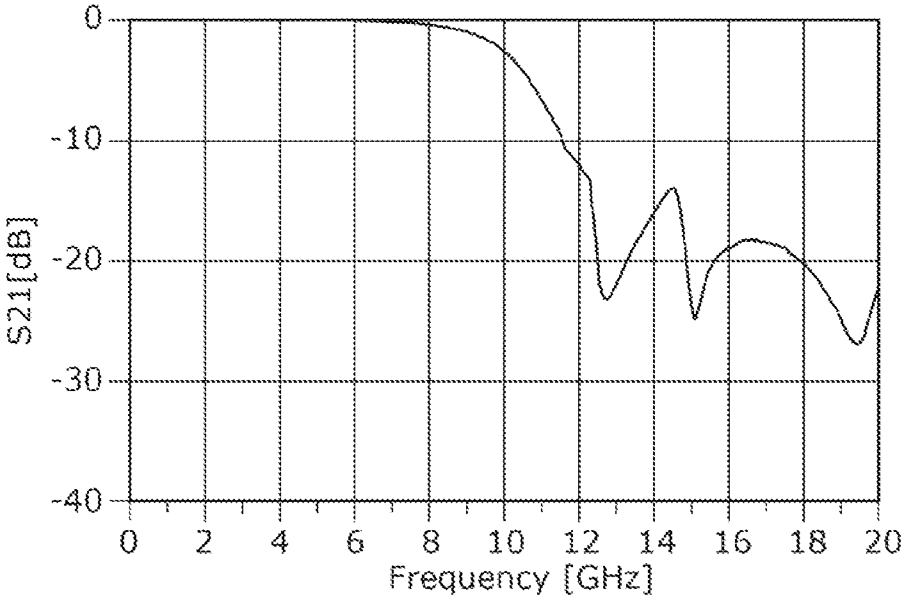
FIG. 22 illustrates the pass-through characteristics of the multilayer device according to Embodiment 4.

FIG. 22 illustrates the pass-through characteristics of multilayer device 1*i* according to Embodiment 4. The S parameter (S21) is represented on the vertical axis in FIG. 22. Note that in FIG. 22, the signal terminals and ground terminals were omitted from the simulation.

As illustrated in FIG. 22, multilayer device 1*i* according to Embodiment 4 includes a plurality of attenuation poles. For example, an attenuation pole is formed at 12.72 GHz by the electrode structure that includes planar electrode 41, an attenuation pole is formed at 15.04 GHz by the electrode structure that includes planar electrode 42, and an attenuation pole is formed at 19.35 GHz by the electrode structure that includes planar electrode 43, and the insertion loss is large at each of these attenuation poles.

In this way, multilayer device 1*i* according to Embodiment 4 includes a plurality of mushroom structures, which enables it to stop the passage of signals at a plurality of predetermined frequencies by the corresponding plurality of attenuation poles of the structures. By attenuation pole according to the desired arranging each characteristics, for example, multilayer device 1*i* including a wide stopband can be realized.

1.5. Embodiment 5

First, the configuration of multilayer device 1J according to Embodiment 5 will be described with reference to FIG. 23A through FIG. 24. Embodiment 5 also pertains to an example in which multilayer device 1J is not a printed circuit board, but rather an electronic component mounted on a printed circuit board.

Figure 23A:
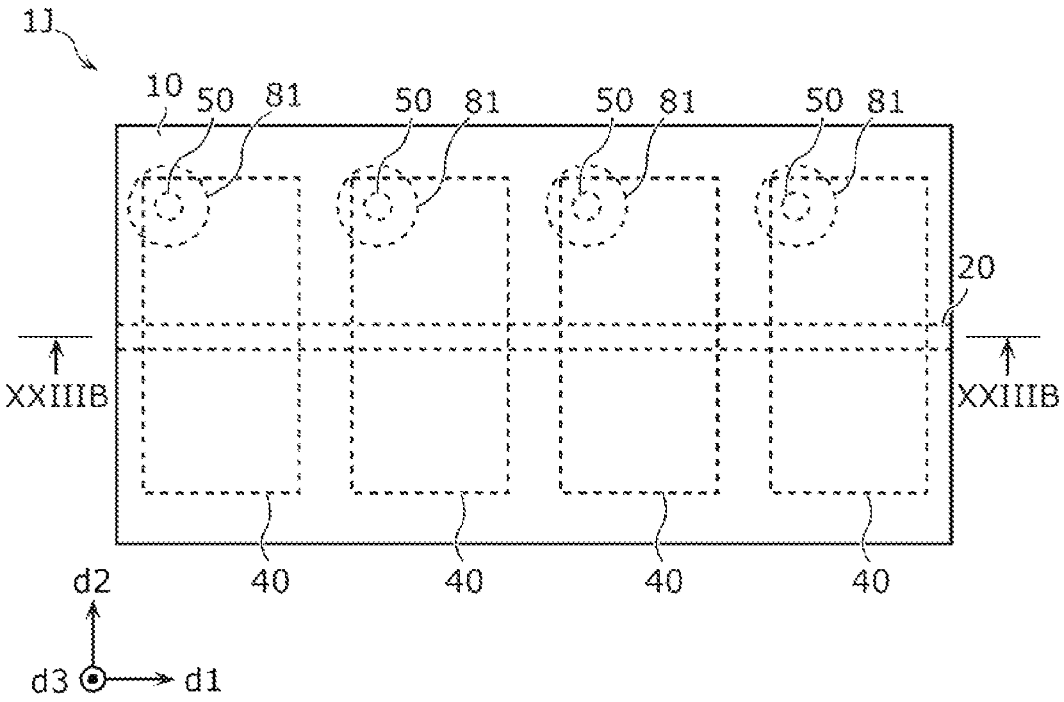
FIG. 23A is a top surface view of the multilayer device according to Embodiment 5.
Figure 23B:
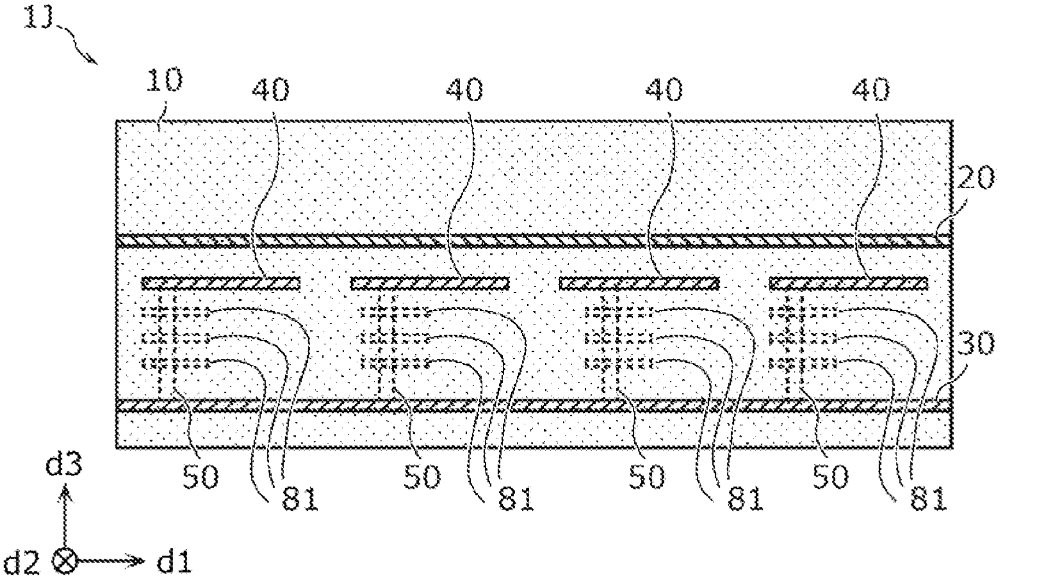
FIG. 23B is a cross-sectional view of the multilayer device according to Embodiment 5 taken at line XXIIIB-XXIIIB illustrated in FIG. 23A.

FIG. 23A is a top surface view of multilayer device 1J according to Embodiment 5. FIG. 23B is a cross-sectional view of multilayer device 1J according to Embodiment 5 taken at line XXIIIB-XXIIIB illustrated in FIG. 23A.

As illustrated in FIG. 23A and FIG. 23B, multilayer device 1J includes dielectric 10, signal line 20, ground electrode 30, a plurality of planar electrodes 40, and a plurality of connecting electrodes 50. In these figures, illustration of the plurality of signal terminals 61 and 62 and the plurality of ground terminals 71 through 74 is omitted.

Multilayer device 1J according to Embodiment 5 is a surface-mounted electronic component that is mounted on a printed circuit board. The size of multilayer device 1J illustrated in these figures is, for example, 3.2 mm long×1.6 mm wide×1.0 mm high.

Dielectric 10 is formed, for example, by stacking a plurality of dielectric layers. For example, dielectric 10 is formed of a dielectric material such as a low temperature co-fired ceramic material. For example, the relative permittivity of dielectric 10 is 8.1, and the dissipation factor is 0.02. The number of dielectric layers is six, and the thickness of one dielectric layer is 0.1 mm.

Signal line 20 is provided inside dielectric 10 so that both ends, which are part of signal line 20, are exposed on the outer surface of dielectric 10. For example, the width of signal line 20 is 0.1 mm, and the thickness is 0.01 mm. The distance between signal line 20 and top surface 17 of dielectric 10 is 0.5 mm.

Ground electrode 30 is provided inside dielectric 10 so that a part of it is exposed on the outer surface of dielectric 10. In this example, ground electrode 30 is provided closer to bottom surface 16 than planar electrode 40. For example, the thickness of the ground electrode is 0.01 mm.

Planar electrode 40 is provided inside dielectric 10 so as to be positioned between signal line 20 and ground electrode 30. For example, the gap between planar electrodes 40 and signal line 20 is 0.05 mm, and the distance between planar electrodes 40 and ground electrode 30 is 0.43 mm.

In this example, the four planar electrodes 40 are arranged in first direction d1, i.e., along signal line 20. Planar electrodes 40 are arranged so that the centers of planar electrodes 40 coincide with center line cl of signal line 20.

Planar electrodes 40 have a rectangular shape. The size of each planar electrode 40 is 0.6 mm×1.2 mm. The distance between planar electrodes 40 that are adjacent to each other in first direction d1 is 0.2 mm.

Connecting electrodes 50 are via conductors that connect planar electrodes 40 and ground electrode 30, and are provided inside dielectric 10. The plurality of connecting electrodes 50 are provided arranged in first direction d1 to correspond one-to-one with the plurality of planar electrodes 40. Connecting electrodes 50 are formed so as to penetrate each dielectric layer positioned between the plurality of planar electrodes 40 and ground electrode 30. For example, the diameter of connecting electrodes 50 is 0.1 mm. Connecting electrodes 50 are connected to the corner portions of planar electrodes 40. Land electrodes are provided on the boundary surfaces of the plurality of dielectric layers to connect connecting electrodes 50 provided in or on each dielectric layer. For example, the diameter of the land electrodes is 0.3 mm.

Figure 24:
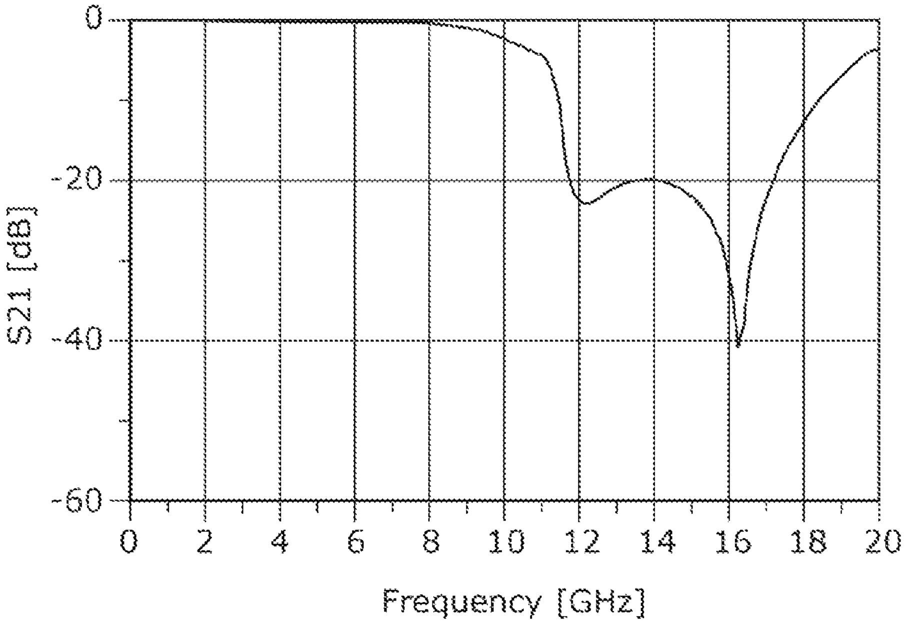
FIG. 24 illustrates the pass-through characteristics of the multilayer device according to Embodiment 5.

FIG. 24 illustrates the pass-through characteristics of multilayer device 1J according to Embodiment 5. The S parameter (S21) is represented on the vertical axis in FIG. 24. Note that in FIG. 24, the signal terminals and ground terminals were omitted from the simulation.

As illustrated in FIG. 24, multilayer device 1J according to Embodiment 5 is able to form an attenuation band in the vicinity of 16.3 GHZ. Thus, even when multilayer device 1J is formed in the size of a surface-mounted electronic component, an attenuation band can be formed.

For example, when forming an electrode structure that includes signal line 20, ground electrode 30, planar electrodes 40, and connecting electrodes 50 inside a printed circuit board, the printed circuit board must have a multilayer structure. In contrast, the number of layers of the printed circuit board on which multilayer device 1J is mounted can be reduced by making multilayer device 1J, which includes the electrode structure, an electronic component to be mounted on the printed circuit board, as in Embodiment 5, instead of forming the electrode structure inside the printed circuit board. This can inhibit an increase in the cost of printed circuit boards.

1.6. Embodiment 6

[Multilayer Device Configuration]

First, the configuration of multilayer device 1K according to Embodiment 6 will be described with reference to the figures.

Figure 25:
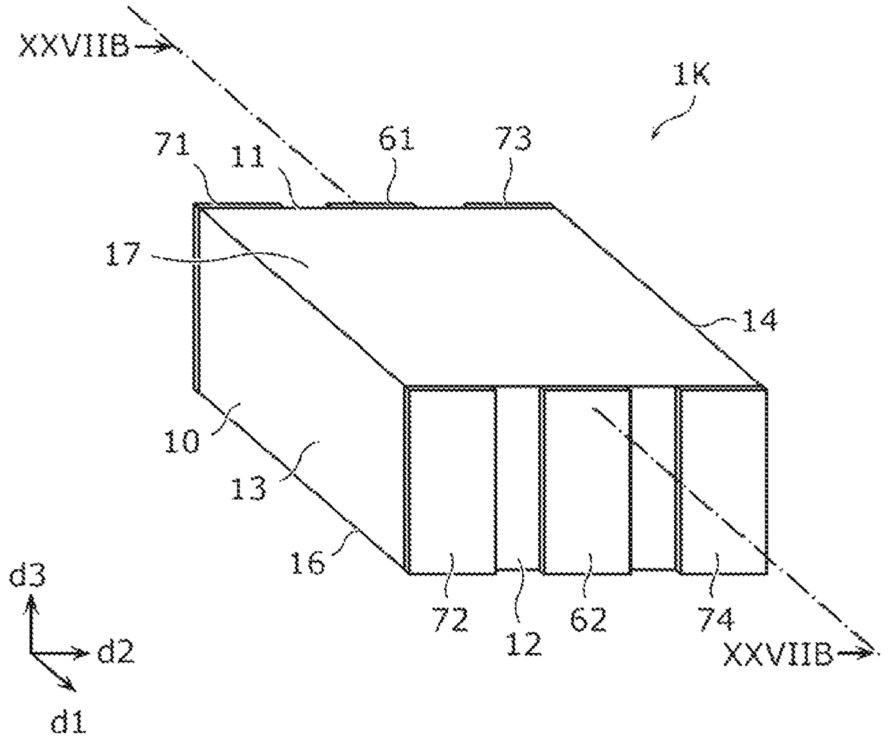
FIG. 25 is an external view of the multilayer device according to Embodiment 6.
Figure 26:
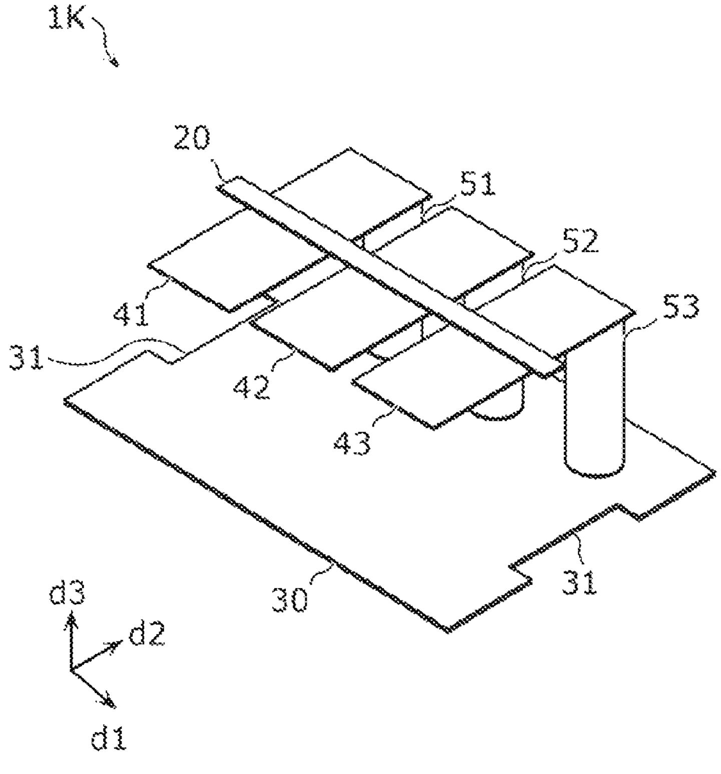
FIG. 26 illustrates the signal line, planar electrodes, ground electrode, and connecting electrodes of the multilayer device according to Embodiment 6.
Figure 27A:
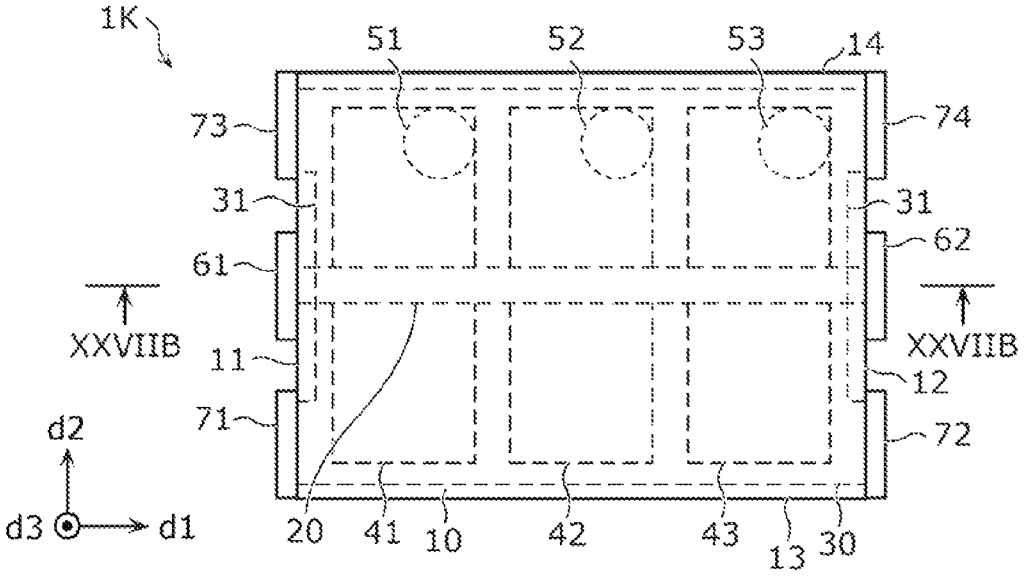
FIG. 27A is a plan view of the multilayer device according to Embodiment 6, showing the signal line and the like from above.
Figure 27B:
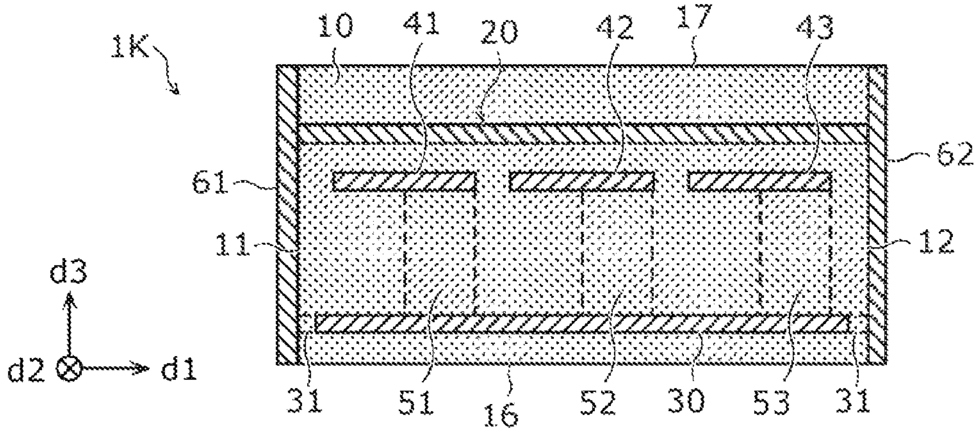
FIG. 27B is a cross-sectional view of the multilayer device according to Embodiment 6 taken at line XXVIIB-XXVIIB illustrated in FIG. 27A.
Figure 27C:
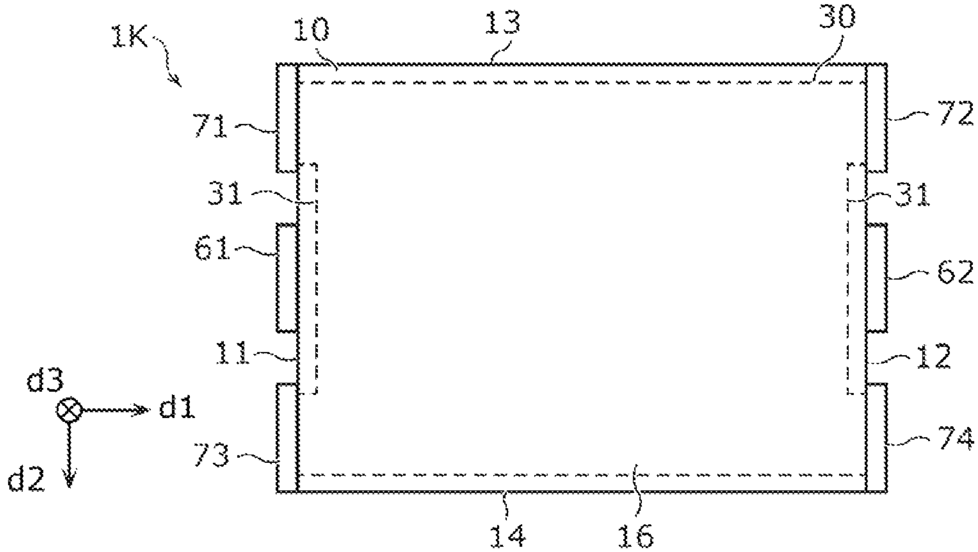
FIG. 27C is a bottom surface view of the multilayer device according to Embodiment 6.

FIG. 25 is an external view of multilayer device 1K according to Embodiment 6. FIG. 26 illustrates signal line 20, planar electrodes 41, 42, 43, ground electrode 30, and connecting electrodes 51, 52, 53 of multilayer device 1K. FIG. 27A is a plan view of multilayer device 1K, showing signal line 20 and the like from above. FIG. 27B is a cross-sectional view of multilayer device 1K taken at line XXVIIB-XXVIIB illustrated in FIG. 27A. FIG. 27C is a bottom surface view of multilayer device 1K.

FIG. 26 illustrates multilayer device 1K, omitting signal terminals 61 and 62, ground terminals 71, 72, 73, and 74, and dielectric 10. In FIG. 27C, illustration of the signal line, planar electrodes, and connecting electrodes is omitted.

Multilayer device 1K illustrated in FIG. 25, FIG. 26, and FIG. 27A through FIG. 27C includes dielectric 10, signal line 20, ground electrode 30, a plurality of planar electrodes 41, 42 and 43, and a plurality of connecting electrodes 51, 52 and 53. Multilayer device 1K also includes a plurality of signal terminals 61 and 62 and a plurality of ground terminals 71, 72, 73, and 74.

In the following, some or all of the plurality of planar electrodes 41 through 43 may be referred to simply as planar electrodes 40, and some or all of the plurality of connecting electrodes 51 through 53 may be referred to simply as connecting electrodes 50. In the following, some or all of the plurality of signal terminals 61 and 62 may be referred to simply as signal terminals 60, and some or all of the plurality of ground terminals 71 through 74 may be referred to simply as ground terminals 70.

For example, signal line 20, ground electrode 30, planar electrodes 40, and connecting electrodes 50 are formed of a metallic material such as silver or copper. Signal line 20, ground electrode 30, planar electrodes 40, and connecting electrodes 50 may be formed of the same material or using the same composition ratio, or of different materials or using different composition ratios.

Dielectric 10 is formed, for example, by stacking a plurality of dielectric layers. For example, dielectric 10 is formed of a dielectric material such as a low temperature co-fired ceramic material. To make multilayer device 1K smaller, using a material with a high relative permittivity for dielectric 10 is desirable. Dielectric 10 is provided between each of signal line 20, ground electrode 30, and planar electrodes 40. Dielectric 10 is formed to cover the outer peripheral surface of signal line 20 except for the two end surfaces and the outer peripheral surface of ground electrode 30 except for the two end surfaces, as well as the electrode structures of planar electrodes 40 and connecting electrodes 50.

Dielectric 10 has a cuboid shape and includes bottom surface 16, top surface 17 facing away from bottom surface 16, and a plurality of side surfaces 11, 12, 13, and 14 connecting bottom surface 16 and top surface 17. The plurality of side surfaces 11 through 14 include side surfaces 11 and 12 facing away from each other and side surfaces 13 and 14 orthogonal to both of side surfaces 11 and 12. Bottom surface 16 and top surface 17 are parallel to each other, side surfaces 11 and 12 are parallel to each other, and side surfaces 13 and 14 are parallel to each other. The corner portions (edge portions) where each face of dielectric 10 intersects may be rounded.

A direction in which side surface 11 and side surface 12 face away from each other is referred to as first direction d1, a direction in which side surface 13 and side surface 14 face away from each other is referred to as second direction d2, and a direction in which bottom surface 16 and top surface 17 face away from each other is referred to as third direction d3. Hereinafter, regarding the terms "one" and "the other", "one" may refer to an element on negative side of first direction d1, and "the other" may refer to an element on the positive side, which is opposite to the negative side, of first direction d1.

Signal line 20 is straight and is provided extending first direction d1. Signal line 20 is provided inside dielectric 10 so that both ends, which are part of signal line 20, are exposed on the outer surface (side surfaces 11 and 12) of dielectric 10. Signal line 20, which is strip-shaped, is arranged parallel to planar electrode 40 and ground electrode 30. In a state in which multilayer device 1K is mounted in an electronics device, high-speed, high-frequency signals are input to and output from signal line 20 via signal terminals 60.

Signal terminals 60 are provided on the outer surface (side surfaces 11 and 12) of dielectric 10. Signal terminal 61, which is one of the two signal terminals 61 and 62, is provided on side surface 11, and signal terminal 62, which is the other of the two signal terminals 61 and 62, is provided on side surface 12. The one signal terminal 61 is connected to one end of signal line 20, and the other signal terminal 62 is connected to the other end of signal line 20.

Ground electrode 30 is provided inside dielectric 10 so that a part of ground electrode 30 is exposed on side surfaces 11 and 12 of dielectric 10. Ground electrode 30 includes rectangular notches 31 at both ends in first direction d1, and is arranged at a predetermined distance from signal terminals 60 so as not to contact signal terminals 60. Ground electrode 30 is arranged at a predetermined distance from side surfaces 13 and 14 so as not to be exposed on side surfaces 13 and 14. Note that ground electrode 30 may be provided on bottom surface 16 of dielectric 10 rather than inside dielectric 10.

Ground electrode 30 may have a structure with an aperture pattern, for example, a mesh structure, instead of a solid pattern. By giving ground electrode 30 a mesh structure, dielectrics 10 can be bonded to each other to improve bonding strength.

In a state in which multilayer device 1K is mounted in an electronics device, ground electrode 30 is set to ground potential via ground terminal 70.

Ground terminals 70 are provided on the outer surface (side surfaces 11 and 12) of dielectric 10. Ground terminals 71 and 73, which constitute one set of the four ground terminals 71 through 74, are provided on side surface 11, and ground terminals 72 and 74, which constitute the other set of the four ground terminals 71 through 74, are provided on side surface 12. The one set of ground terminals 71 and 73 are connected to one end of ground electrode 30, and the other set of ground terminals 72 and 74 are connected to the other end of ground electrode 30. The one set of ground terminals 71 and 73 are arranged on both sides, in second direction d2, of the one signal terminal 61. The other set of ground terminals 72 and 74 are arranged on both sides, in second direction d2, of the other signal terminal 62. Stated differently, the one signal terminal 61 is arranged between two ground terminals 71 and 73, and the other signal terminal 62 is arranged between two ground terminals 72 and 74.

Note that the number of ground terminals 70 is not limited to four; the number of ground terminals 70 may be two. Ground terminals 70 may be provided one each on side surfaces 11 and 12 or side surfaces 13 and 14 of dielectric 10. For example, ground terminals 70 may be provided one each on side surfaces 11 and 12. In such cases, it is desirable to arrange ground terminals 70 on a diagonal line so that the mounting orientation does not need to be taken into consideration. Additionally, ground terminals 70 may not only be provided on side surfaces 11 and 12, but may also be provided on side surfaces 13 and 14. Moreover, ground terminals 70 may be provided only on side surfaces 13 and 14.

Planar electrode 40 is provided inside dielectric 10 so as to be positioned between signal line 20 and ground electrode 30 in third direction d3. Planar electrode 40 is arranged parallel to signal line 20 and ground electrode 30. The gap between planar electrode 40 and signal line 20 is smaller than the gap between ground electrode 30 and signal line 20. In the present embodiment, the gap between planar electrode 40 and signal line 20 is, for example, greater than or equal to 0.1 times and less than or equal to 0.5 times the gap between ground electrode 30 and signal line 20, but the size of this gap is set appropriately according to the stopband required for multilayer device 1K. The plurality of planar electrodes 40 are rectangular-shaped planar electrodes. However, the shape of planar electrode 40 is not limited to rectangular, and may be square, polygonal, circular or elliptical. The plurality of planar electrodes 41, 42, and 43 are arranged equidistantly in this order in first direction d1. Each of planar electrodes 41, 42, and 43 has the same shape and size.

Connecting electrodes 50 are via conductors that connect planar electrodes 40 and ground electrode 30, and are provided inside dielectric 10. Connecting electrodes 50 are formed so as to penetrate dielectric 10 positioned between planar electrodes 40 and ground electrode 30. Connecting electrodes 50 are columnar, and the diameter of each connecting electrode 50 is larger than the thickness of each planar electrode 40. The length of each connecting electrode 50 is smaller than the gap between ground electrode 30 and signal line 20. Note that in this multilayer device 1K, changing the length of connecting electrodes 50 also changes the gap between planar electrodes 40 and signal line 20.

The plurality of connecting electrodes 51, 52, and 53 are arranged equidistantly in this order in first direction d1. Each of connecting electrodes 51, 52, and 53 has the same shape and size. Connecting electrodes 51 through 53 are provided arranged in first direction d1 to correspond one-to-one with planar electrodes 41 through 43, respectively. More specifically, connecting electrode 51 is provided to connect planar electrode 41 and ground electrode 30, connecting electrode 52 is provided to connect planar electrode 42 and ground electrode 30, and connecting electrode 53 is provided to connect planar electrode 43 and ground electrode 30.

Connecting electrodes 51, 52, and 53 do not overlap signal line 20 when viewed in a direction perpendicular to planar electrodes 40, but overlap the outer peripheral edge portion of planar electrodes 40 and overlap ground electrode 30. Connecting electrodes 51 through 53 are connected to the corners of the outer peripheral edge portions of planar electrodes 41 through 43.

For example, when forming an electrode structure that includes signal line 20, ground electrode 30, planar electrodes 40, and connecting electrodes 50 inside a printed circuit board, the printed circuit board must have a multilayer structure.

In contrast, in Embodiment 6, the number of layers of the printed circuit board on which multilayer device 1K is mounted can be reduced by making multilayer device 1K, which includes the electrode structure, an electronic component to be mounted on the printed circuit board. This can inhibit an increase in the cost of printed circuit boards.

Although conventional functional substrates can stop the passage of high-speed, high-frequency signals of a specific frequency, forming a stopband through which passage of high-speed, high-frequency signals is not allowed in accordance with the required specifications for multilayer devices is difficult.

In contrast, connecting electrodes 50 of multilayer device 1K according to Embodiment 6 do not overlap signal line 20 when viewed in a direction perpendicular to planar electrodes 40, but do overlap planar electrodes 40 and ground electrode 30. With this, connecting electrodes 50 are arranged at the end portions of planar electrodes 40. Therefore, the overall length of each electrode structure consisting of connecting electrode 50 and planar electrode 40 can be increased, and the inductance value of the electrode structure can be changed. By changing the inductance value, the value of inductive component L50 can be changed, which means the frequency of the stopband of multilayer device 1K can be changed. This allows for the formation of a stopband in accordance with the required specifications for multilayer device 1K.

1.7. Embodiment 7

Next, multilayer device 1L according to Embodiment 7 will be described.

Figure 28:
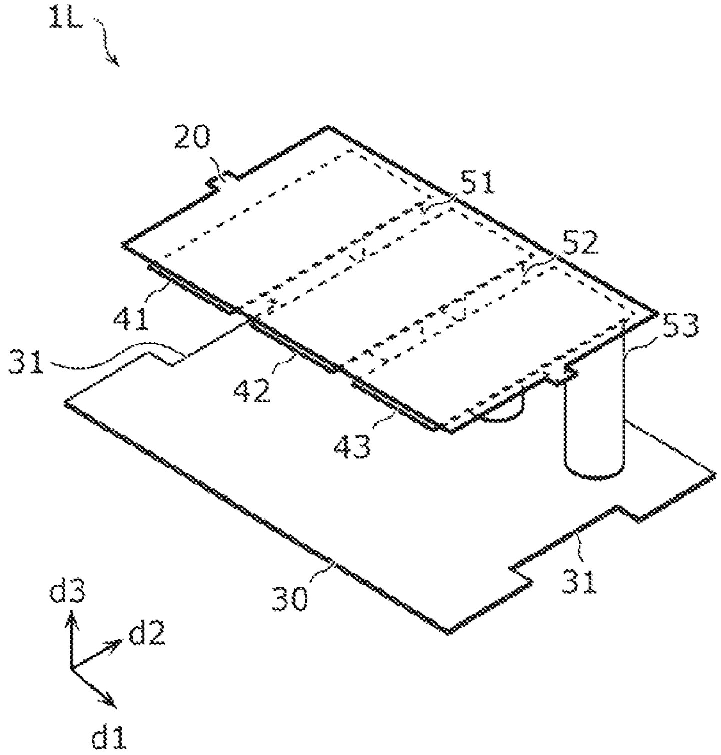
FIG. 28 illustrates the signal line, planar electrodes, ground electrode, and connecting electrodes of the multilayer device according to Embodiment 7.

FIG. 28 illustrates signal line 20, planar electrodes 40, ground electrode 30, and connecting electrodes 50 of multilayer device 1L according to Embodiment 7. FIG. 28 illustrates multilayer device 1L, omitting signal terminals 61 and 62, ground terminals 71, 72, 73, and 74, and dielectric 10.

Multilayer device 1L illustrated in FIG. 28 includes dielectric 10, signal line 20, ground electrode 30, a plurality of planar electrodes 41, 42 and 43, and a plurality of connecting electrodes 51, 52 and 53. Multilayer device 1L also includes a plurality of signal terminals 61 and 62 and a plurality of ground terminals 71, 72, 73, and 74.

Dielectric 10, ground electrode 30, planar electrodes 41, 42 and 43, and connecting electrodes 51, 52 and 53 according to Embodiment 7 are the same as in Embodiment 6. Signal terminals 61 and 62 and ground terminals 71, 72, 73, and 74 according to Embodiment 7 are also the same as in Embodiment 6.

Signal line 20 is straight and is provided extending first direction d1. The width of signal line 20 according to Embodiment 7 is the same as the length of planar electrodes 40 in second direction d2 when viewed in a direction perpendicular to planar electrodes 40, i.e., third direction d3. The width of signal line 20 being the same as the length of planar electrodes 40 in second direction d2 means that the width of signal line 20 is greater than or equal to 0.9 times and less than 1.1 times the length of planar electrodes 40 when the length of planar electrodes 40 in second direction d2 is used as a reference.

Signal line 20 is provided inside dielectric 10 so that both ends, which are part of signal line 20, are exposed on the outer surface (side surfaces 11 and 12) of dielectric 10. Signal line 20 has notches at the corners of both ends in first direction d1 and is arranged at a predetermined distance from ground terminals 70 so as not to contact ground terminal 70. Signal line 20, whose center portion, excluding the end portions, is strip-shaped, is arranged parallel to planar electrode 40 and ground electrode 30.

Although conventional functional substrates can stop the passage of high-speed, high-frequency signals of a specific frequency, forming a stopband through which passage of high-speed, high-frequency signals is not allowed in accordance with the required specifications for multilayer devices is difficult.

In contrast, the width of signal line 20 of multilayer device 1L according to Embodiment 7 is the same as the length of planar electrodes 40 in second direction d2 when viewed in a direction perpendicular to planar electrodes 40, i.e., third direction d3. This allows the opposing surface area between signal line 20 and planar electrodes 40 to be increased. By changing the opposing surface area, the value of capacitive component C40 can be changed, which means the frequency of the stopband of multilayer device 1L can be changed. This allows for the formation of a stopband in accordance with the required specifications for multilayer device 1L.

1.8. Overview

Multilayer device 1A (or 1K or 1L) according to the present embodiment includes: dielectric 10; signal line 20 provided inside dielectric 10 and including a portion exposed on an outer surface of dielectric 10; ground electrode 30 provided inside or on the outer surface of dielectric 10 and including at least a portion exposed on the outer surface of dielectric 10; a plurality of planar electrodes 40 provided inside dielectric 10, arranged parallel to ground electrode 30, and arranged in first direction d1; a plurality of connecting electrodes 50 that are provided inside dielectric 10 and connect the plurality of planar electrodes 40 and ground electrode 30; a plurality of signal terminals 60 provided on the outer surface of dielectric 10 and connected to signal line 20; and a plurality of ground terminals 70 provided on the outer surface of dielectric 10 and connected to ground electrode 30.

For example, when forming an electrode structure that includes signal line 20, ground electrode 30, planar electrodes 40, and connecting electrodes 50 inside a printed circuit board, the printed circuit board must have a multilayer structure. In contrast, the number of layers of the printed circuit board on which multilayer device 1A (or 1K or 1L) are mounted can be reduced by making multilayer device 1A (or 1K or 1L), which includes the electrode structure, an electronic component to be mounted on the printed circuit board. This can inhibit an increase in the cost of printed circuit boards.

At least one of the plurality of planar electrodes 40 or the plurality of connecting electrodes 50 may include two or more different types of electrode structures.

Therefore, by including two or more different types of electrode structures, in multilayer device 1A, a plurality of types of capacitive components C40, inductive components L50, and capacitive components C20 can be generated. This makes it possible to generate a stopband that includes a plurality of resonance points, thereby increasing the stopband through which passage of signals is not allowed.

Since the frequency of the stopband of multilayer device 1A can be changed, it is possible to form a stopband in accordance with the required specifications for multilayer device 1A.

Connecting electrodes 50 are via conductors and may overlap the outer peripheral edge portions of planar electrodes 40 when viewed in a direction perpendicular to planar electrodes 40.

With this, connecting electrodes 50 are arranged at the outer peripheral edge portions of planar electrodes 40. Therefore, the overall length of each electrode structure consisting of connecting electrode 50 and planar electrode 40 can be increased, and the inductance value of the electrode structure can be changed. By changing the inductance value, the value of inductive component L50 can be changed, which means the frequency of the stopband of multilayer device 1K can be changed. This allows for the formation of a stopband in accordance with the required specifications for multilayer device 1K.

When viewed in a direction perpendicular to planar electrodes 40, the width of signal line 20 may be the same as the length of planar electrodes 40 in second direction d2 perpendicular to first direction d1.

This allows the opposing surface area between signal line 20 and planar electrodes 40 to be increased. By changing the opposing surface area, the value of capacitive component C40 can be changed, which means the frequency of the stopband of multilayer device 1L can be changed. This allows for the formation of a stopband in accordance with the required specifications for multilayer device 1L.

Multilayer device 1A according to the present embodiment includes: signal line 20 that transmits a signal; ground electrode 30 set to ground potential; a plurality of planar electrodes 40 arranged parallel to ground electrode 30 and arranged in first direction d1; dielectric 10 provided between each of signal line 20, the plurality of planar electrodes 40, and ground electrode 30; and a plurality of connecting electrodes 50 that are positioned between the plurality of planar electrodes 40 and ground electrode 30 and connect the plurality of planar electrodes 40 and ground electrode 30. At least one of the plurality of planar electrodes 40 or the plurality of connecting electrodes 50 includes two or more different types of electrode structures.

Therefore, by including two or more different types of electrode structures, in multilayer device 1A, a plurality of types of capacitive components C40, inductive components L50, and capacitive components C20 can be generated. This makes it possible to generate a stopband that includes a plurality of resonance points, thereby increasing the stopband through which passage of signals is not allowed.

The plurality of planar electrodes 40 may include two or more different types of structures with respect to at least one of the opposing surface area between signal line 20 and planar electrodes 40 or the pitch of the plurality of planar electrodes 40 arranged in first direction d1.

For example, by including two or more structures that differ with respect to the opposing surface area between signal line 20 and planar electrodes 40, two or more capacitive components C40 based on signal line 20 and planar electrodes 40 can be generated. This makes it possible to generate a stopband that includes a plurality of resonance points, thereby increasing the bandwidth of the stopband. By including two or more structures that differ with respect to the pitch of planar electrodes 40, two or more capacitive components C20 based on signal line 20 and ground electrode 30 can be generated. This makes it possible to generate a stopband that includes a plurality of resonance points, thereby increasing the bandwidth of the stopband.

The plurality of connecting electrodes 50 may include two or more different types of structures with respect to at least one of the cross-sectional area of the plurality of connecting electrodes 50 or the length of the plurality of connecting electrodes 50.

For example, by including two or more structures that differ with respect to the cross-sectional area of the plurality of connecting electrodes 50, two or more inductive components L50 based on connecting electrodes 50 can be generated. This makes it possible to generate a stopband that includes a plurality of resonance points, thereby increasing the bandwidth of the stopband. Additionally, by including two or more structures that differ with respect to the length of the plurality of connecting electrodes 50, two or more inductive components L50 based on connecting electrodes 50 can be generated. By varying the lengths of connecting electrodes 50, the gap between signal line 20 and planar electrodes 40 can be varied, thus generating two or more types of capacitive components C40 based on signal line 20 and planar electrodes 40. This makes it possible to generate a stopband that includes a plurality of resonance points, thereby increasing the bandwidth of the stopband.

Multilayer device 1C, 1D, 1E, or 1F may include a plurality of sets of the two or more different types of structures.

With this, the number of resonant points in multilayer device 1C, 1D, 1E, or 1F can be further increased. As a result, the stopband through which the passage of signals is not allowed can be widened.

Multilayer device 1F may have a multilayer structure in which a plurality of stacks are stacked, each of the plurality of stacks including signal line 20, ground electrode 30, a plurality of planar electrodes 40, and a plurality of connecting electrodes 50.

By stacking a plurality of stacks as described above, the number of resonant points in multilayer device 1F can be further increased. As a result, the stopband through which the passage of signals is not allowed can be widened. Moreover, by giving multilayer device 1F a multilayer structure, the surface area of multilayer device 1F can be reduced.

Signal line 20 may include two parallel lines provided in or on dielectric 10.

This allows for multilayer devices 1G and 1H to be used as common mode filters.

The two parallel lines may be differential lines on which differential signals are transmitted.

This makes it possible to provide multilayer devices 1G and 1H that include a common mode filter functionality.

Among the plurality of planar electrodes 40, at least one planar electrode (for example, planar electrode 41) may have an opposing surface area with signal line 20 that is different than an opposing surface area between another planar electrode different from the at least one planar electrode (for example, planar electrode 42) and signal line 20.

This allows the generation of two or more capacitive components C40 based on the opposing surface area between signal line 20 and planar electrodes 40. This makes it possible to generate a stopband that includes a plurality of resonance points, thereby increasing the bandwidth of the stopband.

The center-to-center distance between one pair of planar electrodes (for example, planar electrodes 41 and 42) that are adjacent to each other in first direction d1 may be different from the center-to-center distance between another pair of planar electrodes different from the one pair of planar electrodes (for example, planar electrodes 42 and 43).

With this, the length of signal line 20 corresponding to each pair of planar electrodes 40 and connecting electrodes 50 is different, allowing for the generation of two or more types of capacitive components C20 based on signal line 20 and ground electrode 30. This makes it possible to generate a stopband that includes a plurality of resonance points, thereby increasing the bandwidth of the stopband.

Among the plurality of connecting electrodes 50, at least one connecting electrode (for example, connecting electrode 51) may have a different cross-sectional area than another connecting electrode different from the at least one connecting electrode (for example, connecting electrode 52).

With this, two or more types of inductive components L50 based on connecting electrodes 50 can be generated. This makes it possible to generate a stopband that includes a plurality of resonance points, thereby increasing the bandwidth of the stopband.

Among the plurality of connecting electrodes 50, at least one connecting electrode (for example, connecting electrode 51) may have a different length than another connecting electrode different from the at least one connecting electrode (for example, connecting electrode 52).

With this, two or more types of inductive components L50 based on connecting electrodes 50 can be generated. By varying the lengths of connecting electrodes 50, the gap between signal line 20 and planar electrodes 40 can be varied, thus generating two or more types of capacitive components C40 based on signal line 20 and planar electrodes 40. This makes it possible to generate a stopband that includes a plurality of resonance points, thereby increasing the bandwidth of the stopband.

The plurality of planar electrodes 40 may be arranged between signal line 20 and ground electrode 30.

With this, the length of connecting electrodes 50 can be shortened compared to when planar electrodes 40 are arranged on the side of signal line 20 opposite the side that ground electrode 30 is on. Therefore, inductive component L50 of connecting electrodes 50 can be reduced. This allows for the adjustment of the position of the resonance point of multilayer device 1A, thereby enabling widening of the stopband.

The plurality of planar electrodes 40 may be arranged on the opposite side of signal line 20 relative to the side on which ground electrode 30 is provided.

With this, the length of connecting electrodes 50 can be lengthened compared to when planar electrodes 40 are arranged between signal line 20 and ground electrode 30. Therefore, inductive component L50 of connecting electrodes 50 can be increased. This allows for the adjustment of the position of the resonance point of multilayer device 1B, thereby enabling widening of the stopband.

1.9. Other Variations on Embodiments 1 Through 7

Although a multilayer device and the like according to embodiments of the present disclosure and variations thereof has been described, the present disclosure is not limited to the above embodiments and variations. Various modifications to the exemplary embodiments and variations thereof that may be conceived by those skilled in the art, as well as other embodiments resulting from combinations of some elements of the exemplary embodiments and variations thereof, are intended to be included within the scope of the present disclosure as long as these do not depart from the essence of the present disclosure.

For example, Embodiment 1 presents an example in which a plurality of planar electrodes 41, 42, and 43 are arranged in this order in first direction d1, but the present disclosure is not limited to this example. The plurality of planar electrodes 41 through 43 may be arranged in the order of planar electrodes 41, 43, and 42. Stated differently, the plurality of planar electrodes 41, 42, and 43 may be arranged in any order, for example, in any order chosen from the six possible combinations.

For example, in another example of Embodiment 1, a plurality of connecting electrodes 51, 52, and 53 are arranged in this order in first direction d1, but the present disclosure is not limited to this example. For example, the plurality of connecting electrodes 51 through 53 may be arranged in the order of connecting electrodes 51, 53, and 52. Stated differently, the plurality of connecting electrodes 51, 52, and 53 may be arranged in any order, for example, in any order chosen from the six possible combinations.

For example, Embodiment 1 presents an example in which three planar electrodes 41 through 43 and three connecting electrodes 51 through 53 are arranged in first direction d1, but the present disclosure is not limited to this example. The number of electrode structures of planar electrodes and connecting electrodes may be two, and may be greater than or equal to four.

2. Multilayer Device According to Other Aspects of the Present Disclosure

Next, a multilayer device according to other aspects of the present disclosure will be described.

As previously mentioned, multilayer device 1 illustrated in FIG. 1 includes signal line 20 that transmits high-speed, high-frequency signals, ground electrode 30 that is set at ground potential, a plurality of planar electrodes 40 arranged along signal line 20, and a plurality of connecting electrodes 50 that connect ground electrode 30 and the plurality of planar electrodes 40.

However, although conventional multilayer devices can stop the passage of high-speed, high-frequency signals of a specific frequency, there are cases where it is not possible to form a stopband through which passage of high-speed, high-frequency signals is not allowed in accordance with the required specifications for multilayer devices.

In order to enable the formation of a stopband through which passage of high-speed, high-frequency signals is not allowed in accordance with the required specifications, the multilayer device according to the present embodiment has the configuration described below.

Hereinafter, Embodiments 8 and 9 will be described in detail with reference to the drawings.

2.1. Embodiment 8

[Multilayer Device Configuration]

First, the configuration of multilayer device 200A according to Embodiment 8 will be described with reference to the figures.

Figure 29:
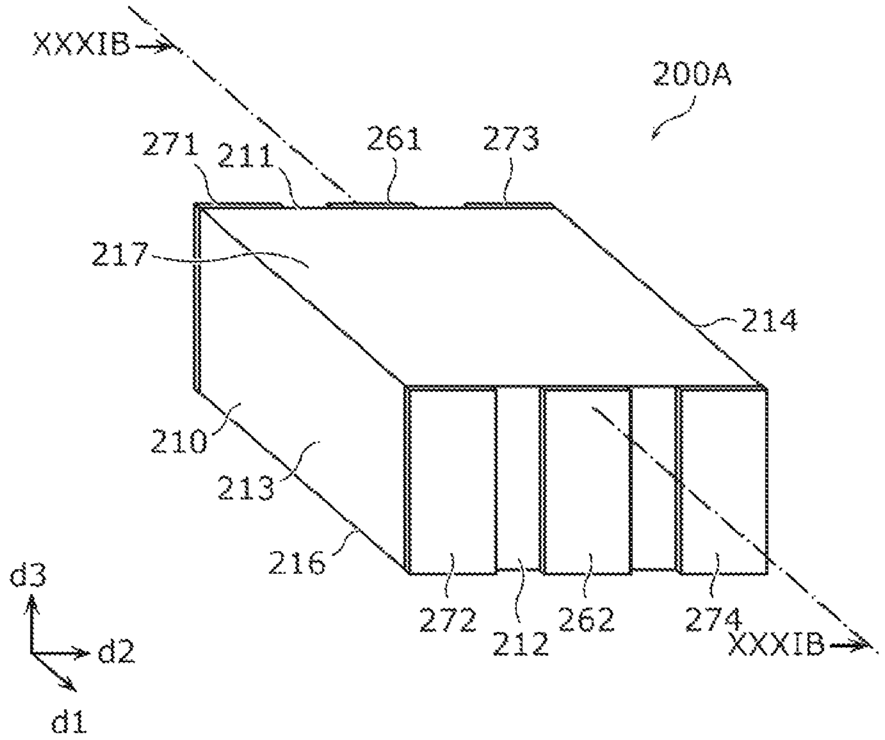
FIG. 29 is an external view of the multilayer device according to Embodiment 8.
Figure 30:
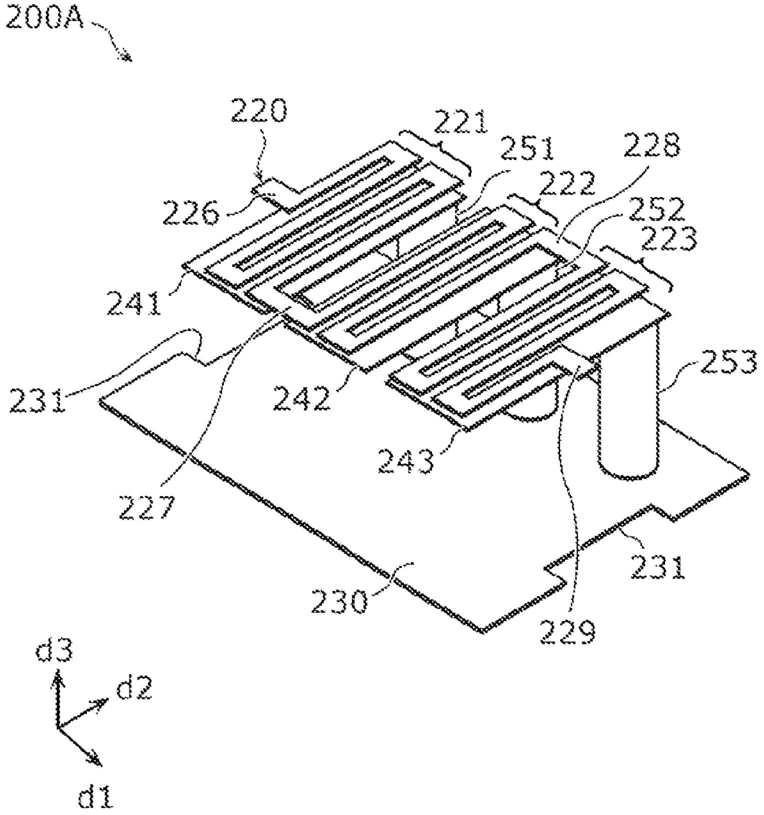
FIG. 30 illustrates the signal line, planar electrodes, ground electrode, and connecting electrodes of the multilayer device according to Embodiment 8.
Figure 31A:
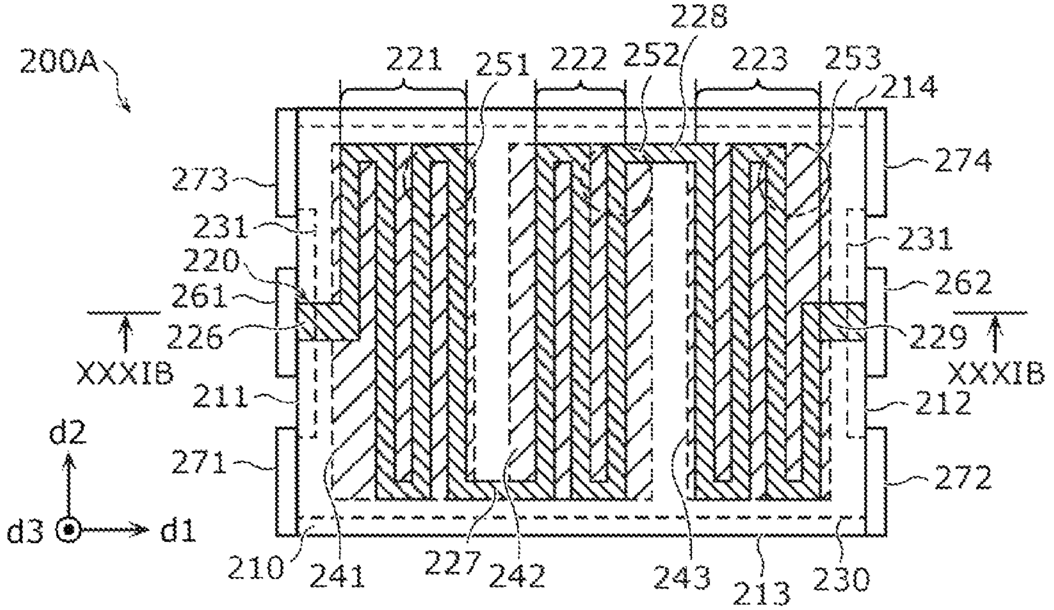
FIG. 31A is a plan view of the multilayer device according to Embodiment 8, showing the signal line and planar electrodes and the like from above.
Figure 31B:
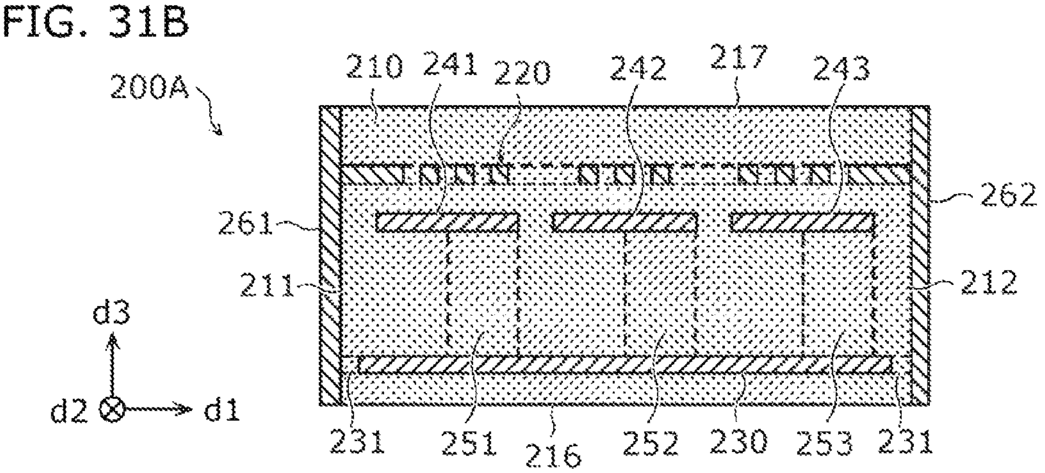
FIG. 31B is a cross-sectional view of the multilayer device according to Embodiment 8 taken at line XXXIB-XXXIB illustrated in FIG. 31A.
Figure 31C:
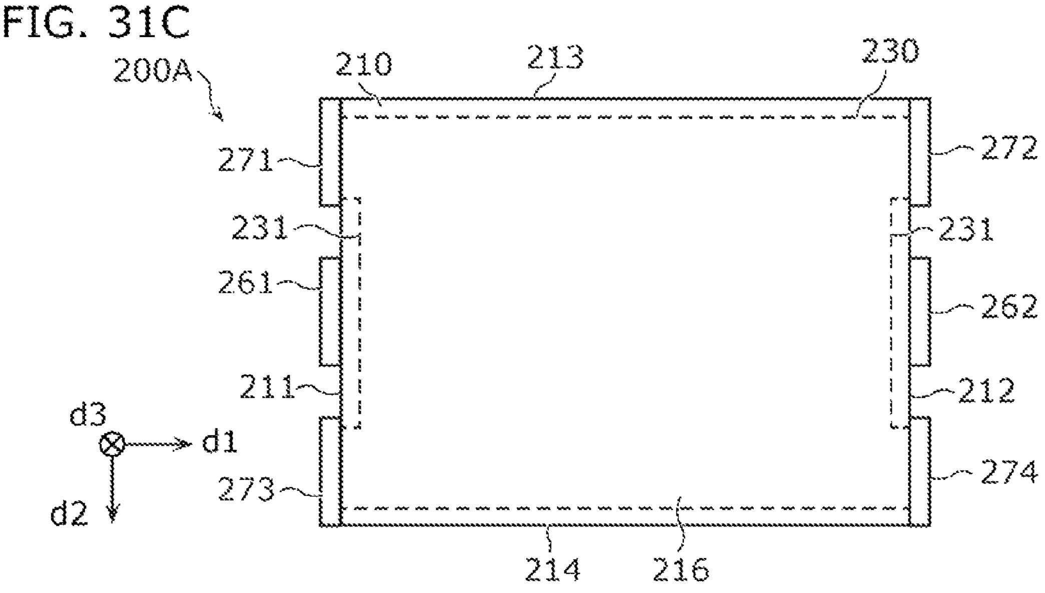
FIG. 31C is a bottom surface view of the multilayer device according to Embodiment 8.

FIG. 29 is an external view of multilayer device 200A according to Embodiment 8. FIG. 30 illustrates signal line 220, planar electrodes 241, 242, 243, ground electrode 230, and connecting electrodes 251, 252, 253 of multilayer device 200A. FIG. 31A is a plan view of multilayer device 200A, showing signal line 220 and planar electrodes 241, 242, and 243 and the like from above. FIG. 31B is a cross-sectional view of multilayer device 200A taken at line XXXIB-XXXIB illustrated in FIG. 31A. FIG. 31C is a bottom surface view of multilayer device 200A.

FIG. 30 illustrates multilayer device 200A, omitting signal terminals 261 and 262, ground terminals 271, 272, 273, and 274, and dielectric 210. In FIG. 31A, signal line 220 is illustrated with a solid line, and each of signal line 220 and planar electrodes 241, 242, and 243 is hatched. In FIG. 31C, illustration of the signal line, planar electrodes, and connecting electrodes is omitted.

Multilayer device 200A illustrated in FIG. 29, FIG. 30, and FIG. 31A through FIG. 31C includes dielectric 210, signal line 220, ground electrode 230, a plurality of planar electrodes 241, 242 and 243, and a plurality of connecting electrodes 251, 252 and 253. Multilayer device 200A also includes a plurality of signal terminals 261 and 262 and a plurality of ground terminals 271, 272, 273, and 274.

In the following, some or all of the plurality of planar electrodes 241 through 243 may be referred to simply as planar electrodes 240, and some or all of the plurality of connecting electrodes 251 through 253 may be referred to simply as connecting electrodes 250. In the following, some or all of the plurality of signal terminals 261 and 262 may be referred to simply as signal terminals 260, and some or all of the plurality of ground terminals 271 through 274 may be referred to simply as ground terminals 270.

For example, signal line 220, ground electrode 230, planar electrodes 240, and connecting electrodes 250 are formed of a metallic material such as silver or copper. Signal line 220, ground electrode 230, planar electrodes 240, and connecting electrodes 250 may be formed of the same material or using the same composition ratio, or of different materials or using different composition ratios.

Dielectric 210 is formed, for example, by stacking a plurality of dielectric layers. For example, dielectric 210 is formed of a dielectric material such as a low temperature co-fired ceramic (LTCC) material. To make multilayer device 200A smaller, using a material with a high relative permittivity for dielectric 210 is desirable. Dielectric 210 is provided between each of signal line 220, ground electrode 230, and planar electrodes 240. Dielectric 210 is formed to cover the outer peripheral surface of signal line 220 except for the two end surfaces and the outer peripheral surface of ground electrode 230 except for the two end surfaces, as well as the electrode structures of planar electrodes 240 and connecting electrodes 250.

Dielectric 210 has a cuboid shape and includes bottom surface 216, top surface 217 facing away from bottom surface 216, and a plurality of side surfaces 211, 212, 213, and 214 connecting bottom surface 216 and top surface 217. The plurality of side surfaces 211 through 214 include side surfaces 211 and 212 facing away from each other and side surfaces 213 and 214 orthogonal to both of side surfaces 211 and 212. Bottom surface 216 and top surface 217 are parallel to each other, side surfaces 211 and 212 are parallel to each other, and side surfaces 213 and 214 are parallel to each other. The corner portions (edge portions) where each face of dielectric 210 intersects may be rounded.

A direction in which side surface 211 and side surface 212 face away from each other is referred to as first direction d1, a direction in which side surface 213 and side surface 214 face away from each other is referred to as second direction d2, and a direction in which bottom surface 216 and top surface 217 face away from each other is referred to as third direction d3. Hereinafter, regarding the terms “one” and “the other”, “one” may refer to an element on negative side of first direction d1, and “the other” may refer to an element on the positive side, which is opposite to the negative side, of first direction d1.

Signal line 220 is provided inside dielectric 210 so that both ends, which are part of signal line 220, are exposed on the outer surface (side surfaces 211 and 212) of dielectric 210. Signal line 220 is arranged parallel to planar electrodes 240 and ground electrode 230.

At least a portion of signal line 220 according to the present embodiment has a meandering shape. A meandering shape is a serpentine shape. Signal line 220 illustrated in FIG. 30 and FIG. 31A includes a square-wave meandering shape. The meandering shape is not limited to a square-wave meandering shape, and may be triangular-wave, sinusoidal-wave, or a circular-arc-wave meandering shape. The meandering shape may be a pulse-wave meandering shape that is protrudes or recedes in second direction d2.

Signal line 220 includes meandering line sections 221, 222, and 223, which are regions with a meandering shape. Meandering line sections 221, 222, and 223 are arranged in this order in first direction d1, which is a direction from one end surface of dielectric 210 to the opposite end surface. Note that first direction d1 is a direction in which side surface 211 and side surface 212 face away from each other, as described above, and is the direction in which a straight line connecting the two ends of signal line 220 extends. Meandering line sections 221, 222, and 223 are provided in one-to-one correspondence with planar electrodes 241, 242, and 243. More specifically, meandering line section 221 corresponds to planar electrode 241, meandering line section 222 corresponds to planar electrode 242, and meandering line section 223 corresponds to planar electrode 243.

In other words, meandering line sections 221, 222, and 223 are provided in positions opposing planar electrodes 241, 242, and 243, respectively. In other words, when viewed from third direction d3, which is perpendicular to planar electrodes 240, meandering line section 221 overlaps with planar electrode 241, meandering line section 222 overlaps with planar electrode 242, and meandering line section 223 overlaps with planar electrode 243. In this example, the lengths of meandering line sections 221 through 223 in second direction d2 are respectively the same as the lengths of planar electrodes 241 through 243 in second direction d2. The lengths of meandering line sections 221 through 223 in first direction d1 are shorter than the lengths of planar electrodes 241 through 243 in first direction d1. Capacitive component C40 in multilayer device 200A (see FIG. 2) is generated in the opposing regions of meandering line sections 221, 222, and 223 and planar electrodes 241, 242, and 243.

Signal line 220 includes a plurality of straight coupling line sections 226, 227, 228, and 229. Coupling line section 226 connects signal terminal 261 and meandering line section 221. Coupling line section 227 connects meandering line sections 221 and 222, which are adjacent in first direction d1. Coupling line section 228 connects meandering line sections 222 and 223, which are adjacent in first direction d1. Coupling line section 229 connects meandering line section 223 and signal terminal 262. Meandering line sections 221 through 223 are connected in series by coupling line sections 226 through 229.

In a state in which multilayer device 200A is mounted in an electronics device, high-speed, high-frequency signals are input to and output from signal line 220 via signal terminals 260.

Signal terminals 260 are provided on the outer surface (side surfaces 211 and 212) of dielectric 210. Signal terminal 261, which is one of the two signal terminals 261 and 262, is provided on side surface 211, and signal terminal 262, which is the other of the two signal terminals 261 and 262, is provided on side surface 212. The one signal terminal 261 is connected to one end of signal line 220, and the other signal terminal 262 is connected to the other end of signal line 220.

Ground electrode 230 is provided inside dielectric 210 so that a part of ground electrode 230 is exposed on the outer surfaces (side surfaces 211 and 212) of dielectric 210. Ground electrode 230 includes rectangular notches 231 at both ends in first direction d1, and is arranged at a predetermined distance from signal terminals 260 so as not to contact signal terminals 260. Ground electrode 230 is arranged at a predetermined distance from side surfaces 213 and 214 so as not to be exposed on side surfaces 213 and 214. Note that ground electrode 230 may be provided on bottom surface 216 of dielectric 210 rather than inside dielectric 210. Ground electrode 230 may have a structure with an aperture pattern, for example, a mesh structure, instead of a solid pattern. By giving ground electrode 230 a mesh structure, dielectrics 210 can be bonded to each other to improve bonding strength.

In a state in which multilayer device 200A is mounted in an electronics device, ground electrode 230 is set to ground potential via ground terminal 270.

Ground terminals 270 are provided on the outer surface (side surfaces 211 and 212) of dielectric 210. Ground terminals 271 and 273, which constitute one set of the four ground terminals 271 through 274, are provided on side surface 211, and ground terminals 272 and 274, which constitute the other set of the four ground terminals 271 through 274, are provided on side surface 212. The one set of ground terminals 271 and 273 are connected to one end of ground electrode 230, and the other set of ground terminals 272 and 274 are connected to the other end of ground electrode 230. The one set of ground terminals 271 and 273 are arranged on both sides, in second direction d2, of the one signal terminal 261. The other set of ground terminals 272 and 274 are arranged on both sides, in second direction d2, of the other signal terminal 262. Stated differently, the one signal terminal 261 is arranged between two ground terminals 271 and 273, and the other signal terminal 262 is arranged between two ground terminals 272 and 274.

Note that the number of ground terminals 270 is not limited to four; the number of ground terminals 270 may be two. Ground terminals 270 may be provided one each on side surfaces 211 and 212 or side surfaces 213 and 214 of dielectric 210. For example, ground terminals 270 may be provided one each on side surfaces 211 and 212. In such cases, it is desirable to arrange ground terminals 270 on a diagonal line so that the mounting orientation does not need to be taken into consideration. Additionally, ground terminals 270 may not only be provided on side surfaces 211 and 212, but may also be provided on side surfaces 213 and 214. Moreover, ground terminals 270 may be provided only on side surfaces 213 and 214. In such cases, part of ground electrode 230 may be exposed on side surfaces 213 and 214, and ground terminal 270 may be connected to the exposed ground electrode 230.

Planar electrode 240 is provided inside dielectric 210 so as to be positioned between signal line 220 and ground electrode 230 in third direction d3. Planar electrode 240 is arranged parallel to signal line 220 and ground electrode 230. The gap between planar electrode 240 and signal line 220 is smaller than the gap between ground electrode 230 and signal line 220. In the present embodiment, the gap between planar electrode 240 and signal line 220 is, for example, greater than or equal to 0.1 times and less than or equal to 0.5 times the gap between ground electrode 230 and signal line 220, but the size of this gap is set appropriately according to the stopband required for multilayer device 200A. The plurality of planar electrodes 240 are rectangular-shaped planar electrodes. However, the shape of planar electrode 240 is not limited to rectangular, and may be square, polygonal, circular or elliptical. The plurality of planar electrodes 241, 242, and 243 are arranged equidistantly in this order in first direction d1. Each of planar electrodes 241, 242, and 243 has the same shape and size. The gap between each of planar electrodes 241, 242, and 243 and signal line 220 is the same.

Connecting electrodes 250 are via conductors that connect planar electrodes 240 and ground electrode 230, and are provided inside dielectric 210. Connecting electrodes 250 are formed so as to penetrate dielectric 210 positioned between planar electrodes 240 and ground electrode 230. Connecting electrodes 250 are columnar, and the diameter of each connecting electrode 250 is larger than the thickness of each planar electrode 240. The length of each connecting electrode 250 is smaller than the gap between ground electrode 230 and signal line 220. Note that in this multilayer device 200A, changing the length of connecting electrodes 250 changes the distance between planar electrodes 240 and ground electrode 230, and also changes the gap between planar electrodes 240 and signal line 220. Stated differently, changing inductive component L50 by changing the length of connecting electrode 250 also changes capacitive component C40, which is influenced by the gap between planar electrode 240 and signal line 220.

The plurality of connecting electrodes 251, 252, and 253 are arranged equidistantly in this order in first direction d1. Each of connecting electrodes 251, 252, and 253 has the same shape and size. Connecting electrodes 251 through 253 are provided arranged in first direction d1 to correspond one-to-one with planar electrodes 241 through 243, respectively. More specifically, connecting electrode 251 is provided to connect planar electrode 241 and ground electrode 230, connecting electrode 252 is provided to connect planar electrode 242 and ground electrode 230, and connecting electrode 253 is provided to connect planar electrode 243 and ground electrode 230. Connecting electrodes 251 through 253 are connected to the corners of the outer peripheral edge portions of planar electrodes 241 through 243. Note that connecting electrodes 251 through 253 do not necessarily need to be connected to the corners of the outer peripheral edge portions of planar electrodes 241 through 243; they may be connected to the respective centers of planar electrodes 241 through 243.

In the present embodiment, at least a portion of signal line 220 of multilayer device 200A has a meandering shape. Accordingly, signal line 220 and planar electrodes 240 can generate capacitive component C40 corresponding to the meandering shape. For example, by increasing the region defined by the meandering shape, the opposing surface area between signal line 220 and planar electrode 240 can be increased, and by decreasing the region defined by the meandering shape, the opposing surface area between signal line 220 and planar electrode 240 can be reduced. By changing the opposing surface area, the value of capacitive component C40 can be changed, which means the frequency of the stopband of multilayer device 200A can be changed. This allows for the formation of a stopband in accordance with the required specifications.

The above presents an example in which multilayer device 200A is a mountable chip component configured to be mounted on a printed circuit board or the like, but the present disclosure is not limited to this example. For example, multilayer device 200A need not include signal terminals and ground terminals; multilayer device 200A may be configured such that dielectric 210, signal line 220, ground electrode 230, planar electrodes 240, and connecting electrodes 250 are provided inside the printed circuit board, as part of the printed circuit board.

[Multilayer Device Manufacturing Method]

Figure 32:
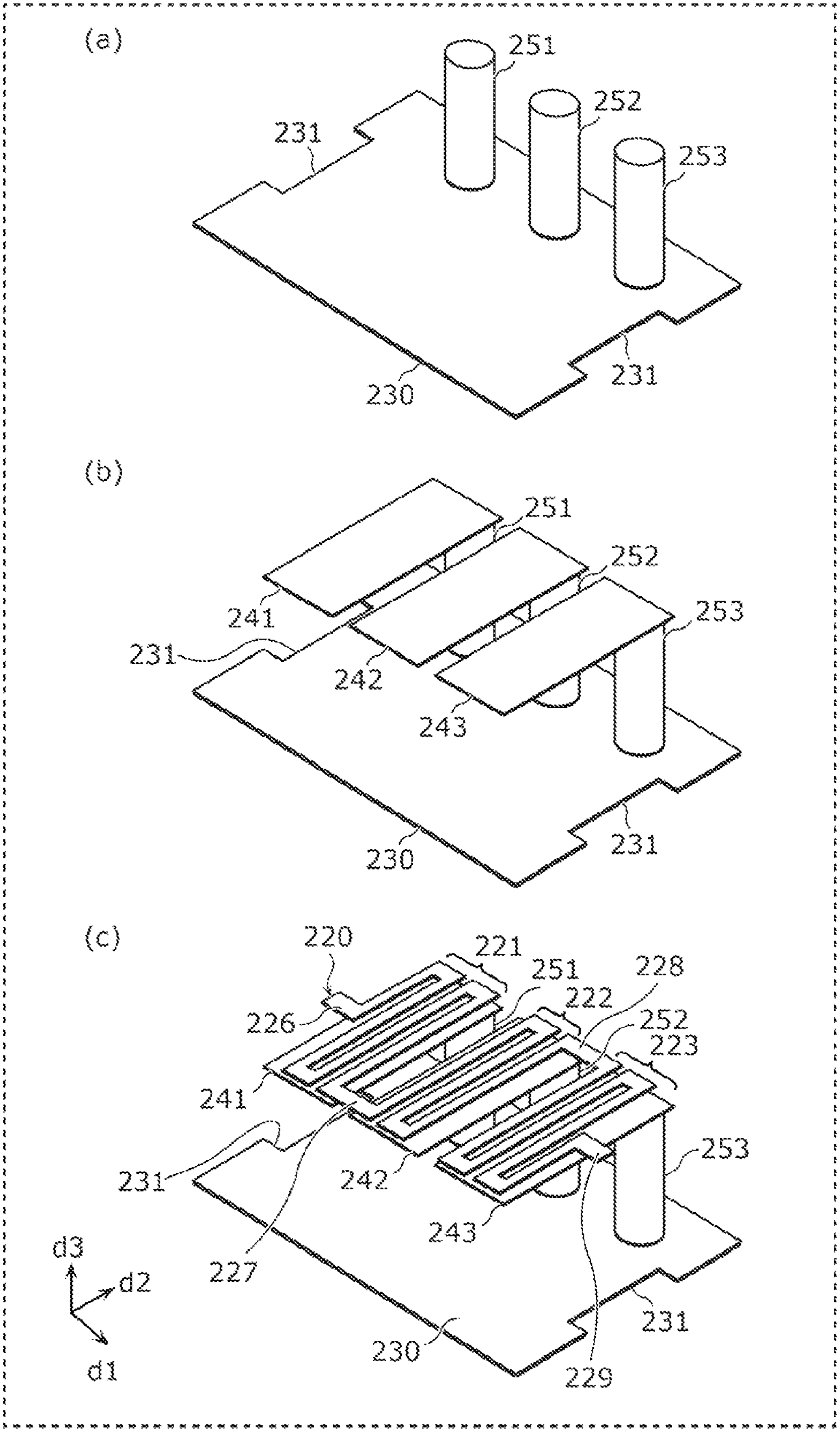
FIG. 32 illustrates one example of the manufacturing process of the multilayer device according to Embodiment 8.

FIG. 32 illustrates one example of the manufacturing process of multilayer device 200A.

First, one or more layers of green sheets with no electrode patterns are stacked to form a lower layer sheet. A green sheet is a dielectric sheet that becomes a dielectric layer after sintering. Next, a green sheet that includes a ground electrode pattern is stacked on the lower layer sheet. The ground electrode pattern is a printed pattern that becomes ground electrode 230 after sintering. Next, a plurality of green sheets that include connecting electrode patterns are stacked on the green sheet that includes the ground electrode pattern. The connecting electrode pattern is a printed pattern that becomes connecting electrodes 250 (see (a) in FIG. 32) after sintering. Next, a green sheet that includes a connecting electrode pattern and a planar electrode pattern is stacked on the green sheet that includes the connecting electrode pattern. The planar electrode pattern is a printed pattern that becomes planar electrodes 240 (see (b) in FIG. 32) after sintering. Next, a green sheet that includes a signal line pattern is stacked on the green sheet that includes the connecting electrode pattern and planar electrode pattern. The signal line pattern is a printed pattern that becomes signal line 220 (see (c) in FIG. 32) after sintering. Next, one or more layers of green sheets with no electrode patterns are stacked on the green sheet that includes the signal line pattern to form the upper layer sheet.

The group of sheets stacked in this manner is pressed to form a mother stack. Next, the mother stack is singulated by a cutting process, and the singulated stacks are sintered. Then, signal terminals 260 and ground terminals 270 are formed on the side surfaces of the sintered stacks. This fabricates the above-described multilayer device 200A.

Variation 1 of Embodiment 8

Next, the configuration of multilayer device 200B according to Variation 1 of Embodiment 8 will be described. Variation 1 describes an example in which wide line section 222*p* is provided instead of meandering line section 222.

Figure 33:
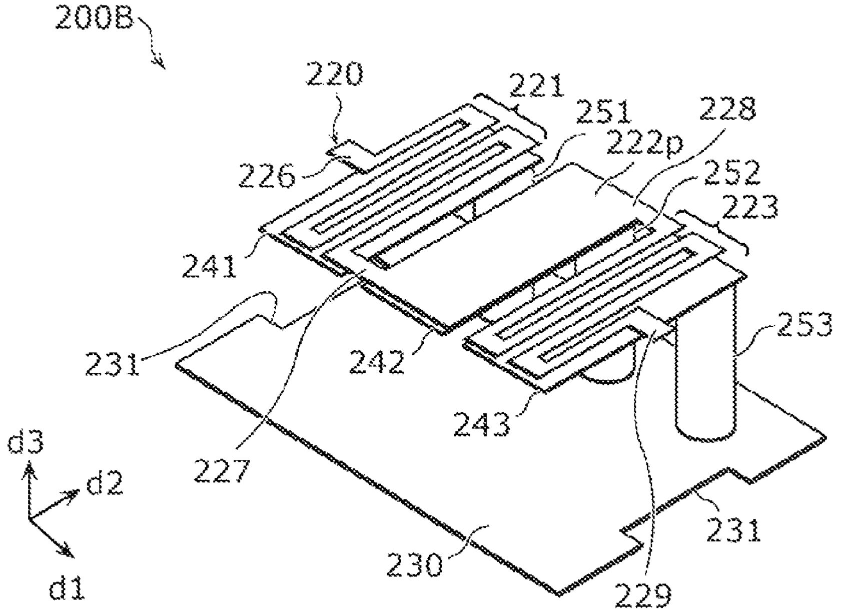
FIG. 33 illustrates the signal line, planar electrodes, ground electrode, and connecting electrodes of the multilayer device according to Variation 1 of Embodiment 8.
Figure 34:
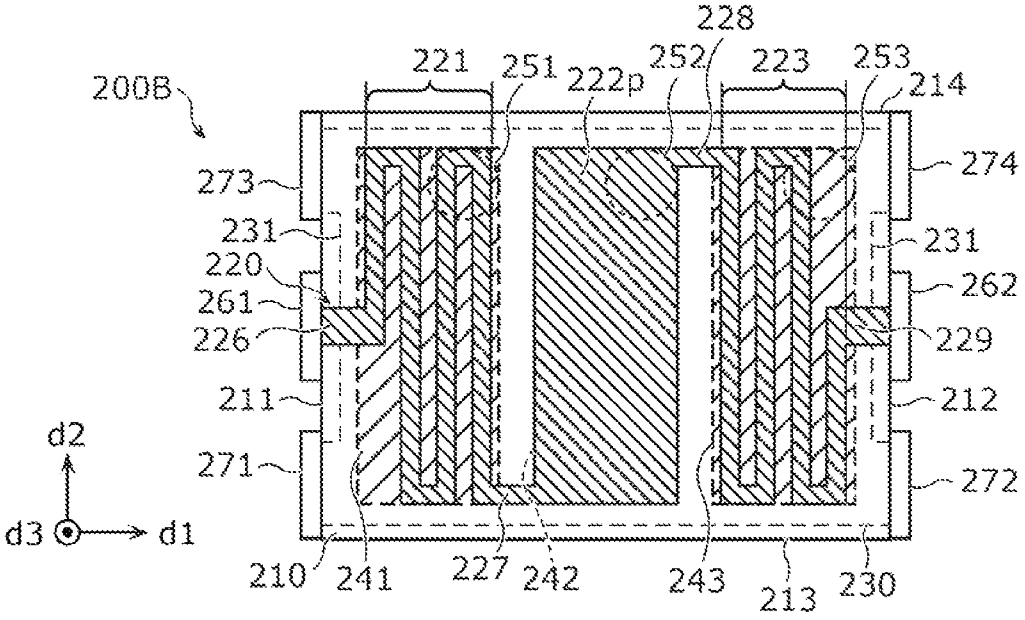
FIG. 34 is a plan view of the multilayer device according to Variation 1 of Embodiment 8, showing the signal line and planar electrodes and the like from above.

FIG. 33 illustrates signal line 220, planar electrodes 240, ground electrode 230, and connecting electrodes 250 of multilayer device 200B according to Variation 1. FIG. 34 is a plan view of multilayer device 200B according to Variation 1, showing signal line 220 and planar electrodes 240 and the like from above. In FIG. 34, signal line 220 is illustrated with a solid line, and each of signal line 220 and planar electrodes 240 is hatched. The configuration of planar electrodes 240, ground electrode 230, and connecting electrodes 250 in multilayer device 200B is the same as in Embodiment 8.

At least a portion of signal line 220 according to Variation 1 has a meandering shape. Signal line 220 includes meandering line sections 221 and 223, which are regions with a meandering shape, as well as wide line section 222*p* with a wide line width. Wide line section 222*p* has a wider line width than coupling line sections 226, 227, 228, and 229, which have normal line widths. Wide line section 222*p* is a planar region and is provided in the center portion of signal line 220. Meandering line sections 221 and 223 are provided on both sides of the center portion of signal line 220, that is, on both sides of wide line section 222*p*. Among meandering line sections 221 and 223 located at both end portions of signal line 220, meandering line section 221 is connected to signal terminal 261, and meandering line section 223 is connected to signal terminal 262. Stated differently, meandering line section 221, wide line section 222*p*, and meandering line section 223 are arranged in this order in first direction d1. Meandering line section 221, wide line section 222*p*, and meandering line section 223 are provided in one-to-one correspondence with planar electrodes 241, 242, and 243. More specifically, meandering line section 221 corresponds to planar electrode 241, wide line section 222*p* corresponds to planar electrode 242, and meandering line section 223 corresponds to planar electrode 243.

In other words, meandering line section 221, wide line section 222*p*, and meandering line section 223 are provided in positions opposing planar electrodes 241, 242, and 243, respectively. In other words, when viewed from third direction d3, which is perpendicular to planar electrodes 240, meandering line section 221 overlaps with planar electrode 241, wide line section 222*p* overlaps with planar electrode 242, and meandering line section 223 overlaps with planar electrode 243. In this example, the lengths of meandering line section 221, wide line section 222*p*, and meandering line section 223 in second direction d2 are respectively the same as the lengths of planar electrodes 241 through 243 in second direction d2. The lengths of meandering line sections 221 and 223 in first direction d1 are shorter than the respective lengths of planar electrodes 241 and 243 in first direction d1, and the length of wide line section 222*p* in first direction d1 is the same as the length of planar electrode 242 in first direction d1. Capacitive component C40 in multilayer device 200B (see FIG. 2) is generated in the opposing regions of meandering line section 221, wide line section 222*p*, and meandering line section 223, and planar electrodes 241, 242, and 243. Capacitive component C40 of multilayer device 200B according to Variation 1 is larger than capacitive component C40 of multilayer device 200A according to Embodiment 8. Inductive component L20 of multilayer device 200B according to Variation 1 is smaller than inductive component L20 of multilayer device 200A according to Embodiment 8.

Signal line 220 includes a plurality of straight coupling line sections 226, 227, 228, and 229. Coupling line section 226 connects signal terminal 261 and meandering line section 221. Coupling line section 227 connects meandering line section 221 and wide line section 222*p*, which are adjacent in first direction d1. Coupling line section 228 connects wide line section 222*p* and meandering line section 223, which are adjacent in first direction d1. Coupling line section 229 connects meandering line section 223 and signal terminal 262. Meandering line section 221, wide line section 222*p*, and meandering line section 223 are connected in series by coupling line sections 226 through 229.

In a state in which multilayer device 200B is mounted in an electronics device, high-speed, high-frequency signals are input to and output from signal line 220 via signal terminals 260.

At least a portion of signal line 220 of multilayer device 200B according to Variation 1 also has a meandering shape. Accordingly, signal line 220 and planar electrodes 240 can generate capacitive component C40 corresponding to the meandering shape. For example, by changing the value of capacitive component C40 in accordance with the meandering shape, the frequency of the stopband of multilayer device 200B can be changed. This allows for the formation of a stopband in accordance with the required specifications.

[Variation 2 of Embodiment 8]

Next, the configuration of multilayer device 200C according to Variation 2 of Embodiment 8 will be described. Variation 2 describes an example in which wide line sections 221*p* and 223*p* are provided instead of meandering line sections 221 and 223.

Figure 35:
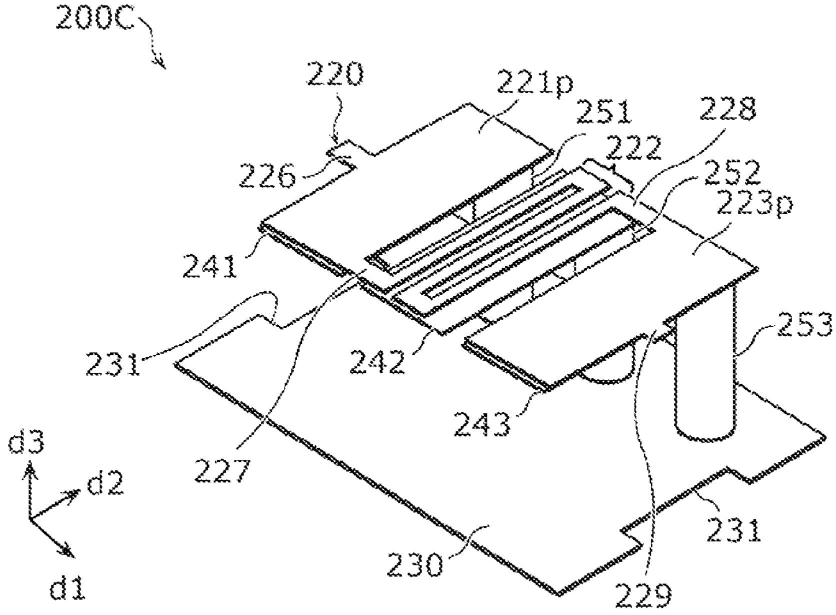
FIG. 35 illustrates the signal line, planar electrodes, ground electrode, and connecting electrodes of the multilayer device according to Variation 2 of Embodiment 8.
Figure 36:
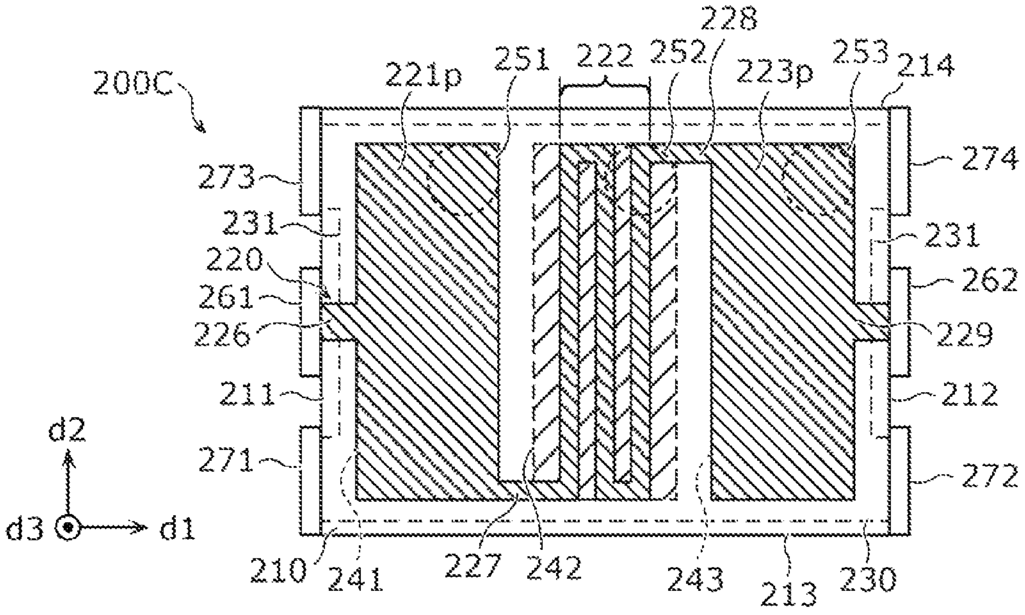
FIG. 36 is a plan view of the multilayer device according to Variation 2 of Embodiment 8, showing the signal line and planar electrodes and the like from above.

FIG. 35 illustrates signal line 220, planar electrodes 240, ground electrode 230, and connecting electrodes 250 of multilayer device 200C according to Variation 2. FIG. 36 is a plan view of multilayer device 200C according to Variation 2, showing signal line 220 and planar electrodes 240 and the like from above. In FIG. 36, signal line 220 is illustrated with a solid line, and each of signal line 220 and planar electrodes 240 is hatched. The configuration of planar electrodes 240, ground electrode 230, and connecting electrodes 250 in multilayer device 200C is the same as in Embodiment 8.

At least a portion of signal line 220 according to Variation 2 has a meandering shape. Signal line 220 includes meandering line section 222, which is a region with a meandering shape, as well as wide line sections 221*p* and 223*p* with a wide line width. Meandering line section 222 is provided in the center portion of signal line 220. Wide line sections 221*p* and 223*p* have a wider line width than coupling line sections 226, 227, 228, and 229, which have normal line widths. Wide line sections 221*p* and 223*p* are planar regions and are provided on both sides of the center portion of signal line 220, that is, on both sides of meandering line section 222. Among wide line sections 221*p* and 223*p* located at both end portions of signal line 220, wide line section 221*p* is connected to signal terminal 261, and wide line section 223*p* is connected to signal terminal 262. Stated differently, wide line section 221*p*, meandering line section 222, and wide line section 223*p* are arranged in this order in first direction d1. Wide line section 221*p*, meandering line section 222, and wide line section 223*p* are provided in one-to-one correspondence with planar electrodes 241, 242, and 243. More specifically, wide line section 221*p* corresponds to planar electrode 241, meandering line section 222 corresponds to planar electrode 242, and wide line section 223*p* corresponds to planar electrode 243.

In other words, wide line section 221*p*, meandering line section 222, and wide line section 223*p* are provided in positions opposing planar electrodes 241, 242, and 243, respectively. In other words, when viewed from third direction d3, which is perpendicular to planar electrodes 240, wide line section 221*p* overlaps with planar electrode 241, meandering line section 222 overlaps with planar electrode 242, and wide line section 223*p* overlaps with planar electrode 243. In this example, the lengths of wide line section 221*p*, meandering line section 222, and wide line section 223*p* in second direction d2 are respectively the same as the lengths of planar electrodes 241 through 243 in second direction d2. The lengths of wide line sections 221*p* and 223*p* in first direction d1 are the same as the respective lengths of planar electrodes 241 and 243 in first direction d1, and the length of meandering line section 222 in first direction d1 is shorter than the length of planar electrode 242 in first direction d1. Capacitive component C40 in multilayer device 200C (see FIG. 2) is generated in the opposing regions of (i) wide line section 221*p*, meandering line section 222, and wide line section 223*p* and (ii) planar electrodes 241, 242, and 243. Capacitive component C40 of multilayer device 200C according to Variation 2 is larger than capacitive component C40 of multilayer device 200A according to Embodiment 8. Inductive component L20 of multilayer device 200C according to Variation 2 is smaller than inductive component L20 of multilayer device 200A according to Embodiment 8.

Signal line 220 includes a plurality of straight coupling line sections 226, 227, 228, and 229. Coupling line section 226 connects signal terminal 261 and wide line section 221*p*. Coupling line section 227 connects wide line section 221*p* and meandering line section 222, which are adjacent in first direction d1. Coupling line section 228 connects meandering line section 222 and wide line section 223*p*, which are adjacent in first direction d1. Coupling line section 229 connects wide line section 223*p* and signal terminal 262. Wide line section 221*p*, meandering line section 222, and wide line section 223*p* are connected in series by coupling line sections 226 through 229.

In a state in which multilayer device 200C is mounted in an electronics device, high-speed, high-frequency signals are input to and output from signal line 220 via signal terminals 260.

At least a portion of signal line 220 of multilayer device 200C according to Variation 2 also has a meandering shape. Accordingly, signal line 220 and planar electrodes 240 can generate capacitive component C40 corresponding to the meandering shape. For example, by changing the value of capacitive component C40 in accordance with the meandering shape, the frequency of the stopband of multilayer device 200C can be changed. This allows for the formation of a stopband in accordance with the required specifications.

[Advantageous Effects, etc.]

Next, the advantageous effects of multilayer devices 200A, 200B, and 200C having the above-described configurations will be described with reference to FIG. 37.

The design criteria for multilayer devices 200A, 200B, and 200C are as follows.

- Multilayer device outline size: 0.8 mm long, 0.6 mm wide, 0.45 mm high
- Signal line 220 width: 0.05 mm
- Meandering L/S: 0.025 mm/0.025 mm
- Width of planar electrodes 240 (length in second direction d2): 0.5 mm
- Length of planar electrodes 240 (length in first direction d1): 0.2 mm
- Distance between planar electrodes 240 adjacent to each other in first direction d1: 0.05 mm
- Via diameter of connecting electrodes 250: 0.1 mm
- Thickness of each of signal line 220, ground electrode 230, and planar electrodes 240: 10 μm
- Thickness of dielectric 210 beneath ground electrode 230: 35 μm
- Length of connecting electrodes 250: 320 μm
- Distance between planar electrodes 240 and signal line 220: 25 μm
- Thickness of dielectric 210 above signal line 220: 70 μm
- Relative permittivity of dielectric 210: 4.1
- Dissipation factor of dielectric 210: 0.015
- Length of each of coupling line sections 226 and 229: 0.0625 mm
- Length of each of coupling line sections 227 and 228 of multilayer device 200A: 0.1 mm
- Length of each of coupling line sections 227 and 228 of multilayer device 200B: 0.0625 mm
- Length of each of coupling line sections 227 and 228 of multilayer device 200C: 0.0875 mm Next, the pass-through characteristics of a multilayer device designed in accordance with these design criteria will be described.

Figure 37:
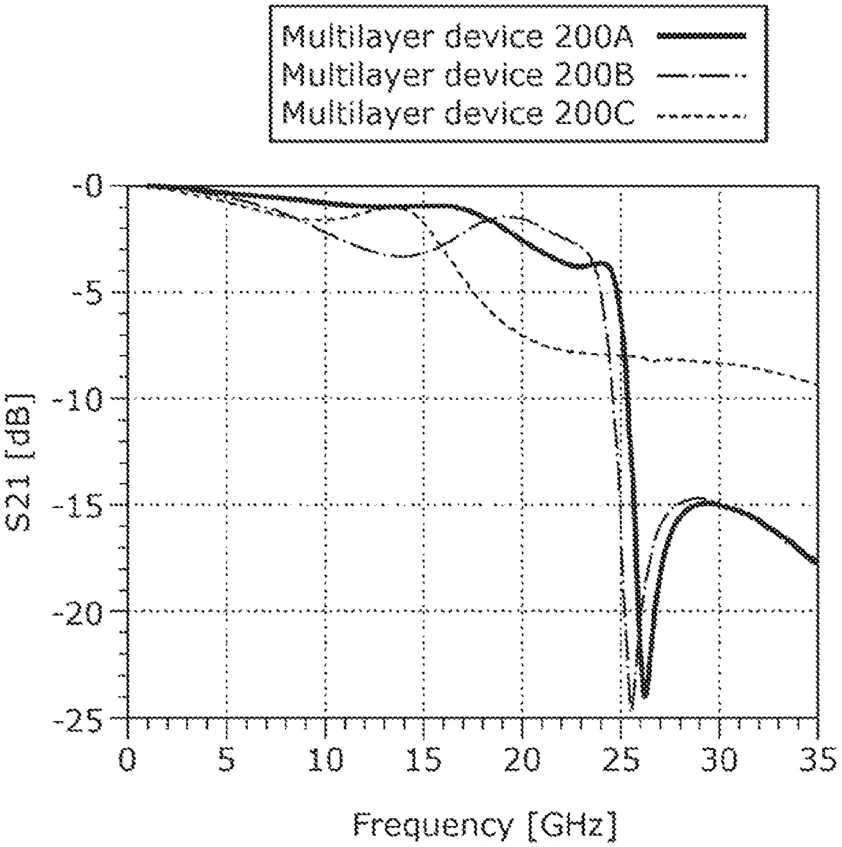
FIG. 37 illustrates the pass-through characteristics of the multilayer device according to Embodiment 8, Variation 1, and Variation 2.

FIG. 37 illustrates the pass-through characteristics of the multilayer device according to Embodiment 8, Variation 1, and Variation 2. The S parameter (S21) is represented on the vertical axis in FIG. 37.

As illustrated in FIG. 37, multilayer device 200A of Embodiment 8 has an attenuation pole near a frequency of 26.4 GHZ, and insertion loss is greatest at this attenuation pole. Multilayer device 200A is capable of stopping the passage of signals with a frequency of 26.4 GHz. Multilayer device 200B according to Variation 1 has an attenuation pole near a frequency of 25.5 GHZ, and insertion loss is greatest at this attenuation pole. Multilayer device 200B is capable of stopping the passage of signals with a frequency of 25.5 GHZ. Multilayer device 200C according to Variation 2 has less attenuation compared to Embodiment 8 and Variation 2, but can secure attenuation over a wide frequency band greater than or equal to 20 GHz. Multilayer device 200C is capable of stopping the passage of broadband signals.

The frequency of the stopband of the multilayer device can be changed by changing the meandering shape of signal line 220 like in these multilayer devices 200A, 200B, and 200C. This allows for the formation of a stopband in accordance with the required specifications.

2.2. Embodiment 9

[Multilayer Device Configuration]

First, the configuration of multilayer device 200D according to Embodiment 9 will be described with reference to FIG. 38 and FIG. 39. Embodiment 9 pertains to an example in which multilayer device 200D is a common mode filter.

Figure 38:
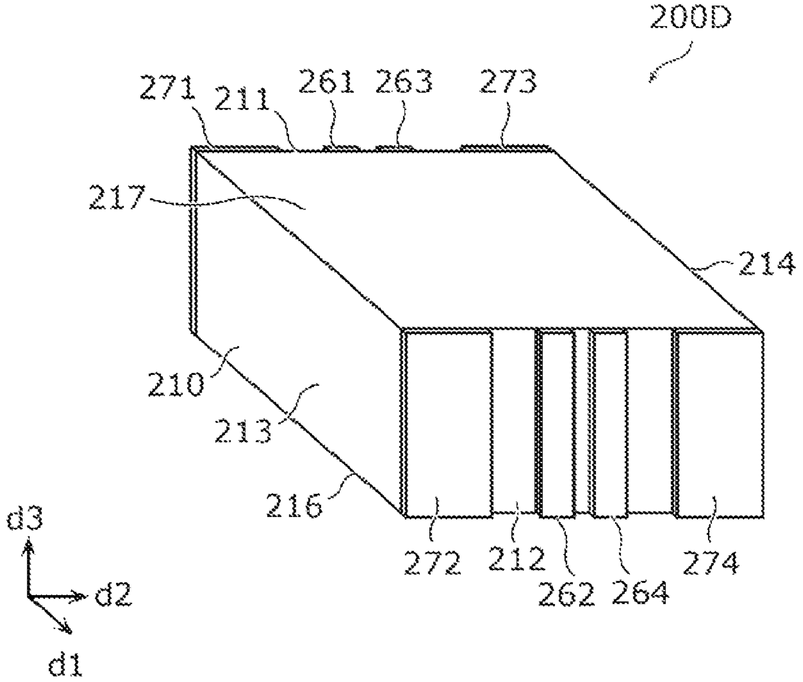
FIG. 38 is an external view of the multilayer device according to Embodiment 9.

FIG. 38 is an external view of multilayer device 200D according to Embodiment 9. FIG. 39 illustrates signal line 220, planar electrodes 240, ground electrode 230, and connecting electrodes 250 of multilayer device 200D.

Figure 39:
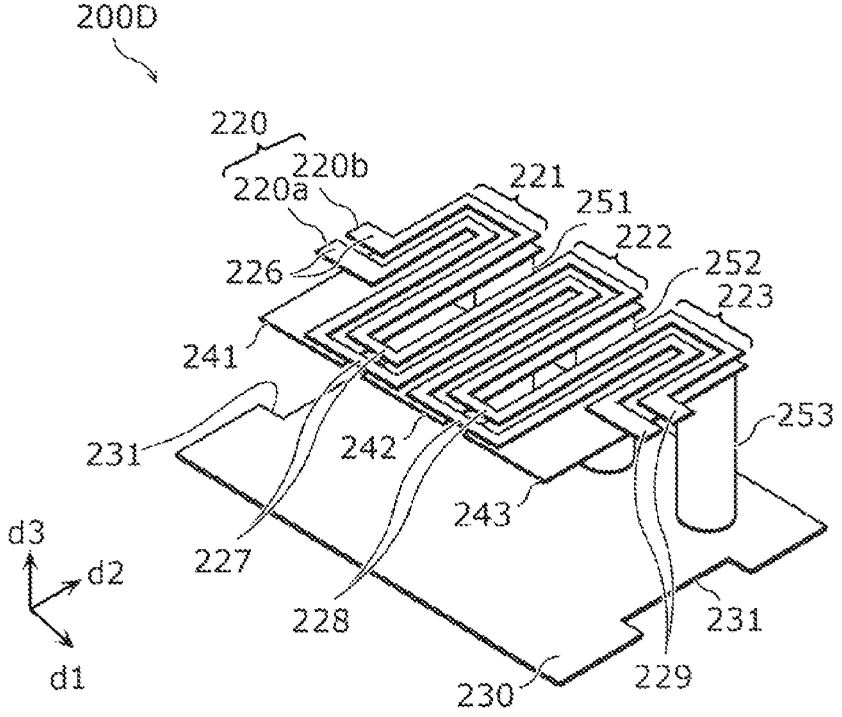
FIG. 39 illustrates the signal line, planar electrodes, ground electrode, and connecting electrodes of the multilayer device according to Embodiment 9.

Multilayer device 200D illustrated in FIG. 38 and FIG. 39 includes dielectric 210, signal line 220, ground electrode 230, a plurality of planar electrodes 241, 242 and 243, and a plurality of connecting electrodes 251, 252 and 253. Multilayer device 200D also includes a plurality of signal terminals 261, 262, 263, and 264 and a plurality of ground terminals 271, 272, 273, and 274. Dielectric 210, ground electrode 230, planar electrodes 240, connecting electrodes 250, and ground terminals 271 through 274 in multilayer device 200D are the same as in Embodiment 8.

Signal line 220 according to Embodiment 9 is a differential line consisting of two parallel signal lines 220*a* and 220*b* provided inside dielectric 210. At least a portion of each of signal lines 220*a* and 220*b* has a meandering shape. Each of signal lines 220*a* and 220*b* is arranged parallel to planar electrodes 240 and ground electrode 230. In a state in which multilayer device 200D is mounted in an electronics device, differential signals are transmitted through the two signal lines 220*a* and 220*b*.

The four signal terminals 261 through 264 are provided on side surfaces 211 and 212 of dielectric 210. Signal terminals 261 and 263, which constitute one set of the four signal terminals 261 through 264, are provided on side surface 211, and signal terminals 262 and 264, which constitute the other set of the four signal terminals 261 through 264, are provided on side surface 212. Signal terminal 261 in the one set is connected to one end of signal line 220*a*, and signal terminal 263 in the one set is connected to the one end of signal line 220*b*. Signal terminal 262 in the other set is connected to the other end of signal line 220*a*, and signal terminal 264 in the other set is connected to the other end of signal line 220*b*. The one set of signal terminals

261 and 263 are arranged between the two ground terminals 271 and 273, and the other set of signal terminals 262 and 264 are arranged between the two ground terminals 272 and 274.

At least a portion of signal lines 220*a* and 220*b* of multilayer device 200D according to Embodiment 9 also has a meandering shape. Accordingly, signal lines 220*a* and 220*b* and planar electrodes 240 can generate capacitive component C40 corresponding to the meandering shape. For example, by changing the value of capacitive component C40 in accordance with the meandering shape, the frequency of the stopband of multilayer device 200D can be changed. This allows for the formation of a stopband in accordance with the required specifications.

2.3. Overview

Multilayer device 200A according to the present embodiment includes: dielectric 210; signal line 220 provided inside dielectric 210 and including a portion exposed on an outer surface of dielectric 210; ground electrode 230 provided inside or on the outer surface of dielectric 210 and including at least a portion exposed on the outer surface of dielectric 210; a plurality of planar electrodes 240 provided inside dielectric 210, arranged parallel to ground electrode 230, and arranged in first direction d1; a plurality of connecting electrodes 250 that are provided inside dielectric 210 and connect the plurality of planar electrodes 240 and ground electrode 230; a plurality of signal terminals 260 provided on the outer surface of dielectric 210 and connected to signal line 220; and a plurality of ground terminals 270 provided on the outer surface of dielectric 210 and connected to ground electrode 230. At least a portion of signal line 220 has a meandering shape.

In this way, by signal line 220 having a meandering shape, signal line 220 and planar electrodes 240 can generate capacitive component C40 corresponding to the meandering shape. For example, by increasing the region defined by the meandering shape, the opposing surface area between signal line 220 and planar electrode 240 can be increased, and by decreasing the region defined by the meandering shape, the opposing surface area between signal line 220 and planar electrode 240 can be reduced. By changing the opposing surface area, the value of capacitive component C40 can be changed, which means the frequency of the stopband of multilayer device 200A can be changed. This allows for the formation of a stopband in accordance with the required specifications for multilayer device 200A.

For example, when forming an electrode structure that includes signal line 220, ground electrode 230, planar electrodes 240, and connecting electrodes 250 inside a printed circuit board, the printed circuit board must have a multilayer structure. In contrast, the number of layers of the printed circuit board on which multilayer device 200A is mounted can be reduced by making multilayer device 200A, which includes the above-described electrode structure, an electronic component to be mounted on the printed circuit board, instead of forming the electrode structure inside the printed circuit board. This can inhibit an increase in the cost of printed circuit boards.

Signal line 220 may include a meandering line section (for example, meandering line section 221) having the meandering shape, and the meandering line section may be provided in a position opposing a planar electrode (for example, planar electrode 241).

In this way, by a meandering line section (for example, meandering line section 221) being provided at a position opposing a planar electrode (for example, planar electrode 241), meandering line section 221 and planar electrode 241 can generate capacitive component C40 corresponding to the meandering shape. For example, by changing the value of capacitive component C40 in accordance with the meandering shape, the frequency of the stopband of multilayer device 200A can be changed. This allows for the formation of a stopband in accordance with the required specifications for multilayer device 200A.

Signal line 220 may include a plurality of meandering line sections 221, 222, 223 having the meandering shape, and the plurality of meandering line sections 221, 222, 223 may be provided in one-to-one correspondence with the plurality of planar electrodes 241, 242, 243.

In this way, by meandering line sections 221, 222, and 223 being provided in a one-to-one correspondence with planar electrodes 241, 242, and 243, meandering line sections 221 through 223 and planar electrodes 241 through 243 can generate capacitive component C40 corresponding to the meandering shape. For example, by changing the value of capacitive component C40 in accordance with the meandering shape, the frequency of the stopband of multilayer device 200A can be changed. This allows for the formation of a stopband in accordance with the required specifications for multilayer device 200A.

Meandering line sections 221 and 223 may be provided at the end portions of signal line 220 and connected to signal terminals 261 and 262.

In this way, by meandering line sections 221 and 223 being provided at the end portions of signal line 220 and connected to signal terminals 261 and 262, attenuation in the stopband of multilayer device 200A or 200B can be increased. This allows for the formation of a stopband in accordance with the required specifications for multilayer device 200A or 200B.

Signal line 220 may include two parallel lines provided in or on dielectric 210.

This allows for multilayer device 200D to be used as a common mode filter.

The two parallel lines may be differential lines on which differential signals are transmitted.

This makes it possible to provide multilayer device 200D that includes a common mode filter functionality.

Multilayer device 200A according to the present embodiment includes: signal line 220 that transmits a signal; ground electrode 230 set to ground potential; a plurality of planar electrodes 240 arranged parallel to ground electrode 230 and arranged in first direction d1; dielectric 210 provided between each of signal line 220, the plurality of planar electrodes 240, and ground electrode 230; and a plurality of connecting electrodes 250 that are positioned between the plurality of planar electrodes 240 and ground electrode 230 and connect the plurality of planar electrodes 240 and ground electrode 230. At least a portion of signal line 220 may have a meandering shape.

In this way, by signal line 220 having a meandering shape, signal line 220 and planar electrodes 240 can generate capacitive component C40 corresponding to the meandering shape. For example, by increasing the region defined by the meandering shape, the opposing surface area between signal line 220 and planar electrode 240 can be increased, and by decreasing the region defined by the meandering shape, the opposing surface area between signal line 220 and planar electrode 240 can be reduced. By changing the opposing surface area, the value of capacitive component C40 can be changed, which means the frequency of the stopband of multilayer device 200A can be changed. This allows for the formation of a stopband in accordance with the required specifications for multilayer device 200A.

Signal line 220 may include a meandering line section (for example, meandering line section 221) having the meandering shape, and the meandering line section may be provided in a position opposing a planar electrode (for example, planar electrode 241).

In this way, by a meandering line section (for example, meandering line section 221) being provided at a position opposing a planar electrode (for example, planar electrode 241), meandering line section 221 and planar electrode 241 can generate capacitive component C40 corresponding to the meandering shape. For example, by changing the value of capacitive component C40 in accordance with the meandering shape, the frequency of the stopband of multilayer device 200A can be changed. This allows for the formation of a stopband in accordance with the required specifications for multilayer device 200A.

2.4. Other Variations on Embodiments 8 and 9

Although a multilayer device and the like according to embodiments of the present disclosure and variations thereof has been described, the present disclosure is not limited to the above embodiments and variations thereof. Various modifications to the exemplary embodiments and variations thereof that may be conceived by those skilled in the art, as well as other embodiments resulting from combinations of some elements of the exemplary embodiments and variations thereof, are intended to be included within the scope of the present disclosure as long as these do not depart from the essence of the present disclosure.

Embodiment 8 presents an example in which three planar electrodes 241 through 243, three connecting electrodes 251 through 253, and three meandering line sections 221 through 223 are each arranged in first direction d1, but the present disclosure is not limited to this example. Two sets of one planar electrode, one connecting electrode, and one meandering line section may be provided. Alternatively, four or more of these sets may be provided. That is, the multilayer device may have a configuration in which four or more planar electrodes, four or more connecting electrodes, and four or more meandering line sections are arranged in first direction d1.

Variation 1 of Embodiment 8 presents an example in which meandering line section 221, wide line section 222*p*, and meandering line section 223 are arranged in first direction d1, but the present disclosure is not limited to this example. For example, if meandering line section 221 located at one end portion of signal line 220 is connected to signal terminal 261 and meandering line section 223 located at the other end portion is connected to signal terminal 262, a plurality of wide line sections may be provided between meandering line sections 221 and 223. Moreover, one or more wide line sections and one or more other meandering line sections may be provided between meandering line sections 221 and 223. In these cases, the planar electrodes should be provided so as to correspond to each of the meandering line sections and wide line sections.

Variation 2 of Embodiment 8 presents an example in which wide line section 221*p*, meandering line section 222, and wide line section 223*p* are arranged in first direction d1, but the present disclosure is not limited to this example. For example, if wide line section 221*p* located at one end portion of signal line 220 is connected to signal terminal 261 and wide line section 223*p* located at the other end portion is connected to signal terminal 262, a plurality of meandering line sections may be provided between wide line sections 221*p* and 223*p*. Moreover, one or more other wide line sections and one or more meandering line sections may be provided between wide line sections 221*p* and 223*p*. In these cases, the planar electrodes should be provided so as to correspond to each of the meandering line sections and wide line sections.

Variation 1 of Embodiment 8 presents an example in which wide line section 222*p* is provided instead of meandering line section 222, but the present disclosure is not limited to this example. For example, a straight line section (of normal width) may be provided instead of wide line section 222*p*, and meandering line sections 221 and 223 may be connected via the straight line section.

Variation 2 of Embodiment 8 presents an example in which wide line sections 221*p* and 223*p* are provided instead of meandering line sections 221 and 223, but the present disclosure is not limited to this example. For example, two straight line sections (of normal width) may be provided instead of wide line sections 221*p* and 223*p*, with signal terminal 261 and meander line section 222 connected via the first line section, and meander line section 222 and signal terminal 262 connected via the second line section.

In Embodiment 8, an example in which each of planar electrodes 241, 242, and 243 has the same shape and size is given, but the present disclosure is not limited to this example; the size of each of planar electrodes 241, 242, and 243 may be changed in accordance with the required specifications. For example, the frequency of the stopband can be widened by changing capacitive component C40 generated by the opposing surface area between signal line 220 and planar electrodes 240.

In Embodiment 8, an example in which the gap between each of planar electrodes 241, 242, and 243 and signal line 220 is the same is given, but the present disclosure is not limited to this example; the gap between each of planar electrodes 241, 242, and 243 and signal line 220 may be changed in accordance with the required specifications. For example, the frequency of the stopband can be widened by changing capacitive component C40 by altering the gaps between planar electrode 241 and meandering line section 221, between planar electrode 242 and meandering line section 222, and between planar electrode 243 and meandering line section 223.

In Embodiment 8, an example in which each of connecting electrodes 251, 252, and 253 has the same shape and size is given, but the present disclosure is not limited to this example; the size of each of connecting electrodes 251, 252, and 253 may be changed in accordance with the required specifications. For example, the frequency of the stopband can be widened by changing inductive component L50 by altering the diameter or length of connecting electrodes 251, 252, and 253.

3. Multilayer Device According to Other Aspects of the Present Disclosure

Next, a multilayer device according to other aspects of the present disclosure will be further described.

As previously mentioned, multilayer device 1 illustrated in FIG. 1 includes signal line 20 that transmits high-speed, high-frequency signals, ground electrode 30 that is set at ground potential, a plurality of planar electrodes 40 arranged along signal line 20, and a plurality of connecting electrodes 50 that connect ground electrode 30 and the plurality of planar electrodes 40.

However, although conventional multilayer devices can stop the passage of high-speed, high-frequency signals of a specific frequency, there are cases where it is not possible to form a stopband through which passage of high-speed, high-frequency signals is not allowed in accordance with the required specifications for multilayer devices.

In order to enable the formation of a stopband through which passage of high-speed, high-frequency signals is not allowed in accordance with the required specifications, the multilayer device according to the present embodiment has the configuration described below.

Hereinafter, Embodiments 10 and 11 will be described in detail with reference to the drawings.

3.1 Embodiment 10

[Multilayer Device Configuration]

First, the configuration of multilayer device 300A according to Embodiment 10 will be described with reference to the figures.

Figure 40:
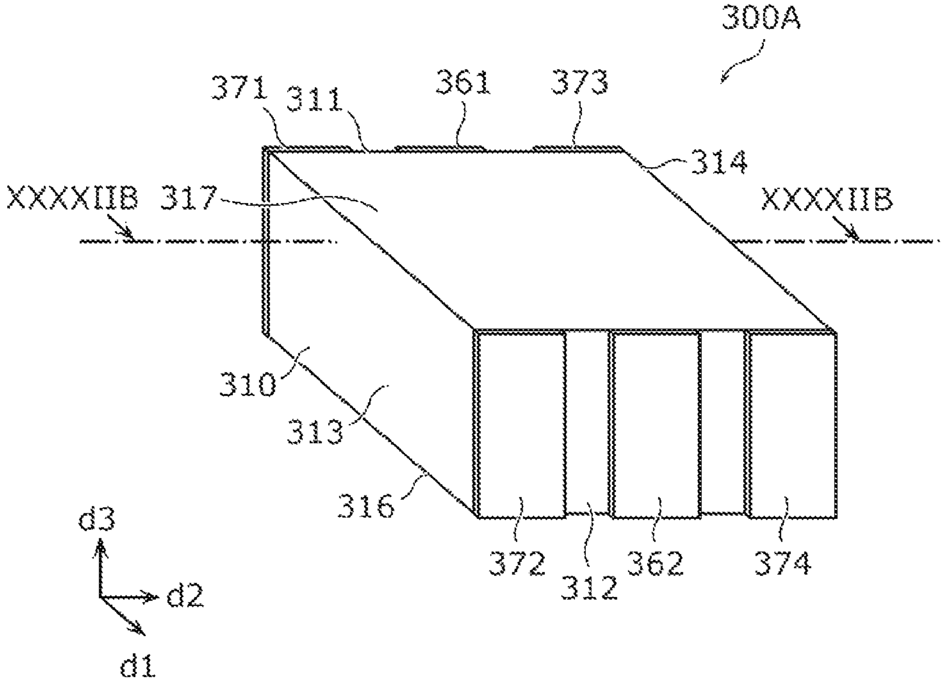
FIG. 40 is an external view of the multilayer device according to Embodiment 10.
Figure 41:
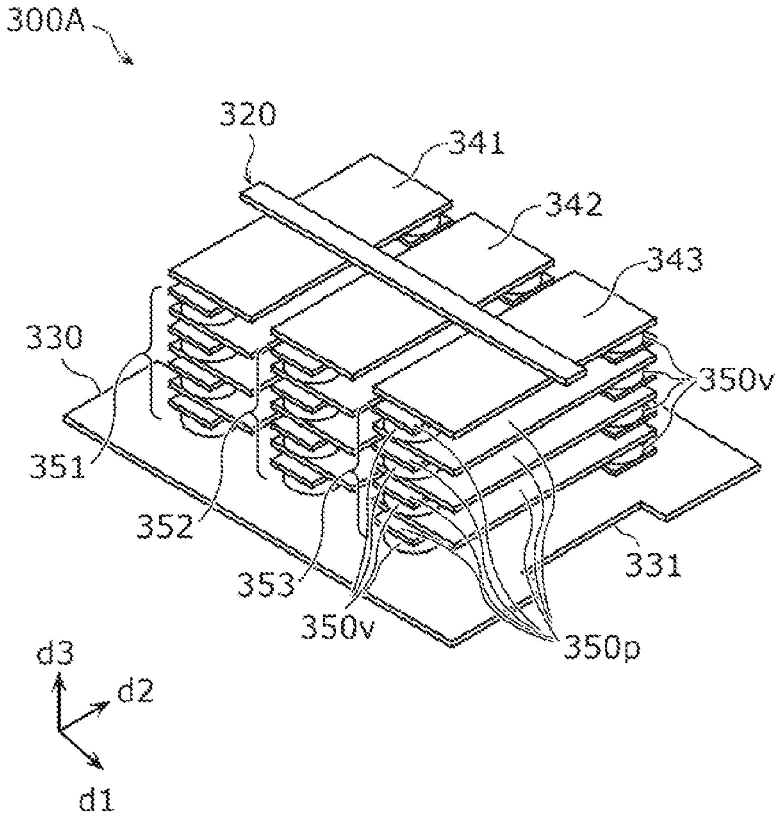
FIG. 41 illustrates the signal line, planar electrodes, ground electrode, and connecting electrodes of the multilayer device according to Embodiment 10.
Figure 42A:
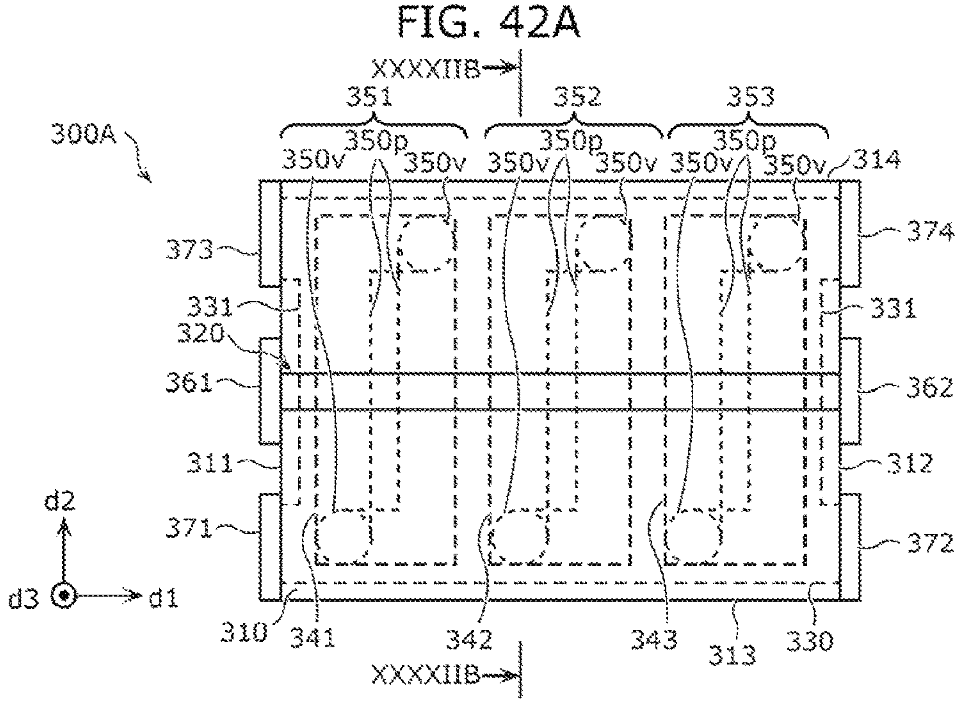
FIG. 42A is a plan view of the multilayer device according to Embodiment 10, showing the signal line and the like from above.
Figure 42B:
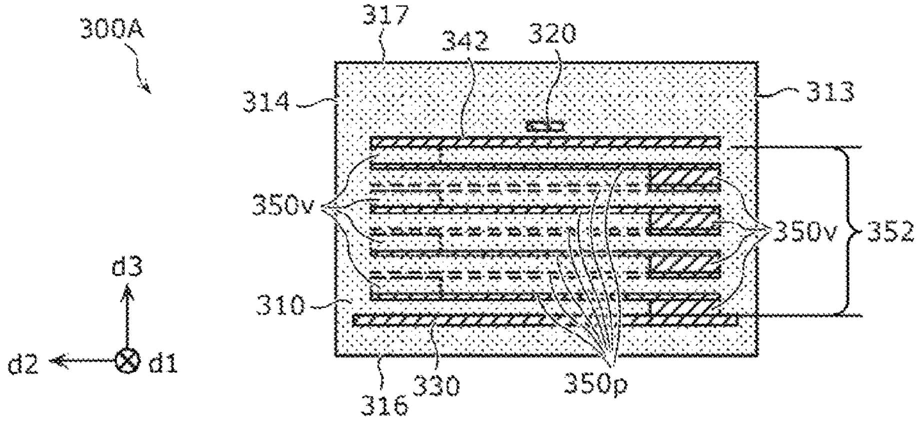
FIG. 42B is a cross-sectional view of the multilayer device according to Embodiment 10 taken at line XXXXIIB-XXXXIIB illustrated in FIG. 42A.
Figure 42C:
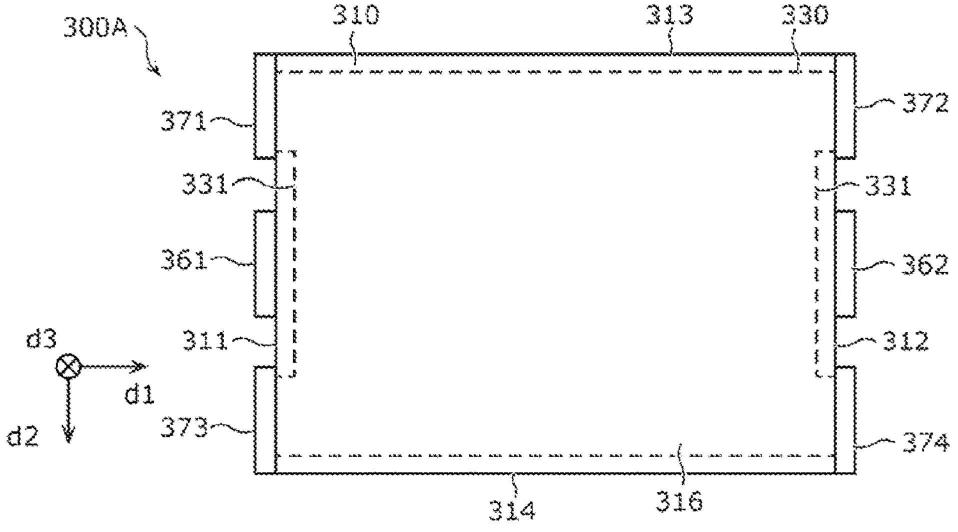
FIG. 42C is a bottom surface view of the multilayer device according to Embodiment 10.

FIG. 40 is an external view of multilayer device 300A according to Embodiment 10. FIG. 41 illustrates signal line 320, planar electrodes 341, 342, 343, ground electrode 330, and connecting electrodes 351, 352, 353 of multilayer device 300A. FIG. 42A is a plan view of multilayer device 300A, showing signal line 320 and the like from above. FIG. 42B is a cross-sectional view of multilayer device 300A taken at line XXXXIIB-XXXXIIB illustrated in FIG. 42A. FIG. 42C is a bottom surface view of multilayer device 300A.

FIG. 41 illustrates multilayer device 300A, omitting signal terminals 361 and 362, ground terminals 371, 372, 373, and 374, and dielectric 310. In FIG. 42A, signal line 320 is illustrated using solid lines. In FIG. 42C, illustration of the signal line, planar electrodes, and connecting electrodes is omitted.

Multilayer device 300A illustrated in FIG. 40, FIG. 41, and FIG. 42A through FIG. 42C includes dielectric 310, signal line 320, ground electrode 330, a plurality of planar electrodes 341, 342 and 343, and a plurality of connecting electrodes 351, 352 and 353. Multilayer device 300A also includes a plurality of signal terminals 361 and 362 and a plurality of ground terminals 371, 372, 373, and 374.

In the following, some or all of the plurality of planar electrodes 341 through 343 may be referred to simply as planar electrodes 340, and some or all of the plurality of connecting electrodes 351 through 353 may be referred to simply as connecting electrodes 350. In the following, some or all of the plurality of signal terminals 361 and 362 may be referred to simply as signal terminals 360, and some or all of the plurality of ground terminals 371 through 374 may be referred to simply as ground terminals 370.

For example, signal line 320, ground electrode 330, planar electrodes 340, and connecting electrodes 350 are formed of a metallic material such as silver or copper. Signal line 320, ground electrode 330, planar electrodes 340, and connecting electrodes 350 may be formed of the same material or using the same composition ratio, or of different materials or using different composition ratios.

Dielectric 310 is formed, for example, by stacking a plurality of dielectric layers. For example, dielectric 310 is formed of a dielectric material such as a low temperature co-fired ceramic (LTCC) material. To make multilayer device 300A smaller, using a material with a high relative permittivity for dielectric 310 is desirable. Dielectric 310 is provided between each of signal line 320, ground electrode 330, and planar electrodes 340. Dielectric 310 is formed to cover the outer peripheral surface of signal line 320 except for the two end surfaces and the outer peripheral surface of ground electrode 330 except for the two end surfaces, as well as the electrode structures of planar electrodes 340 and connecting electrodes 350.

Dielectric 310 has a cuboid shape and includes bottom surface 316, top surface 317 facing away from bottom surface 316, and a plurality of side surfaces 311, 312, 313, and 314 connecting bottom surface 316 and top surface 317. The plurality of side surfaces 311 through 314 include side surfaces 311 and 312 facing away from each other and side surfaces 313 and 314 orthogonal to both of side surfaces 311 and 312. Bottom surface 316 and top surface 317 are parallel to each other, side surfaces 311 and 312 are parallel to each other, and side surfaces 313 and 314 are parallel to each other. The corner portions (edge portions) where each face of dielectric 310 intersects may be rounded.

A direction in which side surface 311 and side surface 312 face away from each other is referred to as first direction d1, a direction in which side surface 313 and side surface 314 face away from each other is referred to as second direction d2, and a direction in which bottom surface 316 and top surface 317 face away from each other is referred to as third direction d3. Hereinafter, regarding the terms “one” and “the other”, “one” may refer to an element on negative side of first direction d1, and “the other” may refer to an element on the positive side, which is opposite to the negative side, of first direction d1.

Signal line 320 is straight and is provided extending first direction d1. Signal line 320 is provided inside dielectric 310 so that both ends, which are part of signal line 320, are exposed on the outer surface (side surfaces 311 and 312) of dielectric 310. Signal line 320 is strip-shaped and is arranged parallel to planar electrodes 340 and ground electrode 330. In a state in which multilayer device 300A is mounted in an electronics device, high-speed, high-frequency signals are input to and output from signal line 320 via signal terminals 360.

Signal terminals 360 are provided on the outer surface (side surfaces 311 and 312) of dielectric 310. Signal terminal 361, which is one of the two signal terminals 361 and 362, is provided on side surface 311, and signal terminal 362, which is the other of the two signal terminals 361 and 362, is provided on side surface 312. The one signal terminal 361 is connected to one end of signal line 320, and the other signal terminal 362 is connected to the other end of signal line 320.

Ground electrode 330 is provided inside dielectric 310 so that a part of ground electrode 330 is exposed on the outer surfaces (side surfaces 311 and 312) of dielectric 310. Ground electrode 330 includes rectangular notches 331 at both ends in first direction d1, and is arranged at a predetermined distance from signal terminals 360 so as not to contact signal terminals 360. Ground electrode 330 is arranged at a predetermined distance from side surfaces 313 and 314 so as not to be exposed on side surfaces 313 and 314. Note that ground electrode 330 may be provided on bottom surface 316 of dielectric 310 rather than inside dielectric 310. Ground electrode 330 may have a structure with an aperture pattern, for example, a mesh structure, instead of a solid pattern. By giving ground electrode 330 a mesh structure, dielectrics 310 can be bonded to each other to improve bonding strength.

In a state in which multilayer device 300A is mounted in an electronics device, ground electrode 330 is set to ground potential via ground terminal 370.

Ground terminals 370 are provided on the outer surface (side surfaces 311 and 312) of dielectric 310. Ground terminals 371 and 373, which constitute one set of the four ground terminals 371 through 374, are provided on side surface 311, and ground terminals 372 and 374, which constitute the other set of the four ground terminals 371 through 374, are provided on side surface 312. The one set of ground terminals 371 and 373 are connected to one end of ground electrode 330, and the other set of ground terminals 372 and 374 are connected to the other end of ground electrode 330. The one set of ground terminals 371 and 373 are arranged on both sides, in second direction d2, of the one signal terminal 361. The other set of ground terminals 372 and 374 are arranged on both sides, in second direction d2, of the other signal terminal 362. Stated differently, the one signal terminal 361 is arranged between two ground terminals 371 and 373, and the other signal terminal 362 is arranged between two ground terminals 372 and 374.

Note that the number of ground terminals 370 is not limited to four; the number of ground terminals 370 may be two. Ground terminals 370 may be provided one each on side surfaces 311 and 312 or side surfaces 313 and 314 of dielectric 310. For example, ground terminals 370 may be provided one each on side surfaces 311 and 312. In such cases, it is desirable to arrange ground terminals 370 on a diagonal line so that the mounting orientation does not need to be taken into consideration. Additionally, ground terminals 370 may not only be provided on side surfaces 311 and 312, but may also be provided on side surfaces 313 and 314. Moreover, ground terminals 370 may be provided only on side surfaces 313 and 314. In such cases, part of ground electrode 330 may be exposed on side surfaces 313 and 314, and ground terminal 370 may be connected to exposed ground electrode 330.

Planar electrode 340 is provided inside dielectric 310 so as to be positioned between signal line 320 and ground electrode 330 in third direction d3. Planar electrode 340 is arranged parallel to signal line 320 and ground electrode 330. The gap between planar electrode 340 and signal line 320 is smaller than the gap between ground electrode 330 and signal line 320. In the present embodiment, the gap between planar electrode 340 and signal line 320 is, for example, greater than or equal to 0.1 times and less than or equal to 0.5 times the gap between ground electrode 330 and signal line 320, but the size of this gap is set appropriately according to the stopband required for multilayer device 300A. The plurality of planar electrodes 340 are rectangular-shaped planar electrodes. However, the shape of planar electrode 340 is not limited to rectangular, and may be square, polygonal, circular or elliptical. The plurality of planar electrodes 341, 342, and 343 are arranged equidistantly in this order in first direction d1. Each of planar electrodes 341, 342, and 343 has the same shape and size. The gap between each of planar electrodes 341, 342, and 343 and signal line 320 is the same.

Connecting electrodes 350 are conductors that connect planar electrodes 340 and ground electrode 330, and are provided inside dielectric 310. Connecting electrodes 350 are positioned between planar electrodes 340 and ground electrode 330. The plurality of connecting electrodes 351, 352, and 353 are arranged equidistantly in this order in first direction d1. Each of connecting electrodes 351, 352, and 353 has the same shape and size. Connecting electrodes 351 through 353 are provided arranged in first direction d1 to correspond one-to-one with planar electrodes 341 through 343, respectively. More specifically, connecting electrode 351 is provided to connect planar electrode 341 and ground electrode 330, connecting electrode 352 is provided to connect planar electrode 342 and ground electrode 330, and connecting electrode 353 is provided to connect planar electrode 343 and ground electrode 330.

At least a portion of connecting electrodes 350 has a coil shape. Connecting electrodes 350 illustrated in FIG. 41 have a rectangular coil shape. The coil shape is not limited to rectangular, and may be circular. At least a portion of connecting electrodes 350 may have a meandering shape. A meandering shape is a serpentine shape. The meandering shape may be a square-wave, triangular-wave, sinusoidal-wave, or a circular-arc-wave meandering shape. The meandering shape may be provided in patterned electrode 350*p*, which will be described later.

Each connecting electrode 350 includes a plurality of via electrodes 350*v* and one or more patterned electrodes 350*p*. FIG. 42B illustrates eight via electrodes as one example of a plurality of via electrodes 350*v* and seven patterned electrodes 350*p* as one example of one or more patterned electrodes 350*p*.

Each via electrode 350*v* is cylindrical and is formed to penetrate through the dielectric layers. The via diameter of via electrode 350*v* is, for example, 50 μm. Via electrodes 350*v* are positioned between planar electrodes 340 and ground electrode 330. As illustrated in FIG. 42A, each via electrode 350*v* is arranged at the corner of the outer peripheral edge portion of the corresponding planar electrode 340 when viewed in a direction perpendicular to planar electrode 340, i.e., third direction d3. In third direction d3 extending from ground electrode 330 to planar electrodes 340, the plurality of via electrodes 350*v* are arranged alternately at the corners on diagonal lines of planar electrodes 340. The plurality of via electrodes 350*v* are not directly connected to each other, but are connected via patterned electrode 350*p*.

The one or more patterned electrodes 350*p* are provided between the plurality of dielectric layers and electrically connect the plurality of via electrodes 350*v* scattered in third direction d3. The width of patterned electrode 350*p* is, for example, 100 μm. Each patterned electrode 350*p* is L-shaped and has a pattern shape consisting of 0.5 turns.

Thus, connecting electrodes 350 have a 3.5-turn spiral coil shape formed by eight via electrodes 350*v* and seven patterned electrodes 350*p*. Connecting electrodes 350 are not limited to a spiral coil, and may have a helical coil shape. In such cases, the end portions of via electrodes 350*v* and patterned electrodes 350*p* may be arranged at the outer peripheral edge portions and center, respectively, of planar electrodes 340. Land patterns for connecting to via electrodes 350*v* may be formed at both ends of patterned electrode 350*p*. Inductive component L50 in multilayer device 300A (see FIG. 2) is generated by this connecting electrode 350.

In the present embodiment, at least a portion of connecting electrode 350 of multilayer device 300A has a coil shape or a meandering shape. Accordingly, connecting electrode 350 can generate inductive component L50 corresponding to the coil shape or meandering shape. For example, the inductance value of connecting electrode 350 can be increased by increasing the coil diameter or number of turns of the coil shape, and the inductance value can be decreased by decreasing the coil diameter or number of turns of the coil shape. By changing the inductance value, the value of inductive component L50 can be changed, which means the frequency of the stopband of multilayer device 300A can be changed. This allows for the formation of a stopband in accordance with the required specifications.

The above presents an example in which multilayer device 300A is a mountable chip component configured to be mounted on a printed circuit board or the like, but the present disclosure is not limited to this example. For example, multilayer device 300A may be configured such that dielectric 310, signal line 320, ground electrode 330, planar electrodes 340, and connecting electrodes 350 are provided inside the printed circuit board, as part of the printed circuit board.

[Multilayer Device Manufacturing Method]

Figure 43:
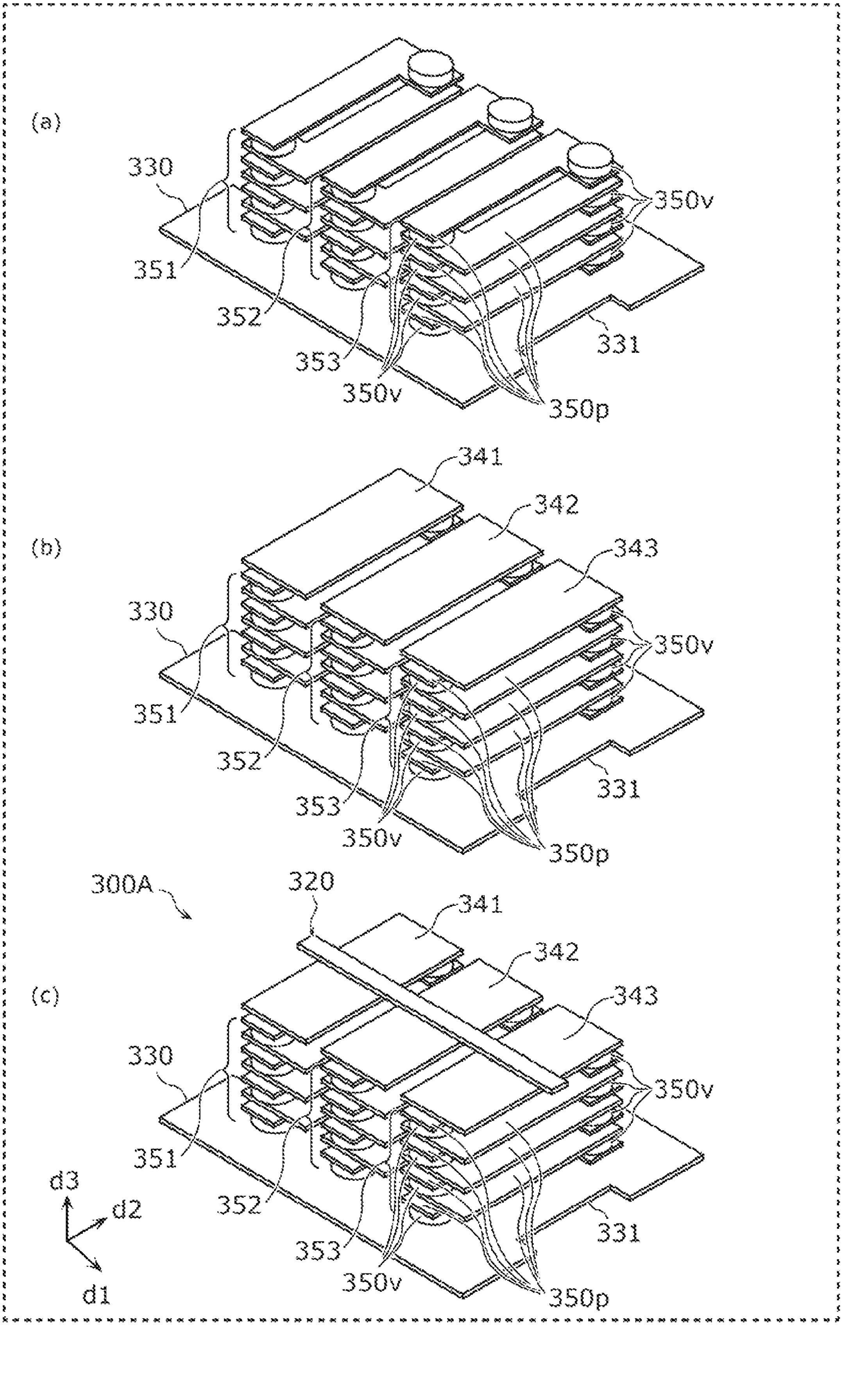
FIG. 43 illustrates one example of the manufacturing process of the multilayer device according to Embodiment 10.

FIG. 43 illustrates one example of the manufacturing process of multilayer device 300A.

First, one or more layers of green sheets with no electrode patterns are stacked to form a lower layer sheet. A green sheet is a dielectric sheet that becomes a dielectric layer after sintering. Next, a green sheet that includes a ground electrode pattern is stacked on the lower layer sheet. The ground electrode pattern is a printed pattern that becomes ground electrode 330 after being sintered. Next, a plurality of green sheets that include via electrode patterns and patterned electrode patterns are stacked on the green sheet that includes the ground electrode pattern. The via electrode pattern and the patterned electrode pattern are printed patterns that become connecting electrodes 350 (see (a) in FIG. 43) after sintering. Next, a green sheet that includes a via electrode pattern and planar electrode pattern is stacked on the plurality of stacked green sheets. The planar electrode pattern is a printed pattern that becomes planar electrodes 340 (see (b) in FIG. 43) after sintering. Next, a green sheet that includes a signal line pattern is stacked on the green sheet that includes the via electrode pattern and planar electrode pattern. The signal line pattern is a printed pattern that becomes signal line 320 (see (c) in FIG. 43) after sintering. Next, one or more layers of green sheets with no electrode patterns are stacked on the green sheet that includes the signal line pattern to form the upper layer sheet.

The group of sheets stacked in this manner is pressed to form a mother stack. Next, the mother stack is singulated by a cutting process, and the singulated stacks are sintered. Then, signal terminals 360 and ground terminals 370 are formed on the side surfaces of the sintered stacks. This fabricates the above-described multilayer device 300A.

Variation 1 of Embodiment 10

Next, the configuration of multilayer device 300B according to Variation 1 of Embodiment 10 will be described. Variation 1 describes an example in which the width of patterned electrode 350*p* is narrower than in Embodiment 10.

Multilayer device 300B according to Variation 1 includes dielectric 310, signal line 320, ground electrode 330, a plurality of planar electrodes 340, and a plurality of connecting electrodes 350. Multilayer device 300B also includes a plurality of signal terminals 360 and a plurality of ground terminals 370. Dielectric 310, signal line 320, ground electrode 330, the plurality of planar electrodes 340, the plurality of signal terminals 360, and the plurality of ground terminals 370 in multilayer device 300B are the same as in Embodiment 10.

Figure 44:
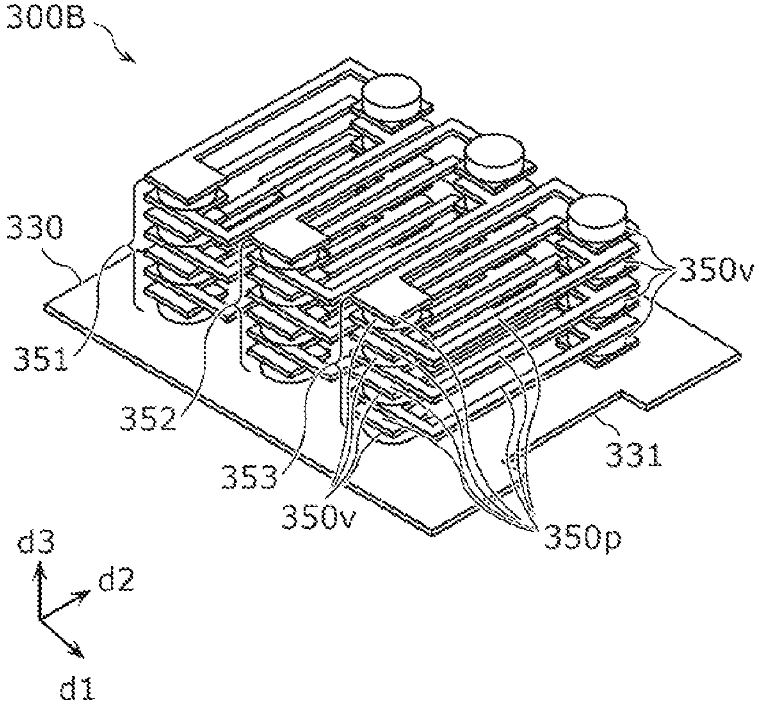
FIG. 44 illustrates the connecting electrodes and the like of the multilayer device according to Variation 1 of Embodiment 10.

FIG. 44 illustrates connecting electrodes 350 and the like of multilayer device 300B according to Variation 1. Ground electrode 330 is also illustrated in FIG. 44.

As illustrated in FIG. 44, the width of patterned electrode 350*p* in Variation 1 is narrower than the width of patterned electrode 350*p* in Embodiment 10. The width of patterned electrode 350*p* in Variation 1 as illustrated in FIG. 44 is 25 μm, and the inductance value of connecting electrodes 350 in Variation 1 is consequently higher than that of connecting electrodes 350 in Embodiment 10.

In Variation 1 as well, at least a portion of connecting electrodes 350 of multilayer device 300B has a coil shape. For example, by increasing the width of patterned electrode 350*p* of connecting electrodes 350, the inductance value of connecting electrodes 350 can be lowered, and by decreasing the width of patterned electrode 350*p*, the inductance value can be increased. By changing the inductance value, the value of inductive component L50 can be changed, which means the frequency of the stopband of multilayer device 300B can be changed. This allows for the formation of a stopband in accordance with the required specifications.

Advantageous Effects, Etc., of Embodiment 10 and Variation 1

Next, the advantageous effects of multilayer devices 300A and 300B having the above-described configurations will be described with reference to FIG. 45.

The design criteria for multilayer devices 300A and 300B are as follows.

- Multilayer device outline size: 0.8 mm long, 0.6 mm wide, 0.45 mm high
- Signal line 320 width: 0.05 mm
- Width of planar electrodes 340 (length in second direction d2): 0.5 mm
- Length of planar electrodes 340 (length in first direction d1): 0.2 mm
- Distance between planar electrodes 340 adjacent to each other in first direction d1: 0.05 mm
- Number of turns of connecting electrodes 350: 3.5 turns
- Via diameter of via electrodes 350*v*: 100 μm
- Width of patterned electrodes 350*p* of multilayer device 300A: 100 μm
- Width of patterned electrodes 350*p* of multilayer device 300B: 25 μm
- Thickness of each of signal line 320, ground electrode 330, and planar electrodes 340: 10 μm
- Thickness of dielectric 310 beneath ground electrode 330: 35 μm
- Distance between ground electrode 330 and planar electrodes 340: 320 μm
- Distance between planar electrodes 340 and signal line 320: 25 μm
- Thickness of dielectric 310 above signal line 320: 70 μm
- Relative permittivity of dielectric 310: 4.1
- Dissipation factor of dielectric 310: 0.015

Next, the pass-through characteristics of a multilayer device designed in accordance with these design criteria will be described.

Figure 45:
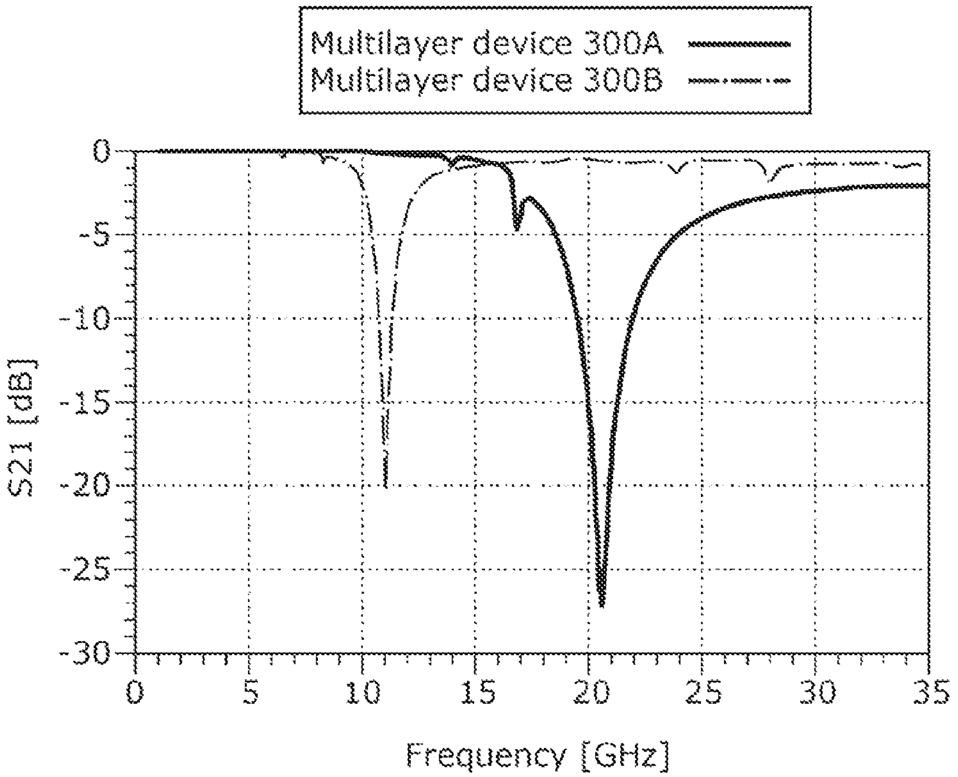
FIG. 45 illustrates the pass-through characteristics of the multilayer device according to Embodiment 10 and Variation 1.

FIG. 45 illustrates the pass-through characteristics of the multilayer device according to Embodiment 10 and Variation 1. The S parameter (S21) is represented on the vertical axis in FIG. 45.

As illustrated in FIG. 45, multilayer device 300A of Embodiment 10 has an attenuation pole near a frequency of 20.5 GHZ, and insertion loss is greatest at this attenuation pole. Multilayer device 300A is capable of stopping the passage of signals with a frequency of 20.5 GHz. Multilayer device 300B according to Variation 1 has an attenuation pole near 11 GHZ, which is lower than the stopband of multilayer device 300A, and insertion loss is greatest at this attenuation pole. Multilayer device 300B is capable of stopping the passage of signals with a frequency of 11 GHZ.

The frequency of the stopband of the multilayer device can be changed by changing the coil shape of connecting electrodes 350 like in these multilayer devices 300A and 300B. This allows for the formation of a stopband in accordance with the required specifications.

[Variation 2 of Embodiment 10]

Next, the configuration of multilayer device 300C according to Variation 2 of Embodiment 10 will be described. Variation 2 describes an example in which signal line 320 has a meandering shape.

Multilayer device 300C according to Variation 2 includes dielectric 310, signal line 320, ground electrode 330, a plurality of planar electrodes 340, and a plurality of connecting electrodes 350. Multilayer device 300C also includes a plurality of signal terminals 360 and a plurality of ground terminals 370. Dielectric 310, ground electrode 330, the plurality of planar electrodes 340, the plurality of connecting electrodes 350, the plurality of signal terminals 360, and the plurality of ground terminals 370 in multilayer device 300C are the same as in Embodiment 10.

Figure 46:
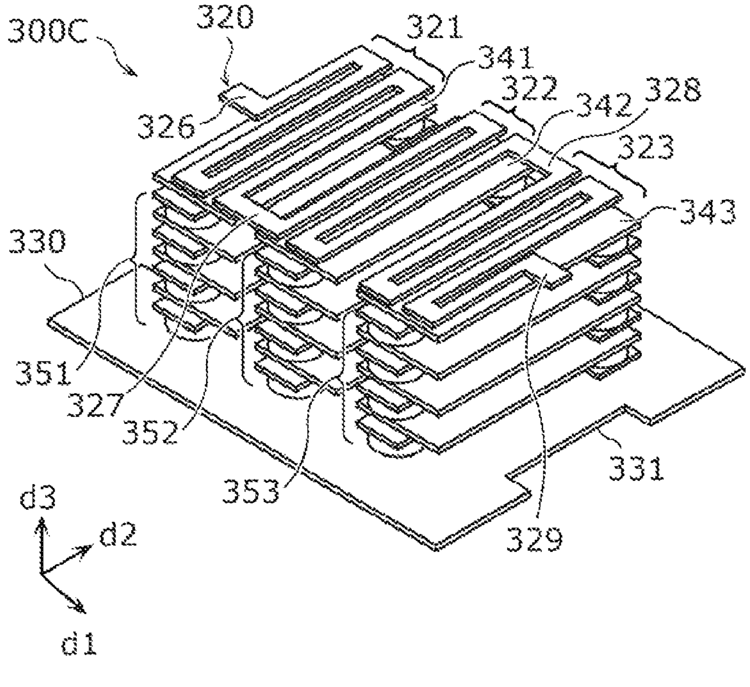
FIG. 46 illustrates the signal line, planar electrodes, ground electrode, and connecting electrodes of the multilayer device according to Variation 2 of Embodiment 10.
Figure 47A:
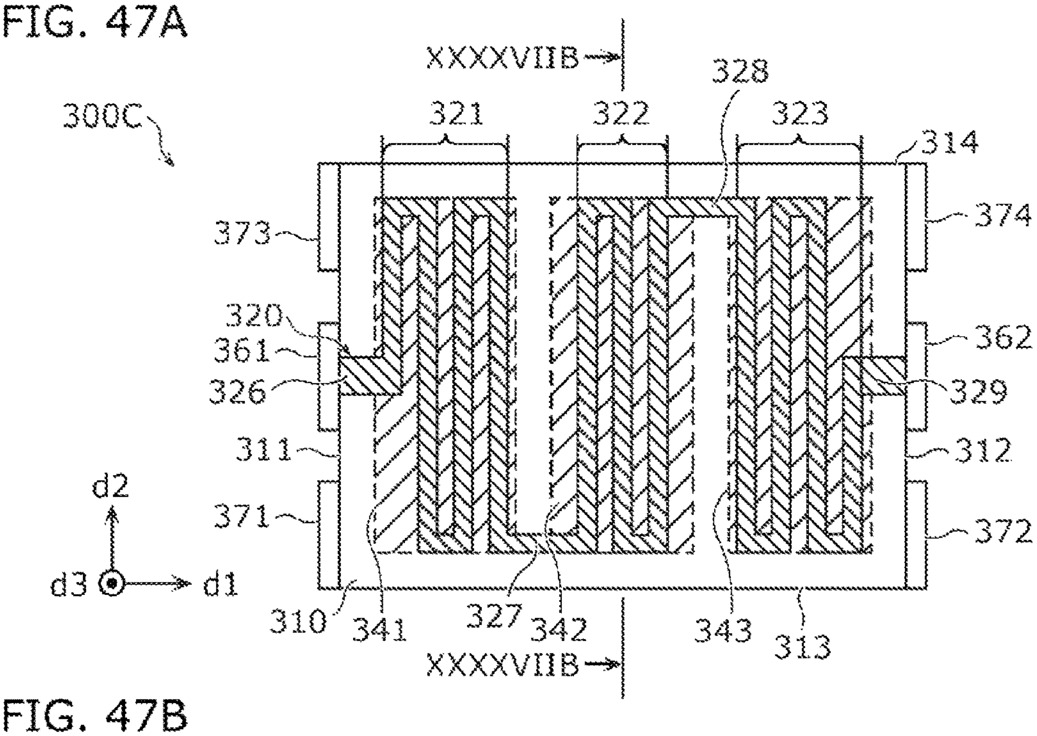
FIG. 47A is a plan view of the multilayer device according to Variation 2 of Embodiment 10, showing the signal line and the like from above.
Figure 47B:
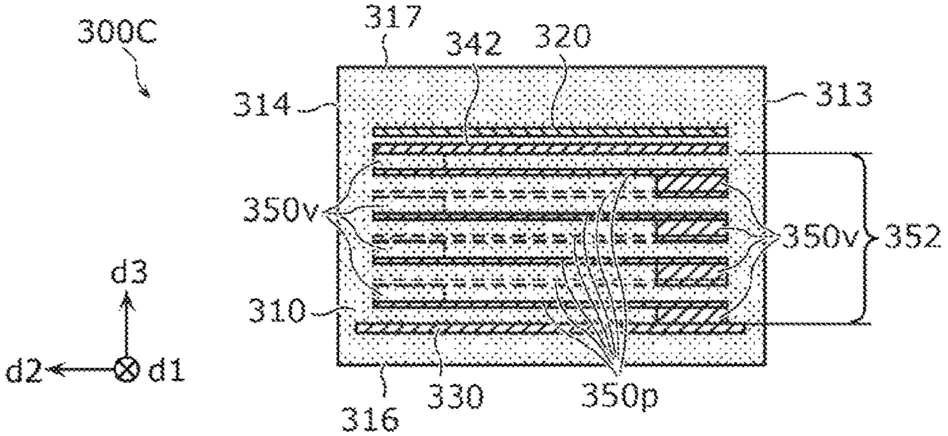
FIG. 47B is a cross-sectional view of the multilayer device according to Variation 2 of Embodiment 10 taken at line XXXXVIIB-XXXXVIIB illustrated in FIG. 47A.
Figure 47C:
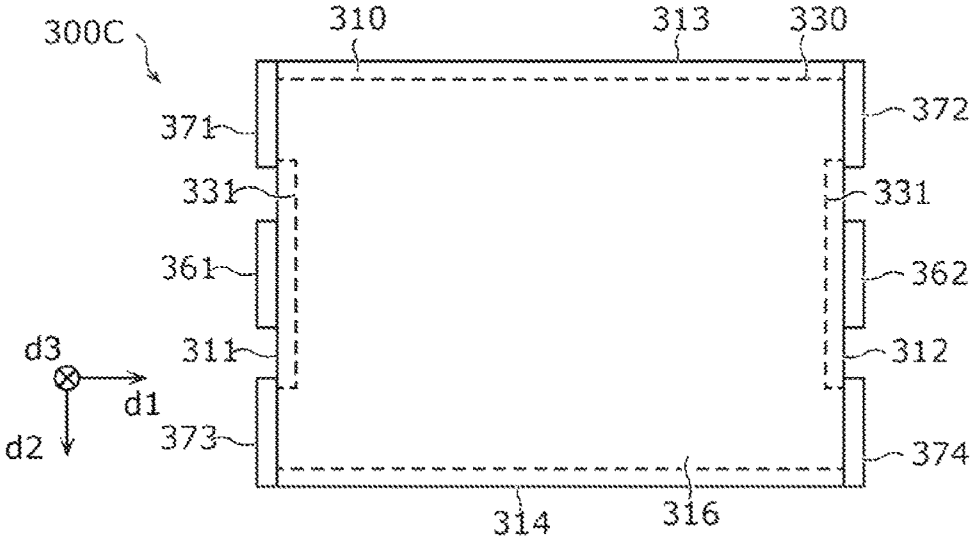
FIG. 47C is a bottom surface view of the multilayer device according to Variation 2 of Embodiment 10.

FIG. 46 illustrates signal line 320, planar electrodes 340, ground electrode 330, and connecting electrodes 350 of multilayer device 300C according to Variation 2. FIG. 47A is a plan view of multilayer device 300C, showing signal line 320 and the like from above. FIG. 47B is a cross-sectional view of multilayer device 300C taken at line XXXXVIIB-XXXXVIIB illustrated in FIG. 47A. FIG. 47C is a bottom surface view of multilayer device 300C.

FIG. 46 illustrates multilayer device 300C, omitting signal terminals 361 and 362, ground terminals 371, 372, 373, and 374, and dielectric 310. In FIG. 47A, signal line 320 is illustrated with a solid line, and illustration of the planar electrodes, connecting electrodes, and ground electrode is omitted. In FIG. 47C, illustration of the signal line, planar electrodes, and connecting electrodes is omitted.

At least a portion of signal line 320 according to Variation 2 has a meandering shape. A meandering shape is a serpentine shape. Signal line 320 illustrated in FIG. 46 includes a square-wave meandering shape. The meandering shape is not limited to a square-wave meandering shape, and may be triangular-wave, sinusoidal-wave, or a circular-arc-wave meandering shape. The meandering shape may be a pulse-wave meandering shape that is protrudes or recedes in second direction d2.

Signal line 320 includes meandering line sections 321, 322, and 323, which are regions with a meandering shape. Meandering line sections 321, 322, and 323 are arranged in this order in first direction d1, which is a direction from one end surface of dielectric 310 to the opposite end surface. Note that first direction d1 is a direction in which side surface 311 and side surface 312 face away from each other, as described above, and is the direction in which a straight line connecting the two ends of signal line 320 extends. Meandering line sections 321, 322, and 323 are provided in one-to-one correspondence with planar electrodes 341, 342, and 343. More specifically, meandering line section 321 corresponds to planar electrode 341, meandering line section 322 corresponds to planar electrode 342, and meandering line section 323 corresponds to planar electrode 343.

In other words, meandering line sections 321, 322, and 323 are provided in positions opposing planar electrodes 341, 342, and 343, respectively. In other words, when viewed from third direction d3, which is perpendicular to planar electrodes 340, meandering line section 321 overlaps with planar electrode 341, meandering line section 322 overlaps with planar electrode 342, and meandering line section 323 overlaps with planar electrode 343. In this example, the lengths of meandering line sections 321 through 323 in second direction d2 are respectively the same as the lengths of planar electrodes 341 through 343 in second direction d2. The lengths of meandering line sections 321 through 323 in first direction d1 are shorter than the lengths of planar electrodes 341 through 343 in first direction d1. Capacitive component C40 in multilayer device 300C (see FIG. 2) is generated in the opposing regions of meandering line sections 321, 322, and 323 and planar electrodes 341, 342, and 343.

Signal line 320 includes a plurality of straight coupling line sections 326, 327, 328, and 329. Coupling line section 326 connects signal terminal 361 and meandering line section 321. Coupling line section 327 connects meandering line sections 321 and 322, which are adjacent in first direction d1. Coupling line section 328 connects meandering line sections 322 and 323, which are adjacent in first direction d1. Coupling line section 329 connects meandering line section 323 and signal terminal 362. Meandering line sections 321 through 323 are connected in series by coupling line sections 326 through 329.

In Variation 2, at least a portion of connecting electrode 350 of multilayer device 300C has a coil shape or a meandering shape. Accordingly, connecting electrode 350 can generate inductive component L50 corresponding to the coil shape or meandering shape. For example, by changing the inductance value, the value of inductive component L50 can be changed, which means the frequency of the stopband of multilayer device 300C can be changed. This allows for the formation of a stopband in accordance with the required specifications.

In Variation 2, at least a portion of signal line 320 of multilayer device 300C has a meandering shape. Accordingly, signal line 320 and planar electrodes 340 can generate capacitive component C40 corresponding to the meandering shape. For example, by increasing the region defined by the meandering shape, the opposing surface area between signal line 320 and planar electrode 340 can be increased, and by decreasing the region defined by the meandering shape, the opposing surface area between signal line 320 and planar electrode 340 can be reduced. By changing the opposing surface area, the value of capacitive component C40 can be changed, which means the frequency of the stopband of multilayer device 300C can be changed. This allows for the formation of a stopband in accordance with the required specifications.

Variation 3 of Embodiment 10

Next, the configuration of multilayer device 300D according to Variation 3 of Embodiment 10 will be described. Variation 3 describes an example in which the width of patterned electrode 350*p* is narrower than in Variation 2.

Multilayer device 300D according to Variation 3 includes dielectric 310, signal line 320, ground electrode 330, a plurality of planar electrodes 340, and a plurality of connecting electrodes 350. Multilayer device 300D also includes a plurality of signal terminals 360 and a plurality of ground terminals 370. Dielectric 310, signal line 320, ground electrode 330, the plurality of planar electrodes 340, the plurality of signal terminals 360, and the plurality of ground terminals 370 in multilayer device 300D are the same as in Variation 2.

Figure 48:
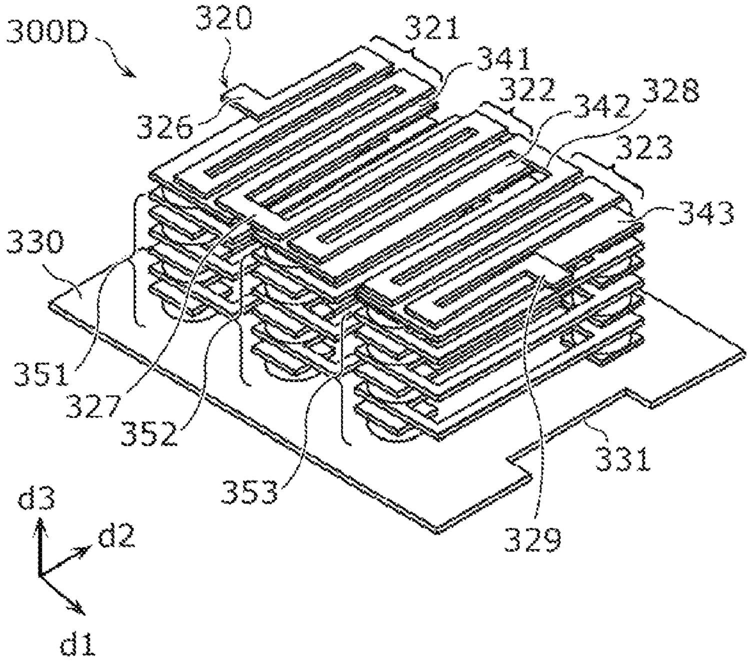
FIG. 48 illustrates the signal line, planar electrodes, ground electrode, and connecting electrodes of the multilayer device according to Variation 3 of Embodiment 10.

FIG. 48 illustrates signal line 320, planar electrodes 340, ground electrode 330, and connecting electrodes 350 of multilayer device 300D according to Variation 3.

As illustrated in FIG. 48, the width of patterned electrode 350*p* in Variation 3 is narrower than the width of patterned electrode 350*p* in Variation 2. The width of patterned electrode 350*p* in Variation 3 as illustrated in FIG. 48 is 25 μm, and the inductance value of connecting electrodes 350 in Variation 3 is consequently higher than that of connecting electrodes 350 in Variation 2.

In Variation 3 as well, at least a portion of connecting electrodes 350 of multilayer device 300D has a coil shape. For example, by increasing the width of patterned electrode 350*p* of connecting electrodes 350, the inductance value of connecting electrodes 350 can be lowered, and by decreasing the width of patterned electrode 350*p*, the inductance value can be increased. By changing the inductance value, the value of inductive component L50 can be changed, which means the frequency of the stopband of multilayer device 300D can be changed. This allows for the formation of a stopband in accordance with the required specifications.

[Advantageous Effects, Etc., of Variation 2 and Variation 3]

To confirm the advantageous effects of Variation 2 and Variation 3, a reference example, multilayer device 300Z, will be described. In the reference example multilayer device 300Z, connecting electrodes 350 are straight via conductors instead of coiled.

Figure 49:
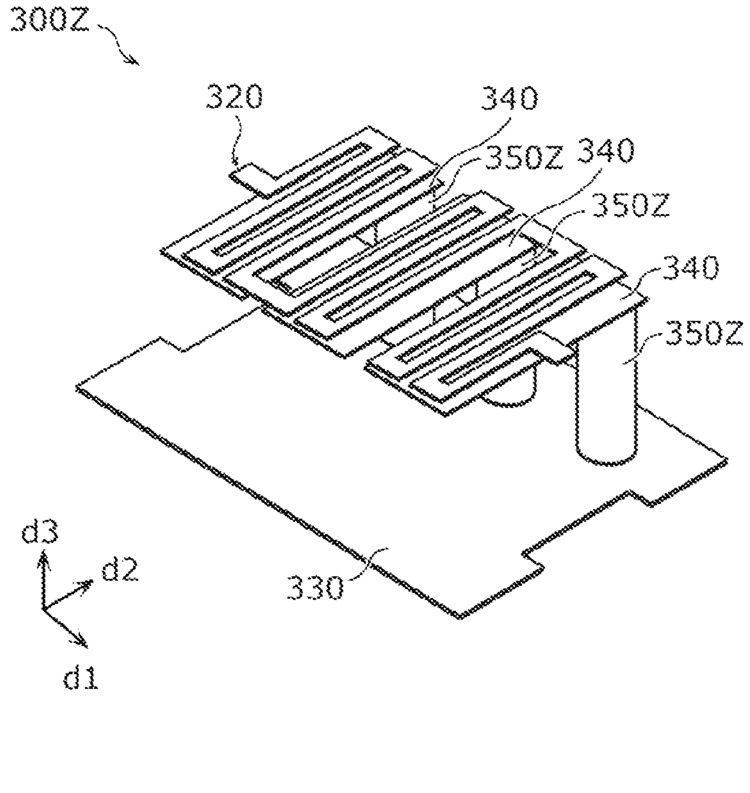
FIG. 49 illustrates the signal line, planar electrodes, ground electrode, and connecting electrodes of a reference example multilayer device.

FIG. 49 illustrates signal line 320, planar electrodes 340, ground electrode 330, and connecting electrodes 350Z of multilayer device 300Z according to a reference example.

Connecting electrodes 350Z according to the reference example are via conductors that connect the plurality of planar electrodes 340 and ground electrode 330, and are provided inside dielectric 310 (not illustrated). Connecting electrodes 350Z, which are columnar, are formed so as to penetrate dielectric 310 positioned between the plurality of planar electrodes 340 and ground electrode 330. Each connecting electrode 350Z has the same shape and size. Connecting electrodes 350Z are arranged equidistantly in first direction d1 so as to correspond one-to-one with planar electrodes 340.

Next, the advantageous effects of multilayer devices 300C, 300D, and 300Z having the above-described configurations will be described with reference to the figures.

The design criteria for multilayer devices 300C, 300D, and 300Z are as follows.

- Multilayer device outline size: 0.8 mm long, 0.6 mm wide, 0.45 mm high
- Signal line 320 width: 0.05 mm
- Meandering L/S: 0.025 mm/0.025 mm
- Length of each of coupling line sections 326 and 329: 0.0625 mm
- Length of each of coupling line sections 327 and 328: 0.1 mm
- Width of planar electrodes 340 (length in second direction d2): 0.5 mm
- Length of planar electrodes 340 (length in first direction d1): 0.2 mm
- Distance between planar electrodes 340 adjacent to each other in first direction d1: 0.05 mm
- Number of turns of connecting electrodes 350: 3.5 turns
- Via diameter of via electrodes 350*v*: 100 μm
- Width of patterned electrodes 350*p* of multilayer device 300C: 100 μm
- Width of patterned electrodes 350*p* of multilayer device 300D: 25 μm
- Thickness of each of signal line 320, ground electrode 330, and planar electrodes 340: 10 μm
- Thickness of dielectric 310 beneath ground electrode 330: 35 μm
- Distance between ground electrode 330 and planar electrodes 340: 320 μm
- Distance between planar electrodes 340 and signal line 320: 25 μm
- Thickness of dielectric 310 above signal line 320: 70 μm
- Relative permittivity of dielectric 310: 4.1
- Dissipation factor of dielectric 310: 0.015

Next, the pass-through characteristics of a multilayer device designed in accordance with these design criteria will be described.

Figure 50:
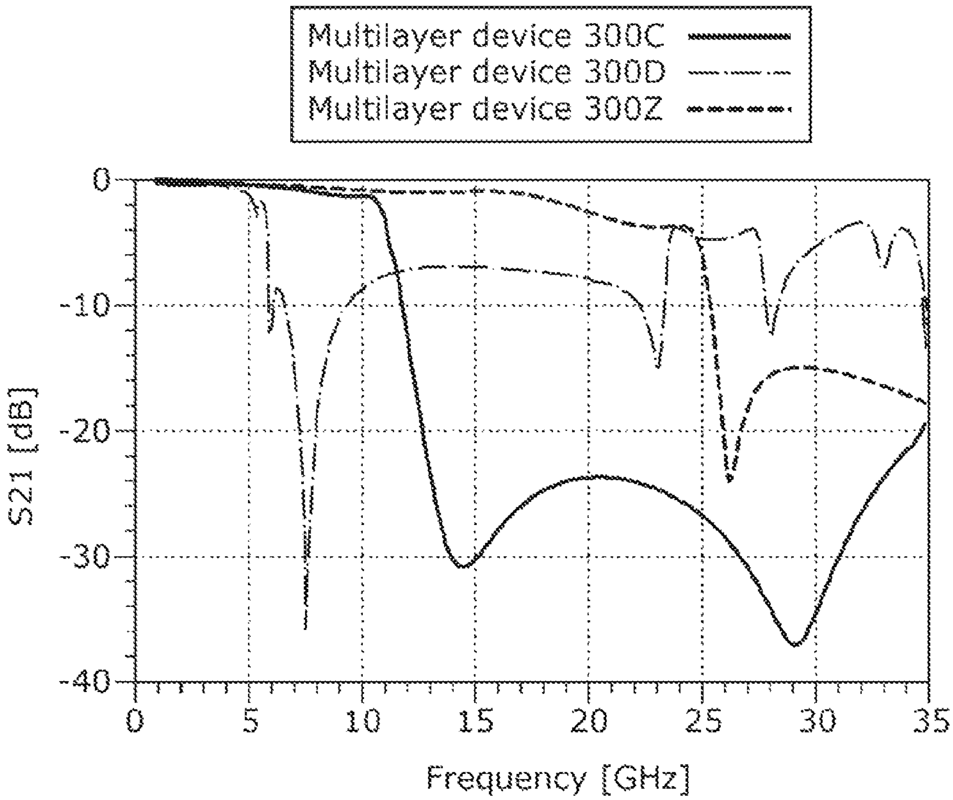
FIG. 50 illustrates the pass-through characteristics of the multilayer devices according to Variation 2 and Variation 3 of Embodiment 10 and the reference example.

FIG. 50 illustrates the pass-through characteristics of the multilayer devices according to Variation 2 and Variation 3 of Embodiment 10 and the reference example. The S parameter (S21) is represented on the vertical axis in FIG. 50.

As illustrated in FIG. 50, multilayer device 300C according to Variation 2 has an attenuation pole in the vicinity of 14 GHZ, which is a higher frequency than the stopband of the reference example multilayer device, and in the vicinity of 29 GHZ, which is a lower frequency than the stopband of the reference example multilayer device 300Z. Moreover, multilayer device 300C has greater attenuation at the attenuation poles than multilayer device 300Z. Multilayer device 300C is capable of stopping the passage of signals with frequencies of 14 GHz and 29 GHz.

Multilayer device 300D according to Variation 3 has an attenuation pole near 7.5 GHZ, which is lower than the stopband of multilayer device 300C, and insertion loss is greatest at this attenuation pole. Multilayer device 300D has greater attenuation at the attenuation poles than multilayer device 300Z. Multilayer device 300D is capable of stopping the passage of signals with a frequency of 7.5 GHZ.

Even when signal line 320 has a meandering shape, the frequency of the stopband of the multilayer device can be changed by changing the coil shape of connecting electrodes 350, as in these multilayer devices 300C and 300D. This allows for the formation of a stopband in accordance with the required specifications. Moreover, by giving connecting electrodes 350 of multilayer devices 300C and 300D a coil shape, it is possible to increase the amount of attenuation at the attenuation poles compared to reference example multilayer device 300Z.

3.2. Embodiment 11

[Multilayer Device Configuration]

First, the configuration of multilayer device 300E according to Embodiment 11 will be described with reference to FIG. 51 and FIG. 52. Embodiment 11 pertains to an example in which multilayer device 300E is a common mode filter.

Figure 51:
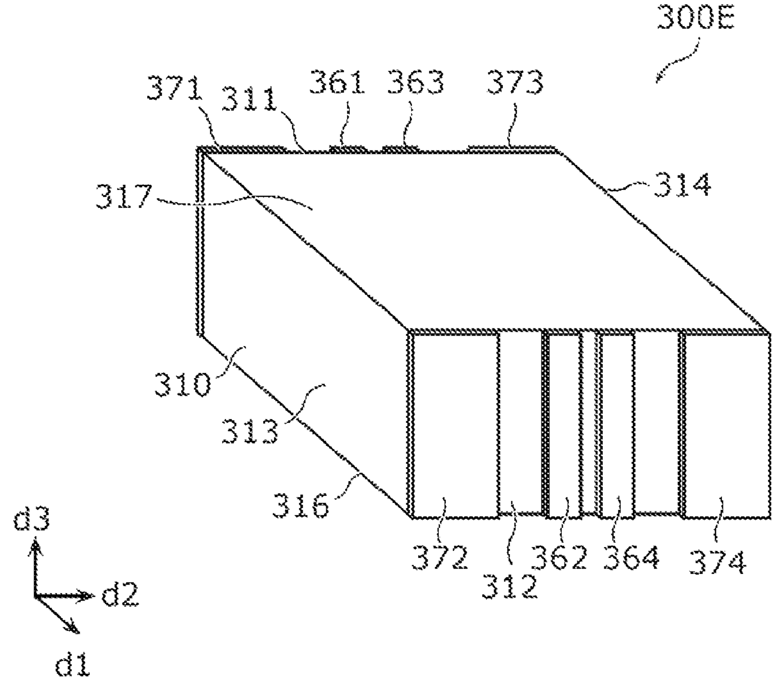
FIG. 51 is an external view of the multilayer device according to Embodiment 11.

FIG. 51 is an external view of multilayer device 300E according to Embodiment 11. FIG. 52 illustrates signal line 320, planar electrodes 340, ground electrode 330, and connecting electrodes 350 of multilayer device 300E.

Figure 52:
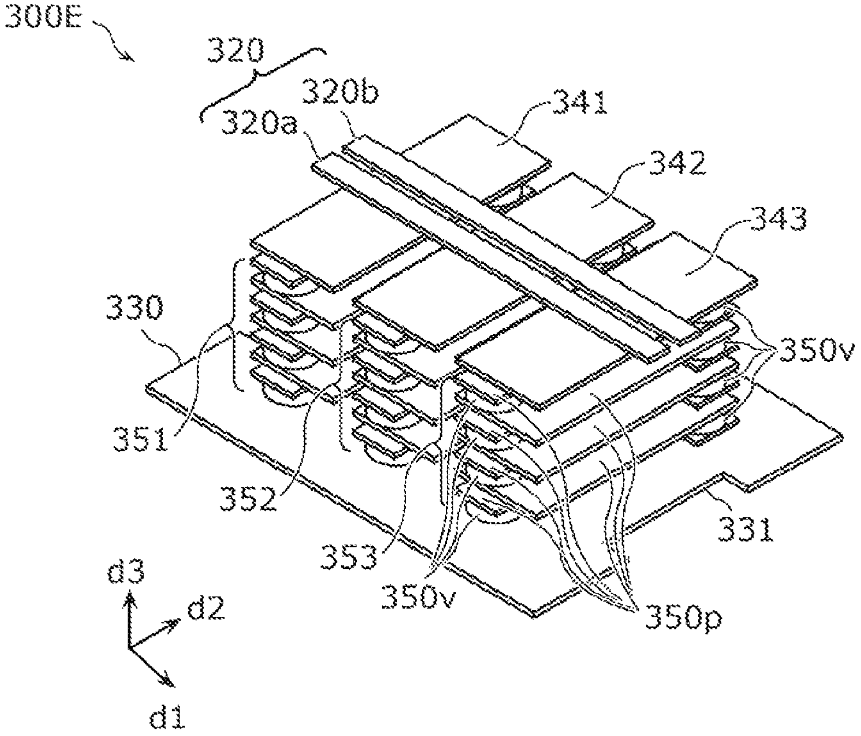
FIG. 52 illustrates the signal line, planar electrodes, ground electrode, and connecting electrodes of the multilayer device according to Embodiment 11.

Multilayer device 300E illustrated in FIG. 51 and FIG. 52 includes dielectric 310, signal line 320, ground electrode 330, a plurality of planar electrodes 341, 342 and 343, and a plurality of connecting electrodes 351, 352 and 353. Multilayer device 300E also includes a plurality of signal terminals 361, 362, 363, and 364 and a plurality of ground terminals 371, 372, 373, and 374. Dielectric 310, ground electrode 330, planar electrodes 340, connecting electrodes 350, and ground terminals 371 through 374 in multilayer device 300E are the same as in Embodiment 10.

Signal line 320 according to Embodiment 11 is a differential line consisting of two parallel signal lines 320*a* and 320*b* provided inside dielectric 310. Each of signal lines 320*a* and 320*b* is straight and is provided extending first direction d1. Each of signal lines 320*a* and 320*b* is strip-shaped and is arranged parallel to planar electrodes 340 and ground electrode 330. In a state in which multilayer device 300E is mounted in an electronics device, differential signals are transmitted through the two signal lines 320*a* and 320*b*.

The four signal terminals 361 through 364 are provided on side surfaces 311 and 312 of dielectric 310. Signal terminals 361 and 363, which constitute one set of the four signal terminals 361 through 364, are provided on side surface 311, and signal terminals 362 and 364, which constitute the other set of the four signal terminals 361 through 364, are provided on side surface 312. Signal terminal 361 in the one set is connected to one end of signal line 320*a*, and signal terminal 363 in the one set is connected to the one end of signal line 320*b*. Signal terminal 362 in the other set is connected to the other end of signal line 320*a*, and signal terminal 364 in the other set is connected to the other end of signal line 320*b*. The one set of signal terminals 361 and 363 are arranged between the two ground terminals 371 and 373, and the other set of signal terminals 362 and 364 are arranged between the two ground terminals 372 and 374.

In Embodiment 11, at least a portion of connecting electrode 350 of multilayer device 300E has a coil shape or a meandering shape. Accordingly, connecting electrode 350 can generate inductive component L50 corresponding to the coil shape or meandering shape. For example, the inductance value of connecting electrode 350 can be increased by increasing the coil diameter or number of turns of the coil shape, and the inductance value can be decreased by decreasing the coil diameter or number of turns of the coil shape. By changing the inductance value, the value of inductive component L50 can be changed, which means the frequency of the stopband of multilayer device 300E can be changed. This allows for the formation of a stopband in accordance with the required specifications.

Variation 1 of Embodiment 11

Next, the configuration of multilayer device 300F according to Variation 1 of Embodiment 11 will be described. Variation 1 describes an example in which signal line 320 has a meandering shape.

Multilayer device 300F according to Variation 1 includes dielectric 310, signal line 320, ground electrode 330, a plurality of planar electrodes 340, and a plurality of connecting electrodes 350. Multilayer device 300F also includes a plurality of signal terminals 360 and a plurality of ground terminals 370. Dielectric 310, ground electrode 330, the plurality of planar electrodes 340, the plurality of connecting electrodes 350, the plurality of signal terminals 360, and the plurality of ground terminals 370 in multilayer device 300F are the same as in Embodiment 11.

Figure 53:
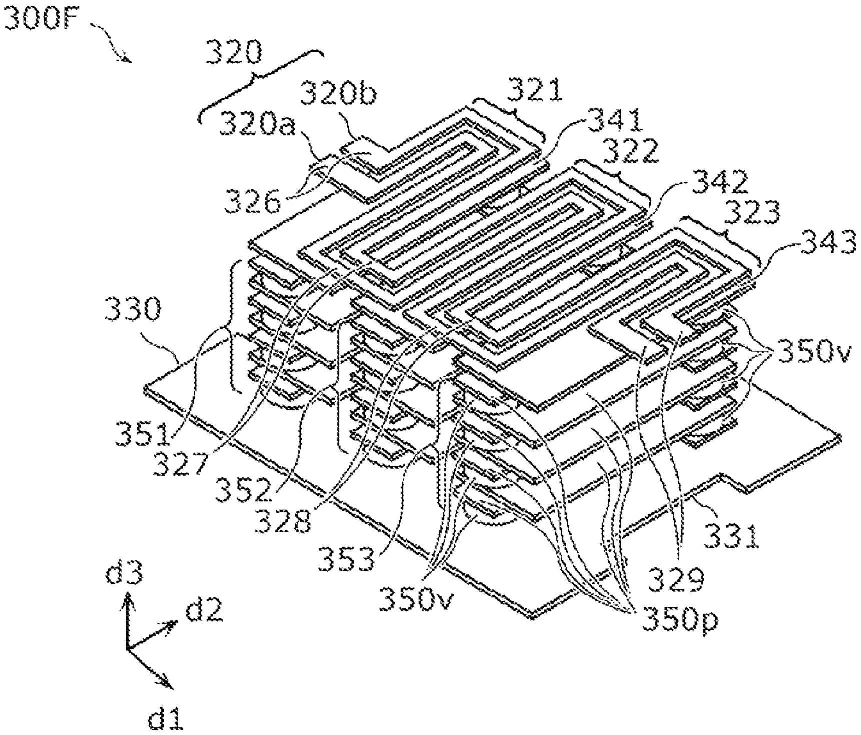
FIG. 53 illustrates the signal line, planar electrodes, ground electrode, and connecting electrodes of the multilayer device according to Variation 1 of Embodiment 11.

FIG. 53 illustrates signal line 320, planar electrodes 340, ground electrode 330, and connecting electrodes 350 of multilayer device 300F according to Variation 1.

Signal line 320 is a differential line consisting of two parallel signal lines 320*a* and 320*b* provided inside dielectric 310. At least a portion of each of signal lines 320*a* and 320*b* has a meandering shape. Each of signal lines 320*a* and 320*b* is arranged parallel to planar electrodes 340 and ground electrode 330. In a state in which multilayer device 300F is mounted in an electronics device, differential signals are transmitted through the two signal lines 320*a* and 320*b*.

In Variation 1 of Embodiment 11, at least a portion of signal line 320 of multilayer device 300F has a meandering shape. Accordingly, signal line 320 and planar electrodes 340 can generate capacitive component C40 corresponding to the meandering shape. For example, by increasing the region defined by the meandering shape, the opposing surface area between signal line 320 and planar electrode 340 can be increased, and by decreasing the region defined by the meandering shape, the opposing surface area between signal line 320 and planar electrode 340 can be reduced. By changing the opposing surface area, the value of capacitive component C40 can be changed, which means the frequency of the stopband of multilayer device 300F can be changed. This allows for the formation of a stopband in accordance with the required specifications.

3.3. Overview

Multilayer device 300A according to the present embodiment includes: dielectric 310; signal line 320 provided inside dielectric 310 and including a portion exposed on an outer surface of dielectric 310; ground electrode 330 provided inside or on the outer surface of dielectric 310 and including at least a portion exposed on the outer surface of dielectric 310; a plurality of planar electrodes 340 provided inside dielectric 310, arranged parallel to ground electrode 330, and arranged in first direction d1; a plurality of connecting electrodes 350 that are provided inside dielectric 310 and connect the plurality of planar electrodes 340 and ground electrode 330; a plurality of signal terminals 360 provided on the outer surface of dielectric 310 and connected to signal line 320; and a plurality of ground terminals 370 provided on the outer surface of dielectric 310 and connected to ground electrode 330. At least a portion of each of the plurality of connecting electrodes 350 has a coil shape or a meandering shape.

As such, since at least a portion of connecting electrode 350 has a coil shape or a meandering shape, connecting electrode 350 can generate inductive component L50 corresponding to the coil shape or meandering shape. For example, the inductance value of connecting electrode 350 can be increased by increasing the coil diameter or number of turns of the coil shape, and the inductance value can be decreased by decreasing the coil diameter or number of turns of the coil shape. By changing the inductance value, the value of inductive component L50 can be changed, which means the frequency of the stopband of multilayer device 300A can be changed. This allows for the formation of a stopband in accordance with the required specifications for multilayer device 300A.

For example, when forming an electrode structure that includes signal line 320, ground electrode 330, planar electrodes 340, and connecting electrodes 350 inside a printed circuit board, the printed circuit board must have a multilayer structure. In contrast, the number of layers of the printed circuit board on which multilayer device 300A is mounted can be reduced by making multilayer device 300A, which includes the above-described electrode structure, an electronic component to be mounted on the printed circuit board, instead of forming the electrode structure inside the printed circuit board. This can inhibit an increase in the cost of printed circuit boards.

Each of the plurality of connecting electrodes 350 may include a plurality of via electrodes 350*v* and one or more patterned electrodes 350*p* electrically connecting the plurality of via electrodes 350*v*, the plurality of via electrodes 350*v* being positioned between a corresponding planar electrode among the plurality of planar electrodes 340 and ground electrode 330.

With this, a coil shape can be formed by connecting electrode 350, which includes via electrodes 350*v* and patterned electrodes 350*p*. Accordingly, connecting electrode 350 can generate inductive component L50 corresponding to the coil shape. For example, by changing the coil diameter or the number of turns of the coil shape, the value of inductive component L50 can be changed, which means the frequency of the stopband of multilayer device 300A can be changed. This allows for the formation of a stopband in accordance with the required specifications for multilayer device 300A.

Dielectric 310 provided between the plurality of planar electrodes 340 and ground electrode 330 may include a plurality of dielectric layers, the plurality of via electrodes 350*v* may penetrate the plurality of dielectric layers, and the one or more patterned electrodes 350*p* may be provided between the plurality of dielectric layers.

With this, a spiral coil shape can be formed by connecting electrode 350. Accordingly, connecting electrode 350 can generate inductive component L50 corresponding to the coil shape. For example, by changing the coil diameter or the number of turns of the coil shape, the value of inductive component L50 can be changed, which means the frequency of the stopband of multilayer device 300A can be changed. This allows for the formation of a stopband in accordance with the required specifications for multilayer device 300A.

At least a portion of signal line 320 may have a meandering shape.

In this way, by signal line 320 having a meandering shape, signal line 320 and planar electrodes 340 can generate capacitive component C40 corresponding to the meandering shape. For example, by increasing the region defined by the meandering shape, the opposing surface area between signal line 320 and planar electrode 340 can be increased, and by decreasing the region defined by the meandering shape, the opposing surface area between signal line 320 and planar electrode 340 can be reduced. By changing the opposing surface area, the value of capacitive component C40 can be changed, which means the frequency of the stopband of multilayer device 300C can be changed. This allows for the formation of a stopband in accordance with the required specifications for multilayer device 300C.

Signal line 320 may include a meandering line section (for example, meandering line section 321) having the meandering shape, and the meandering line section may be provided in a position opposing a planar electrode (for example, planar electrode 341).

In this way, by a meandering line section (for example, meandering line section 321) being provided at a position opposing a planar electrode (for example, planar electrode 341), meandering line section 321 and planar electrode 341 can generate capacitive component C40 corresponding to the meandering shape. For example, by changing the value of capacitive component C40 in accordance with the meandering shape, the frequency of the stopband of multilayer device 300C can be changed. This allows for the formation of a stopband in accordance with the required specifications for multilayer device 300C.

Signal line 320 may include two parallel lines provided in or on dielectric 310.

This allows for multilayer device 300E to be used as a common mode filter.

The two parallel lines may be differential lines on which differential signals are transmitted.

This makes it possible to provide multilayer device 300E that includes a common mode filter functionality.

Multilayer device 300A according to the present embodiment includes: signal line 320 that transmits a signal; ground electrode 330 set to ground potential; a plurality of planar electrodes 340 arranged parallel to ground electrode 330 and arranged in first direction d1; dielectric 310 provided between each of signal line 320, the plurality of planar electrodes 340, and ground electrode 330; and a plurality of connecting electrodes 350 that are positioned between the plurality of planar electrodes 340 and ground electrode 330 and connect the plurality of planar electrodes 340 and ground electrode 330. At least a portion of each of the plurality of connecting electrodes 350 has a coil shape or a meandering shape.

As such, since at least a portion of connecting electrode 350 has a coil shape or a meandering shape, connecting electrode 350 can generate inductive component L50 corresponding to the coil shape or meandering shape. For example, the inductance value of connecting electrode 350 can be increased by increasing the coil diameter or number of turns of the coil shape, and the inductance value can be decreased by decreasing the coil diameter or number of turns of the coil shape. By changing the inductance value, the value of inductive component L50 can be changed, which means the frequency of the stopband of multilayer device 300A can be changed. This allows for the formation of a stopband in accordance with the required specifications for multilayer device 300A.

Each of the plurality of connecting electrodes 350 may include a plurality of via electrodes 350*v* and one or more patterned electrodes 350*p* electrically connecting the plurality of via electrodes 350*v*, the plurality of via electrodes 350*v* being positioned between a corresponding planar electrode among the plurality of planar electrodes 340 and ground electrode 330.

With this, a coil shape can be formed by connecting electrode 350, which includes via electrodes 350*v* and patterned electrodes 350*p*. Accordingly, connecting electrode 350 can generate inductive component L50 corresponding to the coil shape. For example, by changing the coil diameter or the number of turns of the coil shape, the value of inductive component L50 can be changed, which means the frequency of the stopband of multilayer device 300A can be changed. This allows for the formation of a stopband in accordance with the required specifications for multilayer device 300A.

Dielectric 310 provided between the plurality of planar electrodes 340 and ground electrode 330 may include a plurality of dielectric layers, the plurality of via electrodes 350*v* may penetrate the plurality of dielectric layers, and the one or more patterned electrodes 350*p* may be provided between the plurality of dielectric layers.

With this, a spiral coil shape can be formed by connecting electrode 350. Accordingly, connecting electrode 350 can generate inductive component L50 corresponding to the coil shape. For example, by changing the coil diameter or the number of turns of the coil shape, the value of inductive component L50 can be changed, which means the frequency of the stopband of multilayer device 300A can be changed. This allows for the formation of a stopband in accordance with the required specifications for multilayer device 300A.

At least a portion of signal line 320 may have a meandering shape.

In this way, by signal line 320 having a meandering shape, signal line 320 and planar electrodes 340 can generate capacitive component C40 corresponding to the meandering shape. For example, by increasing the region defined by the meandering shape, the opposing surface area between signal line 320 and planar electrode 340 can be increased, and by decreasing the region defined by the meandering shape, the opposing surface area between signal line 320 and planar electrode 340 can be reduced. By changing the opposing surface area, the value of capacitive component C40 can be changed, which means the frequency of the stopband of multilayer device 300C can be changed. This allows for the formation of a stopband in accordance with the required specifications for multilayer device 300C.

Signal line 320 may include a meandering line section (for example, meandering line section 321) having the meandering shape, and the meandering line section may be provided in a position opposing a planar electrode (for example, planar electrode 341).

In this way, by a meandering line section (for example, meandering line section 321) being provided at a position opposing a planar electrode (for example, planar electrode 341), meandering line section 321 and planar electrode 341 can generate capacitive component C40 corresponding to the meandering shape. For example, by changing the value of capacitive component C40 in accordance with the meandering shape, the frequency of the stopband of multilayer device 300C can be changed. This allows for the formation of a stopband in accordance with the required specifications for multilayer device 300C.

3.4. Other Variations on Embodiments 10 and 11

Although a multilayer device and the like according to embodiments of the present disclosure and variations thereof has been described, the present disclosure is not limited to the above embodiments and variations thereof. Various modifications to the exemplary embodiments and variations thereof that may be conceived by those skilled in the art, as well as other embodiments resulting from combinations of some elements of the exemplary embodiments and variations thereof, are intended to be included within the scope of the present disclosure as long as these do not depart from the essence of the present disclosure.

Embodiment 10 presents an example in which three planar electrodes 341 through 343 and three connecting electrodes 351 through 353 are arranged in first direction d1, but the present disclosure is not limited to this example. Two sets of one planar electrode and one connecting electrode may be provided. Alternatively, four or more of these sets may be provided. That is, the multilayer device may have a configuration in which four or more planar electrodes and four or more connecting electrodes are arranged in first direction d1.

In Embodiment 10, an example in which each of connecting electrodes 351, 352, and 353 has the same shape and size is given, but the present disclosure is not limited to this example; the size of each of connecting electrodes 351, 352, and 353 may be changed in accordance with the required specifications. For example, the frequency of the stopband can be widened by changing inductive component L50 by altering the diameter or length of via electrodes 350*v*. For example, the frequency of the stopband can be widened by changing inductive component L50 by altering the width or length of patterned electrode 350*p*.

In Embodiment 10, an example in which each of planar electrodes 341, 342, and 343 has the same shape and size is given, but the present disclosure is not limited to this example; the size of each of planar electrodes 341, 342, and 343 may be changed in accordance with the required specifications. For example, the frequency of the stopband can be widened by changing capacitive component C40 generated by the opposing surface area between signal line 320 and planar electrodes 340.

In Embodiment 10, an example in which the gap between each of planar electrodes 341, 342, and 343 and signal line 320 is the same is given, but the present disclosure is not limited to this example; the gap between each of planar electrodes 341, 342, and 343 and signal line 320 may be changed in accordance with the required specifications. For example, the frequency of the stopband can be widened by changing capacitive component C40 by altering the gaps between planar electrode 341 and signal line 320, between planar electrode 342 and signal line 320, and between planar electrode 343 and signal line 320.

The following is features of the multilayer device described based on the above embodiments.

<Technique 1>

A multilayer device comprising:

a dielectric;

a signal line provided inside the dielectric and including a portion exposed on an outer surface of the dielectric;

a ground electrode provided inside or on the outer surface of the dielectric and including at least a portion exposed on the outer surface of the dielectric;

a plurality of planar electrodes provided inside the dielectric, arranged parallel to the ground electrode, and arranged in a first direction;

a plurality of connecting electrodes that are provided inside the dielectric and connect the plurality of planar electrodes and the ground electrode;

a plurality of signal terminals provided on the outer surface of the dielectric and connected to the signal line; and a plurality of ground terminals provided on the outer surface of the dielectric and connected to the ground electrode.

<Technique 2>

The multilayer device according to technique 1, wherein at least one of the plurality of planar electrodes or the plurality of connecting electrodes includes two or more different types of electrode structures.

<Technique 3>

The multilayer device according to technique 1 or 2, wherein the plurality of connecting electrodes are via conductors and overlap outer peripheral edge portions of the plurality of planar electrodes when viewed in a direction perpendicular to the plurality of planar electrodes.

<Technique 4>

The multilayer device according to any one of techniques 1 to 3, wherein when viewed in a direction perpendicular to the plurality of planar electrodes, a width of the signal line may be same as a length of the plurality of planar electrodes in a second direction perpendicular to the first direction.

<Technique 5>

A multilayer device comprising:

a signal line that transmits a signal;

a ground electrode set to ground potential;

a plurality of planar electrodes arranged parallel to the ground electrode and arranged in a first direction;

a dielectric provided between each of the signal line, the plurality of planar electrodes, and the ground electrode; and a plurality of connecting electrodes that are positioned between the plurality of planar electrodes and the ground electrode and connect the plurality of planar electrodes and the ground electrode, wherein at least one of the plurality of planar electrodes or the plurality of connecting electrodes includes two or more different types of electrode structures.

<Technique 6>

The multilayer device according to technique 5, wherein the plurality of planar electrodes include two or more different types of structures with respect to at least one of an opposing surface area between the signal line and the plurality of planar electrodes or a pitch of the plurality of planar electrodes arranged in the first direction.

<Technique 7>

The multilayer device according to technique 5 or 6, wherein the plurality of connecting electrodes include two or more different types of structures with respect to at least one of a cross-sectional area of the plurality of connecting electrodes or a length of the plurality of connecting electrodes.

<Technique 8>

The multilayer device according to technique 6, wherein the multilayer device includes a plurality of sets of the two or more different types of structures.

<Technique 9>

The multilayer device according to any one of techniques 1 to 8, wherein the multilayer device has a multilayer structure in which a plurality of stacks are stacked, each of the plurality of stacks including the signal line, the ground electrode, the plurality of planar electrodes, and the plurality of connecting electrodes.

<Technique 10>

The multilayer device according to any one of techniques 1 to 9, wherein the signal line comprises two parallel lines provided in or on the dielectric.

<Technique 11>

The multilayer device according to technique 10, wherein the two parallel lines are differential lines on which differential signals are transmitted.

<Technique 12>

The multilayer device according to any one of techniques 1 to 11, wherein among the plurality of planar electrodes, at least one planar electrode has an opposing surface area with the signal line that is different than an opposing surface area between another planar electrode different from the at least one planar electrode and the signal line.

<Technique 13>

The multilayer device according to any one of techniques 1 to 12, wherein among the plurality of planar electrodes, a center-to-center distance between one pair of planar electrodes that are adjacent to each other in the first direction is different from a center-to-center distance between another pair of planar electrodes different from the one pair of planar electrodes.

<Technique 14>

The multilayer device according to any one of techniques 1 to 13, wherein among the plurality of connecting electrodes, at least one connecting electrode has a different cross-sectional area than another connecting electrode different from the at least one connecting electrode.

<Technique 15>

The multilayer device according to any one of techniques 1 to 14, wherein among the plurality of connecting electrodes, at least one connecting electrode has a different length than another connecting electrode different from the at least one connecting electrode.

<Technique 16>

The multilayer device according to any one of techniques 1 to 15, wherein the plurality of planar electrodes are arranged between the signal line and the ground electrode.

<Technique 17>

The multilayer device according to any one of techniques 1 to 15, wherein the plurality of planar electrodes are arranged on an opposite side of the signal line relative to a side on which the ground electrode is provided.

<Technique 18>

A multilayer device comprising:

a dielectric;

a signal line provided inside the dielectric and including a portion exposed on an outer surface of the dielectric;

a ground electrode provided inside or on the outer surface of the dielectric and including at least a portion exposed on the outer surface of the dielectric;

a plurality of planar electrodes provided inside the dielectric, arranged parallel to the ground electrode, and arranged in a first direction;

a plurality of connecting electrodes that are provided inside the dielectric and connect the plurality of planar electrodes and the ground electrode;

a plurality of signal terminals provided on the outer surface of the dielectric and connected to the signal line; and a plurality of ground terminals provided on the outer surface of the dielectric and connected to the ground electrode, wherein at least a portion of the signal line has a meandering shape.

<Technique 19>

The multilayer device according to technique 18, wherein the signal line includes a meandering line section having the meandering shape, and the meandering line section is provided in a position opposing a planar electrode among the plurality of planar electrodes.

<Technique 20>

The multilayer device according to technique 18, wherein the signal line includes a plurality of meandering line sections having the meandering shape, and the plurality of meandering line sections are provided in one-to-one correspondence with the plurality of planar electrodes.

<Technique 21>

The multilayer device according to technique 19, wherein the meandering line section is provided at an end portion of the signal line and connected to a signal terminal among the plurality of signal terminals.

<Technique 22>

The multilayer device according to any one of techniques 18 to 21, wherein the signal line comprises two parallel lines provided in or on the dielectric.

<Technique 23>

The multilayer device according to technique 22, wherein the two parallel lines are differential lines on which differential signals are transmitted.

<Technique 24>

A multilayer device comprising:

a signal line that transmits a signal;

a ground electrode set to ground potential;

a plurality of planar electrodes arranged parallel to the ground electrode and arranged in a first direction;

a dielectric provided between each of the signal line, the plurality of planar electrodes, and the ground electrode; and a plurality of connecting electrodes that are positioned between the plurality of planar electrodes and the ground electrode and connect the plurality of planar electrodes and the ground electrode, wherein at least a portion of the signal line has a meandering shape.

<Technique 25>

The multilayer device according to technique 24, wherein the signal line includes a meandering line section having the meandering shape, and the meandering line section is provided in a position opposing a planar electrode among the plurality of planar electrodes.

<Technique 26>

A multilayer device comprising:

a dielectric;

a signal line provided inside the dielectric and including a portion exposed on an outer surface of the dielectric;

a ground electrode provided inside or on the outer surface of the dielectric and including at least a portion exposed on the outer surface of the dielectric;

a plurality of planar electrodes provided inside the dielectric, arranged parallel to the ground electrode, and arranged in a first direction;

a plurality of connecting electrodes that are provided inside the dielectric and connect the plurality of planar electrodes and the ground electrode;

a plurality of signal terminals provided on the outer surface of the dielectric and connected to the signal line; and a plurality of ground terminals provided on the outer surface of the dielectric and connected to the ground electrode, wherein at least a portion of each of the plurality of connecting electrodes has a coil shape or a meandering shape.

<Technique 27>

The multilayer device according to technique 26, wherein each of the plurality of connecting electrodes includes a plurality of via electrodes and one or more patterned electrodes electrically connecting the plurality of via electrodes, the plurality of via electrodes being positioned between a corresponding planar electrode among the plurality of planar electrodes and the ground electrode.

<Technique 28>

The multilayer device according to technique 27, wherein the dielectric provided between the plurality of planar electrodes and the ground electrode includes a plurality of dielectric layers, the plurality of via electrodes penetrate the plurality of dielectric layers, and the one or more patterned electrodes are provided between the plurality of dielectric layers.

<Technique 29>

The multilayer device according to any one of techniques 26 to 28, wherein at least a portion of the signal line has a meandering shape.

<Technique 30>

The multilayer device according to technique 29, wherein the signal line includes a meandering line section having the meandering shape, and the meandering line section is provided in a position opposing a planar electrode among the plurality of planar electrodes.

<Technique 31>

The multilayer device according to any one of techniques 26 to 30, wherein, the signal line comprises two parallel lines provided in or on the dielectric.

<Technique 32>

The multilayer device according to technique 31, wherein the two parallel lines are differential lines on which differential signals are transmitted.

<Technique 33>

A multilayer device comprising:

a signal line that transmits a signal;

a ground electrode set to ground potential;

a plurality of planar electrodes arranged parallel to the ground electrode and arranged in a first direction;

a dielectric provided between each of the signal line, the plurality of planar electrodes, and the ground electrode; and a plurality of connecting electrodes that are positioned between the plurality of planar electrodes and the ground electrode and connect the plurality of planar electrodes and the ground electrode, wherein at least a portion of each of the plurality of connecting electrodes has a coil shape or a meandering shape.

<Technique 34>

The multilayer device according to technique 33, wherein each of the plurality of connecting electrodes includes a plurality of via electrodes and one or more patterned electrodes electrically connecting the plurality of via electrodes, the plurality of via electrodes being positioned between a corresponding planar electrode among the plurality of planar electrodes and the ground electrode.

<Technique 35>

The multilayer device according to technique 34, wherein the dielectric provided between the plurality of planar electrodes and the ground electrode includes a plurality of dielectric layers, the plurality of via electrodes penetrate the plurality of dielectric layers, and the one or more patterned electrodes are provided between the plurality of dielectric layers.

<Technique 36>

The multilayer device according to any one of techniques 33 to 35, wherein at least a portion of the signal line has a meandering shape.

<Technique 37>

The multilayer device according to technique 36, wherein the signal line includes a meandering line section having the meandering shape, and the meandering line section is provided in a position opposing a planar electrode among the plurality of planar electrodes.

INDUSTRIAL APPLICABILITY

The multilayer device according to the present disclosure is applicable as a multilayer device used in various electronics devices and communication systems.

The invention claimed is:

1. A multilayer device comprising:

a dielectric;

a signal line provided inside the dielectric and including a portion exposed on an outer surface of the dielectric;

a ground electrode provided inside or on the outer surface of the dielectric and including at least a portion exposed on the outer surface of the dielectric;

a plurality of planar electrodes provided inside the dielectric, arranged parallel to the ground electrode, and arranged in a first direction;

a plurality of connecting electrodes that are provided inside the dielectric and connect the plurality of planar electrodes and the ground electrode;

a plurality of signal terminals provided on the outer surface of the dielectric and connected to the signal line; and a plurality of ground terminals provided on the outer surface of the dielectric and connected to the ground electrode, wherein the multilayer device is a common mode filter, the signal line comprises two parallel lines provided in or on the dielectric, and the two parallel lines are differential lines on which differential signals are transmitted.

2. The multilayer device according to claim 1, wherein at least one of the plurality of planar electrodes or the plurality of connecting electrodes includes two or more different types of electrode structures.

3. The multilayer device according to claim 1, wherein the plurality of connecting electrodes are via conductors and overlap outer peripheral edge portions of the plurality of planar electrodes when viewed in a direction perpendicular to the plurality of planar electrodes.

4. The multilayer device according to claim 1, wherein the multilayer device has a multilayer structure in which a plurality of stacks are stacked, each of the plurality of stacks including the signal line, the ground electrode, the plurality of planar electrodes, and the plurality of connecting electrodes.

5. The multilayer device according to claim 1, wherein among the plurality of planar electrodes, at least one planar electrode has an opposing surface area with the signal line that is different than an opposing surface area between another planar electrode different from the at least one planar electrode and the signal line.

6. The multilayer device according to claim 1, wherein among the plurality of planar electrodes, a center-to-center distance between one pair of planar electrodes that are adjacent to each other in the first direction is different from a center-to-center distance between another pair of planar electrodes different from the one pair of planar electrodes.

7. The multilayer device according to claim 1, wherein among the plurality of connecting electrodes, at least one connecting electrode has a different cross-sectional area than another connecting electrode different from the at least one connecting electrode.

8. The multilayer device according to claim 1, wherein among the plurality of connecting electrodes, at least one connecting electrode has a different length than another connecting electrode different from the at least one connecting electrode.

9. The multilayer device according to claim 1, wherein the plurality of planar electrodes are arranged between the signal line and the ground electrode.

10. The multilayer device according to claim 1, wherein the plurality of planar electrodes are arranged on an opposite side of the signal line relative to a side on which the ground electrode is provided.

11. A multilayer device comprising:

a dielectric;

a signal line provided inside the dielectric and including a portion exposed on an outer surface of the dielectric;

a ground electrode provided inside or on the outer surface of the dielectric and including at least a portion exposed on the outer surface of the dielectric;

a plurality of planar electrodes provided inside the dielectric, arranged parallel to the ground electrode, and arranged in a first direction;

a plurality of connecting electrodes that are provided inside the dielectric and connect the plurality of planar electrodes and the ground electrode;

a plurality of signal terminals provided on the outer surface of the dielectric and connected to the signal line; and a plurality of ground terminals provided on the outer surface of the dielectric and connected to the ground electrode, wherein at least a portion of the signal line has a meandering shape.

12. The multilayer device according to claim 11, wherein the signal line includes a meandering line section having the meandering shape, and the meandering line section is provided in a position opposing a planar electrode among the plurality of planar electrodes.

13. The multilayer device according to claim 11, wherein the signal line includes a plurality of meandering line sections having the meandering shape, and the plurality of meandering line sections are provided in one-to-one correspondence with the plurality of planar electrodes.

14. The multilayer device according to claim 12, wherein the meandering line section is provided at an end portion of the signal line and connected to a signal terminal among the plurality of signal terminals.

15. The multilayer device according to claim 11, wherein the signal line comprises two parallel lines provided in or on the dielectric, and the two parallel lines are differential lines on which differential signals are transmitted.

16. A multilayer device comprising:

a dielectric;

a signal line provided inside the dielectric and including a portion exposed on an outer surface of the dielectric;

a ground electrode provided inside or on the outer surface of the dielectric and including at least a portion exposed on the outer surface of the dielectric;

a plurality of planar electrodes provided inside the dielectric, arranged parallel to the ground electrode, and arranged in a first direction;

a plurality of connecting electrodes that are provided inside the dielectric and connect the plurality of planar electrodes and the ground electrode;

a plurality of signal terminals provided on the outer surface of the dielectric and connected to the signal line; and a plurality of ground terminals provided on the outer surface of the dielectric and connected to the ground electrode, wherein at least a portion of each of the plurality of connecting electrodes has a coil shape or a meandering shape.

17. The multilayer device according to claim 16, wherein each of the plurality of connecting electrodes includes a plurality of via electrodes and one or more patterned electrodes electrically connecting the plurality of via electrodes, the plurality of via electrodes being positioned between a corresponding planar electrode among the plurality of planar electrodes and the ground electrode.

18. The multilayer device according to claim 17, wherein the dielectric provided between the plurality of planar electrodes and the ground electrode includes a plurality of dielectric layers, the plurality of via electrodes penetrate the plurality of dielectric layers, and the one or more patterned electrodes are provided between the plurality of dielectric layers.

19. The multilayer device according to claim 16, wherein at least a portion of the signal line has a meandering shape.

20. The multilayer device according to claim 19, wherein the signal line includes a meandering line section having the meandering shape, and the meandering line section is provided in a position opposing a planar electrode among the plurality of planar electrodes.

21. The multilayer device according to claim 16, wherein, the signal line comprises two parallel lines provided in or on the dielectric, and the two parallel lines are differential lines on which differential signals are transmitted.

* * * * *